(12) United States Patent
Zhang et al.

(10) Patent No.: US 11,343,529 B2
(45) Date of Patent: May 24, 2022

(54) CALCULATION OF PREDICATION REFINEMENT BASED ON OPTICAL FLOW

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/461,530

(22) Filed: Aug. 30, 2021

(65) Prior Publication Data

US 2021/0392367 A1    Dec. 16, 2021

Related U.S. Application Data

(63) Continuation of application No. PCT/CN2020/079675, filed on Mar. 17, 2020.

(30) Foreign Application Priority Data

| Mar. 17, 2019 | (WO) | ................ PCT/CN2019/078411 |
| Mar. 18, 2019 | (WO) | ................ PCT/CN2019/078501 |

(Continued)

(51) Int. Cl.
*H04N 19/52*    (2014.01)
*H04N 19/139*   (2014.01)
(Continued)

(52) U.S. Cl.
CPC .......... *H04N 19/52* (2014.11); *H04N 19/107* (2014.11); *H04N 19/132* (2014.11);
(Continued)

(58) Field of Classification Search
None
See application file for complete search history.

(56) References Cited

U.S. PATENT DOCUMENTS

| 10,523,964 B2 | 12/2019 | Chuang et al. |
| 10,819,891 B2 | 10/2020 | Wang et al. |

(Continued)

FOREIGN PATENT DOCUMENTS

| CN | 100370807 C  | 2/2008  |
| CN | 104125470 A  | 10/2014 |

(Continued)

OTHER PUBLICATIONS

Akula et al. "Description of SDR, HDR and 360 degrees Video Coding Technology Proposal Considering Mobile Application Scenario by Samsung, Huawei, GoPro, and HiSilicon," buJoint Video Exploration Team (JVET) of ITU-T SG 16 WP 3 and ISO/IEC JTC 1/SC 29/WG 11, 10th Meeting, San Diego, US, Apr. 10-20, 2018, document JVET-I0024, 2018.

(Continued)

*Primary Examiner* — Lindsay J Uhl
(74) *Attorney, Agent, or Firm* — Perkins Coie LLP

(57) ABSTRACT

A method of video processing includes determining a first motion displacement Vx(x,y) at a position (x,y) and a second motion displacement Vy(x,y) at the position (x,y) in a video block coded using an optical flow based method, wherein x and y are fractional numbers, where Vx(x,y) and Vy(x,y) are determined based at least on the position (x,y) and a center position of a basic video block of the video block, and performing a conversion between the video block and a (Continued)

2800B

Determining a refined prediction sample P'(x,y) at a position (x,y) in a video block by modifying a prediction sample P(x,y) at the position (x,y) with a first gradient component Gx(x, y) in a first direction estimated at the position (x,y) and a second gradient component Gy(x, y) in a second direction estimated at the position (x,y) and a first motion displacement Vx(x,y) estimated for the position (x,y) and a second motion displacement Vy(x,y) estimated for the position (x,y), where x and y are integer numbers  ⊢— 2812

Performing a conversion between the video block and a bitstream representation of the video block using a reconstructed sample value Rec(x,y) at the position (x,y) that is obtained based on the refined prediction sample P'(x,y) and a residue sample value Res(x,y)  ⊢— 2814 bitstream representation of the current video block using the first motion displacement and the second motion displacement.

20 Claims, 56 Drawing Sheets

(30) Foreign Application Priority Data

Mar. 19, 2019 (WO) ................ PCT/CN2019/078719
Mar. 27, 2019 (WO) ................ PCT/CN2019/079961

(51) Int. Cl.
*H04N 19/176* (2014.01)
*H04N 19/186* (2014.01)
*H04N 19/107* (2014.01)
*H04N 19/132* (2014.01)
*H04N 19/184* (2014.01)
*H04N 19/577* (2014.01)

(52) U.S. Cl.
CPC ......... *H04N 19/139* (2014.11); *H04N 19/176* (2014.11); *H04N 19/184* (2014.11); *H04N 19/186* (2014.11); *H04N 19/577* (2014.11)

(56) References Cited

U.S. PATENT DOCUMENTS

| | | | |
|---|---|---|---|
| 10,904,565 B2 | 1/2021 | Chuang et al. | |
| 2014/0177712 A1 | 6/2014 | Fartukov et al. | |
| 2015/0016515 A1 | 1/2015 | Naccari et al. | |
| 2017/0214932 A1* | 7/2017 | Huang ................ | H04N 19/537 |
| 2018/0192072 A1 | 7/2018 | Chen et al. | |
| 2018/0316929 A1* | 11/2018 | Li ......................... | H04N 19/44 |
| 2018/0376166 A1 | 12/2018 | Chuang et al. | |
| 2020/0221122 A1 | 7/2020 | Ye et al. | |
| 2020/0260106 A1* | 8/2020 | Huang .................. | H04N 19/55 |
| 2020/0296405 A1* | 9/2020 | Huang ................. | H04N 19/176 |
| 2020/0382795 A1 | 12/2020 | Zhang et al. | |
| 2020/0396453 A1 | 12/2020 | Zhang et al. | |

FOREIGN PATENT DOCUMENTS

| | | | |
|---|---|---|---|
| CN | 105338354 A | 2/2016 | |
| CN | 106416245 A | 2/2017 | |
| CN | 107925760 A | 4/2018 | |
| CN | 108141600 A | 6/2018 | |
| CN | 108293117 A | 7/2018 | |

OTHER PUBLICATIONS

Bross et al. "Versatile Video Coding (Draft 2)," Joint Video Experts Team (JVET) of ITU-T SG 16 WP 3 and ISO/IEC ITC 1/SC 29/WG 11, 11th Meeting, Ljubljana, SI, Jul. 10-18, 2018, document JVET-K1001, 2018.
Bross et al. "Versatile Video Coding (Draft 3)," Joint Video Experts Team (JVET) of ITU-T SG 16 WP 3 and ISO/IEC ITC 1/SC 29/WG 11, 12th Meeting, Macao, CN, Oct. 3-12, 2018, document JVET-L1001, 2018.
Chen et al. "Generalized Bi-Prediction for Inter Coding," Joint Video Exploration Team (JVET) of ITU-T SG 16 WP 3 and ISO/IEC JTC 1/SC 29/WG 11, 3rd Meeting, Geneva, CH, May 26-Jun. 1, 2016, document JVET-C0047, 2016.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Chuang et al. "CE2-Related: Phase-Variant Affine Subblock Motion Compensation," Joint Video Experts Team (JVET) of ITU-T SG 16 WP 3 and ISO/IEC JTC 1/SC 29/WG 11, 14th Meeting Geneva, CH, Mar. 19-27, 2019, document JVET-N0510, 2019.
He et al. "CE4-Related: Encoder Speed-Up and Bug Fix for Generalized Bi-Prediction in BMS-2.1," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0296, 2018.
"High Efficiency Video Coding," Series H: Audiovisual and Multimedia Systems. Infrastructure of Audiovisual Services—Coding of Moving Video, ITU-T Telecommunication Standardization Sector of ITU, H.265, Feb. 2018.
Luo et al. "CE2-Related: Prediction Refinement with Optical Flow for Affine Mode," Joint Video Experts Team (JVET) ITU-T SG 16 WP 3 and ISO/IEC JTC 1/SC 29/WG 11, 14th Meeting, Geneva, CH, Mar. 19-27, 2019, document JVET-N0236, 2019.
Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 10-18, 2018, document No. JVET-K0248, 2018.
Su et al. "CE4-Related: Generalized Bi-Prediction Improvements," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0197, 2018.
Su et al. "CE4-Related: Generalized Bi-Prediction Improvements Combined from JVET-L0197 and JVET-L0296," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0646, 2018.
Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2016, document JCTVC-Y1002, 2016.
Xiu et al. "CE9-Related: Complexity Reduction and Bit-Width Control for Bi-Directional Optical Flow (BIO)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0256, 2018.
JEM-7.0: https://jvet.hhi.fraunhofer.de/svn/svn_HMJEMSoftware/tags/ HM-16.6-JEM-7.0.
https://vcgit.hhi.fraunhofer.de/jvet/WCSoftware_VTM/tags/VTM-2.1.
International Search Report and Written Opinion from International Patent Application No. PCT/CN2020/079662 dated Jun. 8, 2020 (11 pages).
International Search Report and Written Opinion from International Patent Application No. PCT/CN2020/079675 dated Jun. 23, 2020 (9 pages).

* cited by examiner

[Box 2812] Determining a refined prediction sample P'(x,y) at a position (x,y) in a video block by modifying a prediction sample P(x,y) at the position (x,y) with a first gradient component Gx(x, y) in a first direction estimated at the position (x,y) and a second gradient component Gy(x, y) in a second direction estimated at the position (x,y) and a first motion displacement Vx(x,y) estimated for the position (x,y) and a second motion displacement Vy(x,y) estimated for the position (x,y), where x and y are integer numbers

[Box 2814] Performing a conversion between the video block and a bitstream representation of the video block using a reconstructed sample value Rec(x,y) at the position (x,y) that is obtained based on the refined prediction sample P'(x,y) and a residue sample value Res(x,y)

2822 — Determining a refined prediction sample P'(x,y) at a position (x,y) in a video block by modifying a prediction sample P(x,y) at the position (x,y) with a first gradient component Gx(x,y) in a first direction estimated at the position (x,y) and a second gradient component Gy(x,y) in a second direction estimated at the position (x,y) and a first motion displacement Vx(x,y) estimated for the position (x,y) and a second motion displacement Vy(x,y) estimated for the position (x,y), where x and y are integer numbers 2824 — Encoding a bitstream representation of the video block to include a residue sample value Res(x,y) based on a reconstructed sample value Rec(x,y) at the position (x,y) that is based at least on the refined prediction sample P'(x,y).

FIG. 28C

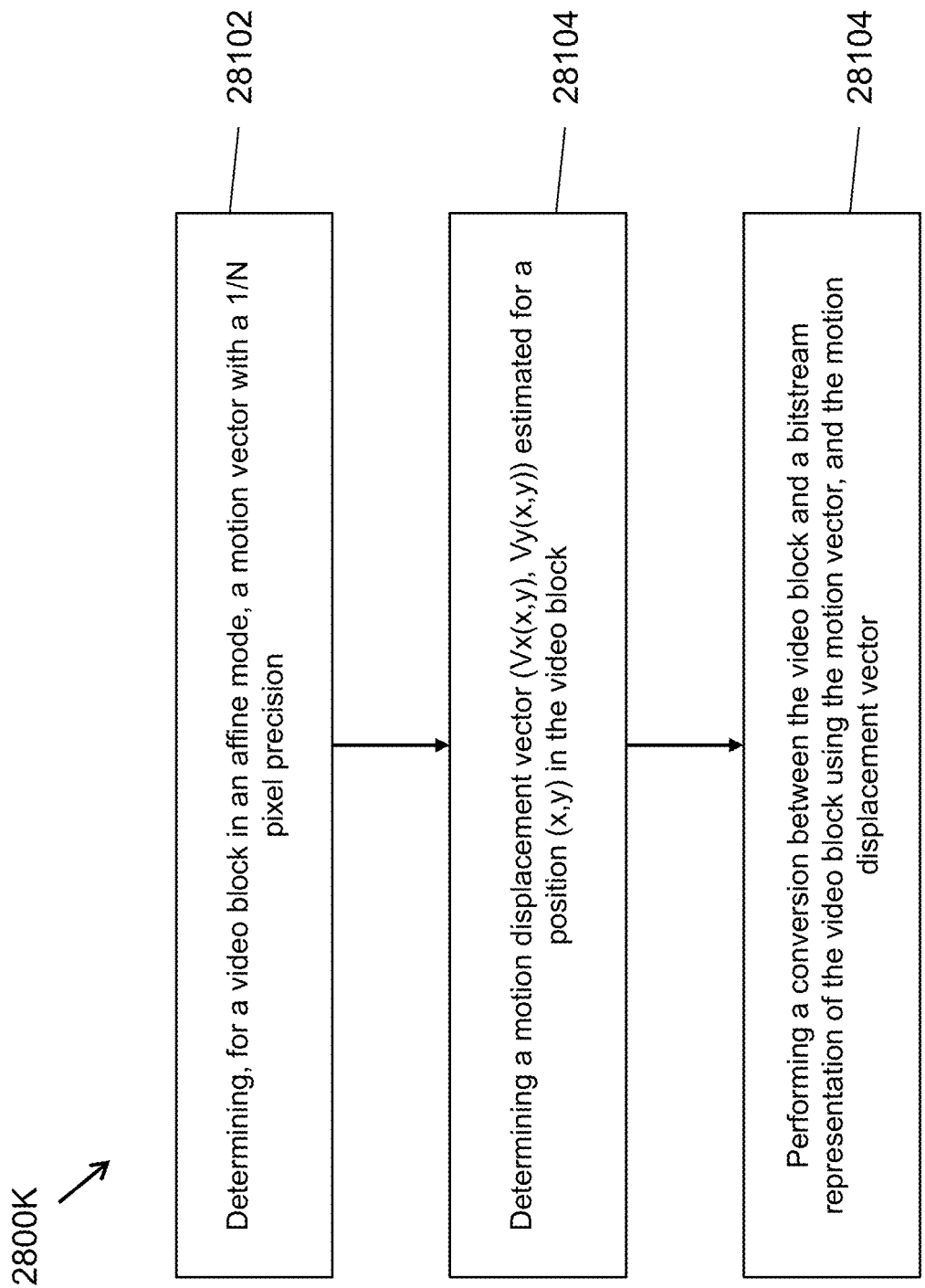

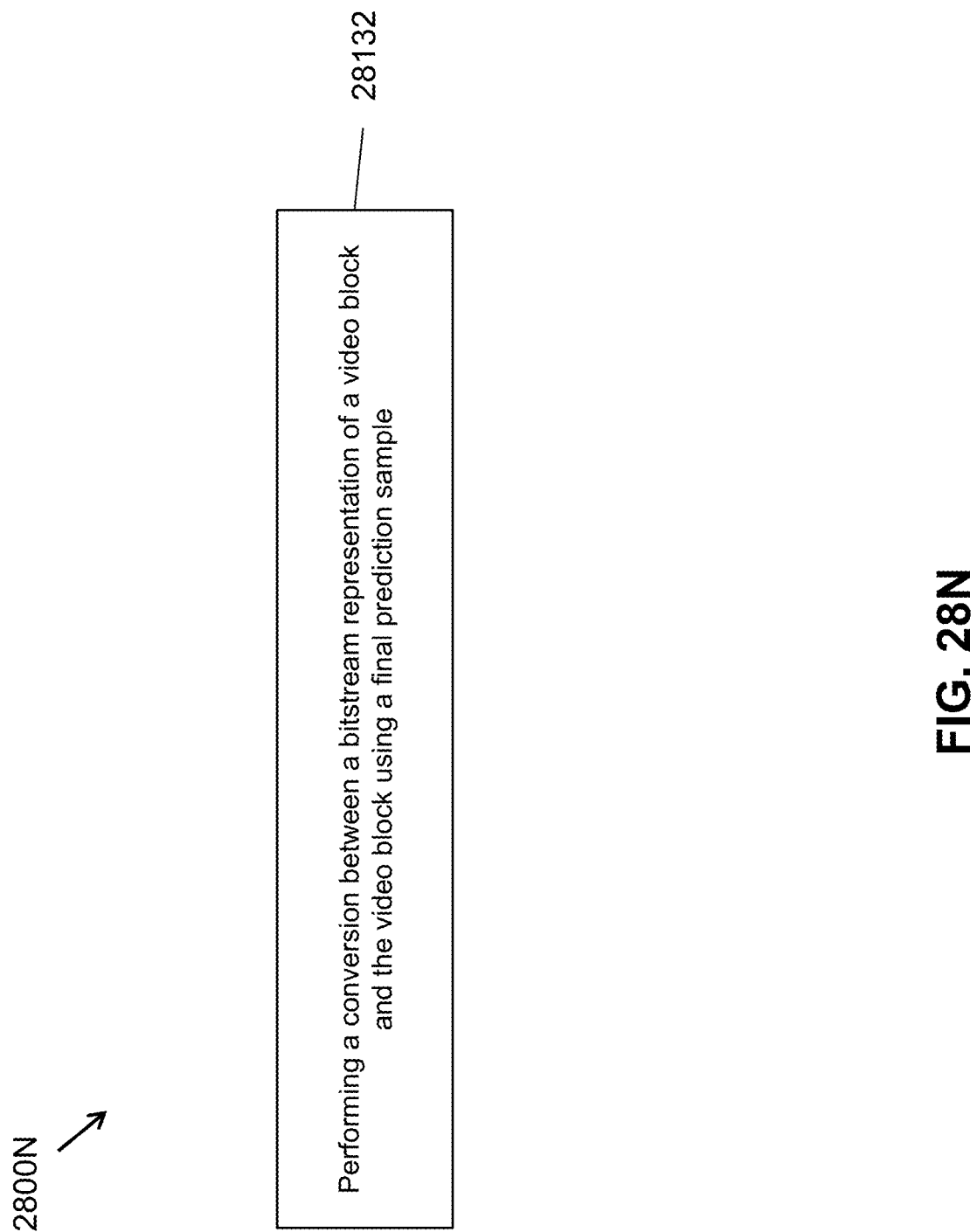

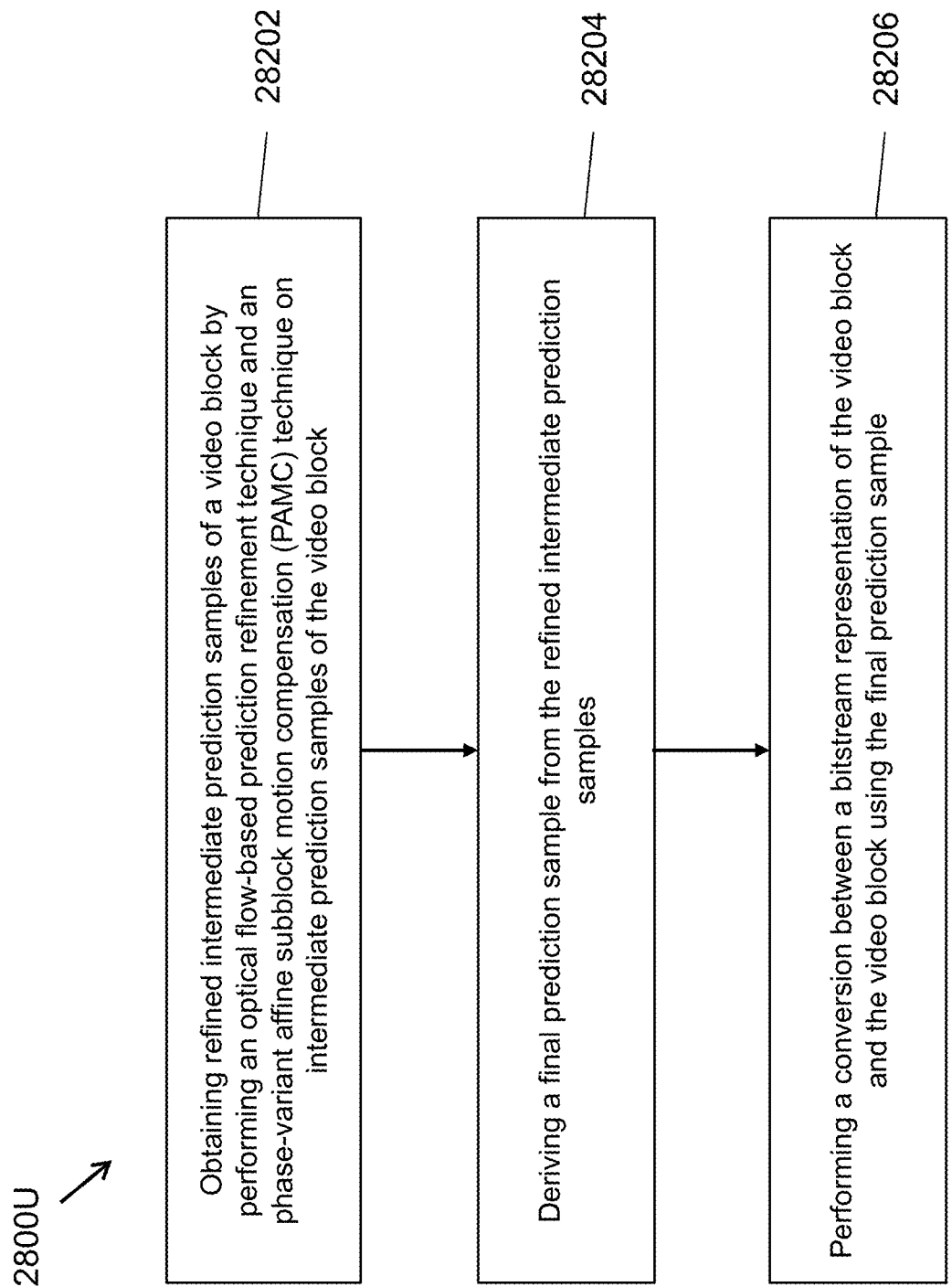

CALCULATION OF PREDICATION REFINEMENT BASED ON OPTICAL FLOW

CROSS REFERENCE TO RELATED APPLICATIONS

This application is a continuation of International Application No. PCT/CN2020/079675, filed on Mar. 17, 2020, which claims the priority to and benefits of International Patent Application No. PCT/CN2019/078411, filed on Mar. 17, 2019, International Patent Application No. PCT/CN2019/078501, filed on Mar. 18, 2019, International Patent Application No. PCT/CN2019/078719, filed on Mar. 19, 2019, and International Patent Application No. PCT/CN2019/079961, filed on Mar. 27, 2019. The entire disclosures of the aforementioned applications are incorporated by reference as part of the disclosure of this application.

TECHNICAL FIELD

The present document related to video coding and decoding.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Various techniques are provided that can be implemented by digital video encoders, transcoders and decoders to use optical flow based refinement of prediction in processing of video.

A first example of a video processing method includes determining a refined prediction sample $P'(x,y)$ at a position $(x,y)$ in a video block by modifying a prediction sample $P(x,y)$ at the position $(x,y)$ with a first gradient component $Gx(x, y)$ in a first direction estimated at the position $(x,y)$ and a second gradient component $Gy(x, y)$ in a second direction estimated at the position $(x,y)$ and a first motion displacement $Vx(x,y)$ estimated for the position $(x,y)$ and a second motion displacement $Vy(x,y)$ estimated for the position $(x,y)$, wherein x and y are integer numbers; and performing a conversion between the video block and a bitstream representation of the video block using a reconstructed sample value $Rec(x,y)$ at the position $(x,y)$ that is obtained based on the refined prediction sample $P'(x,y)$ and a residue sample value $Res(x,y)$.

A second example of a video processing method includes determining a refined prediction sample $P'(x,y)$ at a position $(x,y)$ in a video block by modifying a prediction sample $P(x,y)$ at the position $(x,y)$ with a first gradient component $Gx(x, y)$ in a first direction estimated at the position $(x,y)$ and a second gradient component $Gy(x, y)$ in a second direction estimated at the position $(x,y)$ and a first motion displacement $Vx(x,y)$ estimated for the position $(x,y)$ and a second motion displacement $Vy(x,y)$ estimated for the position $(x,y)$, where x and y are integer numbers; and encoding a bitstream representation of the video block to include a residue sample value $Res(x,y)$ based on a reconstructed sample value $Rec(x,y)$ at the position $(x,y)$ that is based at least on the refined prediction sample $P'(x,y)$.

A third example of a video processing method includes determining a first motion displacement $Vx(x,y)$ at a position $(x,y)$ and a second motion displacement $Vy(x,y)$ at the position $(x,y)$ in a video block coded using an optical flow based method, wherein x and y are fractional numbers, wherein $Vx(x,y)$ and $Vy(x,y)$ are determined based at least on the position $(x,y)$ and a center position of a basic video block of the video block; and performing a conversion between the video block and a bitstream representation of the current video block using the first motion displacement and the second motion displacement.

A fourth example of a video processing method includes determining a first gradient component $Gx(x,y)$ in a first direction estimated at a position $(x,y)$ in a video block and a second gradient component $Gy(x,y)$ in a second direction estimated at the position $(x,y)$ in the video block, wherein the first gradient component and the second gradient component are based on a final prediction sample value of a prediction sample $P(x,y)$ at the position $(x,y)$, and wherein x and y are integer numbers; and performing a conversion between the video block and a bitstream representation of the video block using a reconstructed sample value $Rec(x,y)$ at the position $(x,y)$ that is obtained based on a residue sample value $Res(x,y)$ added to the final prediction sample value of a prediction sample $P(x,y)$, which is refined using the gradient $(Gx(x,y), Gy(x,y))$.

A fifth example of a video processing method includes determining a first gradient component $Gx(x,y)$ in a first direction estimated at a position $(x,y)$ in a video block and a second gradient component $Gy(x,y)$ in a second direction estimated at the position $(x,y)$ in the video block, wherein the first gradient component and the second gradient component are based on a final prediction sample value of a prediction sample $P(x,y)$ at the position $(x,y)$, and wherein x and y are integer numbers; and encoding a bitstream representation of the video block to include a residue sample value $Res(x,y)$ based on a reconstructed sample value $Rec(x,y)$ at the position $(x,y)$, wherein the reconstructed sample value $Rec(x,y)$ is based on the residue sample value $Res(x,y)$ added to the final prediction sample value of a prediction sample $P(x,y)$, which is refined using the gradient $(Gx(x,y), Gy(x,y))$.

A sixth example of a video processing method includes determining a first gradient component $Gx(x,y)$ in a first direction estimated at a position $(x,y)$ in a video block and a second gradient component $Gy(x,y)$ in a second direction estimated at the position $(x,y)$ in the video block, wherein the first gradient component and the second gradient component are based on an intermediate prediction sample value of a prediction sample $P(x,y)$ at the position $(x,y)$, wherein a final prediction sample value of the prediction sample $P(x,y)$ is based on the intermediate prediction sample value, and wherein x and y are integer numbers; and performing a conversion between the video block and a bitstream representation of the video block using a reconstructed sample value $Rec(x,y)$ at the position $(x,y)$ that is obtained based on the final prediction sample value of a prediction sample $P(x,y)$ and a residue sample value $Res(x,y)$.

A seventh example of a video processing method includes determining a first gradient component $Gx(x,y)$ in a first direction estimated at a position $(x,y)$ in a video block and a second gradient component $Gy(x,y)$ in a second direction estimated at the position $(x,y)$ in the video block, wherein the first gradient component and the second gradient component are based on an intermediate prediction sample value of a prediction sample $P(x,y)$ at the position $(x,y)$, wherein a final prediction sample value of the prediction sample P(x,y) is based on the intermediate prediction sample value, and wherein x and y are integer numbers; and encoding a bitstream representation of the video block to include a residue sample value Res(x,y) based on a reconstructed sample value Rec(x,y) at the position (x,y), wherein the reconstructed sample value Rec(x,y) is based on the final prediction sample value of a prediction sample P(x,y) and the residue sample value Res(x,y).

A eighth example of a video processing method includes determining a refined prediction sample P'(x,y) at a position (x,y) in an affine coded video block by modifying a prediction sample P(x,y) at the position (x,y) with a first gradient component Gx(x, y) in a first direction estimated at the position (x,y) and a second gradient component Gy(x, y) in a second direction estimated at the position (x,y) and a first motion displacement Vx(x,y) estimated for the position (x,y) and a second motion displacement Vy(x,y) estimated for the position (x,y), wherein the first direction is orthogonal to the second direction, and wherein x and y are integer numbers; determining a reconstructed sample value Rec(x,y) at the position (x,y) based on the refined prediction sample P'(x,y) and a residue sample value Res(x,y); determining a refined reconstructed sample value Rec'(x,y) at the position (x,y) in the affine coded video block, wherein Rec'(x,y)=Rec(x,y)+ Gx(x,y)×Vx(x,y)+Gy(x,y)×Vy(x,y); and performing a conversion between the affine coded video block and a bitstream representation of the affine coded video block using the refined reconstructed sample value Rec'(x,y).

A ninth example of a video processing method includes determining a refined prediction sample P'(x,y) at a position (x,y) in an affine coded video block by modifying a prediction sample P(x,y) at the position (x,y) with a first gradient component Gx(x, y) in a first direction estimated at the position (x,y) and a second gradient component Gy(x, y) in a second direction estimated at the position (x,y) and a first motion displacement Vx(x,y) estimated for the position (x,y) and a second motion displacement Vy(x,y) estimated for the position (x,y), wherein the first direction is orthogonal to the second direction, and wherein x and y are integer numbers; determining a reconstructed sample value Rec(x,y) at the position (x,y) based on the refined prediction sample P'(x,y) and a residue sample value Res(x,y); determining a refined reconstructed sample value Rec'(x,y) at the position (x,y) in the affine coded video block, wherein Rec'(x,y)=Rec(x,y)+ Gx(x,y)×Vx(x,y)+Gy(x,y)×Vy(x,y); and encoding a bitstream representation of the affine coded video block to include the residue sample value Res(x,y).

A tenth example of a video processing method includes determining, for a video block in an affine mode, a motion vector with a 1/N pixel precision; determining a motion displacement vector (Vx(x,y), Vy(x,y)) estimated for a position (x,y) in the video block, wherein the motion displacement vector is derived with a 1/M pixel precision, wherein N and M are positive integers, and wherein x and y are integer numbers; and performing a conversion between the video block and a bitstream representation of the video block using the motion vector, and the motion displacement vector.

A eleventh example of a video processing method includes determining two sets of motion vectors for a video block or for a sub-block of the video block, wherein each of the two sets of motion vectors has a different motion vector pixel precision, and wherein the two sets of motion vectors are determined using a temporal motion vector prediction (TMVP) technique or using a sub-block based temporal motion vector prediction (SbTMVP) technique; and performing a conversion between the video block and a bitstream representation of the video block based on the two sets of motion vectors.

A twelfth example of a video processing method includes performing an interweaved prediction technique on a video block coded using an affine coding mode by splitting the video block into multiple partitions using K sub-block patterns, where K is an integer greater than 1; generating prediction samples of the video block by performing a motion compensation using a first of the K sub-block patterns, wherein a prediction sample at a position (x,y) is denoted as P(x,y), wherein x and y are integer numbers; determining, for at least one of remaining of the K sub-block patterns, denoted as Lth pattern, an offset value OL(x,y) at the position (x,y) based on prediction samples derived with a first sub-block pattern, and a difference between motion vectors derived using the first of the K sub-block patterns and the Lth pattern; determining a final prediction sample for the position (x,y) as a function of OL(x,y) and P(x,y); and performing a conversion between a bitstream representation of the video block and the video block using the final prediction sample.

A thirteenth example of a video processing method includes performing a conversion between a bitstream representation of a video block and the video block using a final prediction sample, wherein the final prediction sample is derived from refined intermediate prediction samples by: (a) performing, based on a rule, an interweaved prediction technique followed by an optical flow-based prediction refinement technique, or (b) performing a motion compensation technique.

A fourteenth example of a video processing method includes performing a conversion between a bitstream representation of a video block and the video block using a final prediction sample when bi-prediction is applied, wherein the final prediction sample is derived from refined intermediate prediction samples by: (a) performing an optical flow-based prediction refinement technique, wherein an interweaved prediction technique is disabled, or (b) performing a motion compensation technique.

A fifteenth example of a video processing method includes performing a conversion between a bitstream representation of a video block and the video block using a prediction sample, wherein the prediction sample is derived from refined intermediate prediction samples by performing an optical flow-based prediction refinement technique, wherein the performing the optical-flow based prediction refinement technique depends on only of a first set of motion displacement Vx(x,y) estimated in a first direction for the video block or a second set of motion displacement Vy(x,y) estimated in a second direction for the video block, wherein x and y are integer numbers, and wherein the first direction is orthogonal to the second direction.

A sixteenth example of a video processing method includes obtaining a refined motion vector for a video block by refining a motion vector for the video block, wherein the motion vector is refined prior to performing a motion compensation technique, wherein the refined motion vector has a 1/N pixel precision, and wherein the motion vector has a 1/M pixel precision; obtaining a final prediction sample by performing an optical flow-based prediction refinement technique on the video block, wherein the optical flow-based prediction refinement technique is applied to a difference between the refined motion vector and the motion vector; and performing a conversion between a bitstream representation of the video block and the video block using the final prediction sample.

A seventeenth example of a video processing method includes determining, using a multi-step decoder-side motion vector refinement process a video block, a final motion vector, wherein the final motion vector has a 1/N pixel precision; and performing conversion between the current block and the bitstream representation using the final motion vector.

A eighteenth example of a video processing method includes obtaining refined intermediate prediction samples of a video block by performing an interweaved prediction technique and an optical flow-based prediction refinement technique on intermediate prediction samples of the video block; deriving a final prediction sample from the refined intermediate prediction samples; and performing a conversion between a bitstream representation of the video block and the video block using the final prediction sample.

A nineteenth example of a video processing method includes obtaining refined intermediate prediction samples of a video block by performing an interweaved prediction technique and an phase-variant affine subblock motion compensation (PAMC) technique on intermediate prediction samples of the video block; deriving a final prediction sample from the refined intermediate prediction samples; and performing a conversion between a bitstream representation of the video block and the video block using the final prediction sample.

A twentieth example of a video processing method includes obtaining refined intermediate prediction samples of a video block by performing an optical flow-based prediction refinement technique and an phase-variant affine subblock motion compensation (PAMC) technique on intermediate prediction samples of the video block; deriving a final prediction sample from the refined intermediate prediction samples; and performing a conversion between a bitstream representation of the video block and the video block using the final prediction sample.

A twenty-first example of a video processing method includes determining, during a conversion between a video block and a bitstream representation of the video block, a refined prediction sample P'(x,y) at a position (x,y) in the video block by modifying a prediction sample P(x,y) at the position (x,y) as a function of gradients in a first direction and/or a second direction estimated at the position (x,y) and a first motion displacement and/or a second motion displacement estimated for the position (x,y), and performing the conversion using a reconstructed sample value Rec(x,y) at the position (x,y) from the refined prediction sample P'(x,y).

A twenty-second example of a video processing method includes determining a first displacement vector Vx(x,y) and a second displacement vector Vy(x,y) are at a position (x,y) in a video block corresponding to an optical flow based method of coding the video block based on information from a neighboring block or a basic block, and performing a conversion between the video block and a bitstream representation of the current video block using the first displacement vector and the second displacement vector.

A twenty-third example of a video processing method includes determining, during a conversion between a video block and a bitstream representation of the video block, a refined prediction sample P'(x,y) at a position (x,y) in the video block by modifying a prediction sample P(x,y) at the position (x,y), and wherein a gradient in a first direction and a gradient in a second direction at the position (x,y) are determined based on a final prediction value determined from the refined prediction sample P'(x,y) and a residual sample value at the position (x,y), and performing the conversion using the gradient in the first direction and the gradient in the second direction.

A twenty-fourth example of a video processing method includes determining a reconstructed sample Rec(x,y) at a position (x,y) in a video block that is affined coded, refining Rec(x,y) using first and second displacement vectors and first and second gradients at the position (x,y) to obtained a refined reconstruction sample Rec'(x,y, and performing a conversion between the video block and a bitstream representation of the current video block using the refined reconstruction sample.

A twenty-fifth example of a video processing method includes performing, during a conversion between a video block that is coded using an affine coding mode and a bitstream representation of the video block, an interweaved prediction of the video block by splitting the video block into multiple partitions using K sub-block patterns, where K is an integer greater than 1, performing a motion compensation using a first of the K sub-block patterns to generate prediction samples of the video block, wherein a prediction sample at a position (x,y) is denoted as P(x,y), determining, for at least one of remaining of the K sub-block patterns, denoted as Lth pattern, an offset value OL(x,y) at the position (x,y) based on P(x,y) and a different between motion vectors derived using the first of the K sub-blocks and the Lth pattern, determining a final prediction sample for the position (x,y) as a function of OL(x,y) and P(x,y); and performing the conversion using the final prediction sample.

In yet another example aspect, a video encoder apparatus configured to implement one of the methods described in this patent document is disclosed.

In yet another example aspect, a video decoder apparatus configured to implement one of the methods described in this patent document is disclosed.

In yet another aspect, a computer-readable medium is disclosed. A processor-executable code for implementing one of the methods described in this patent document is stored on the computer-readable medium. Thus, non-transitory computer readable medium having code for implementing a method recited in any of the above-described methods and methods described in this patent document.

These, and other aspects are described in detail in the present document.

BRIEF DESCRIPTION OF DRAWINGS

FIG. 7 shows an example of combined bi-predictive merge candidate.

FIG. 26 shows an example of how to derive Vx(x,y) and/or Vy(x,y).

DETAILED DESCRIPTION

Figure 1:
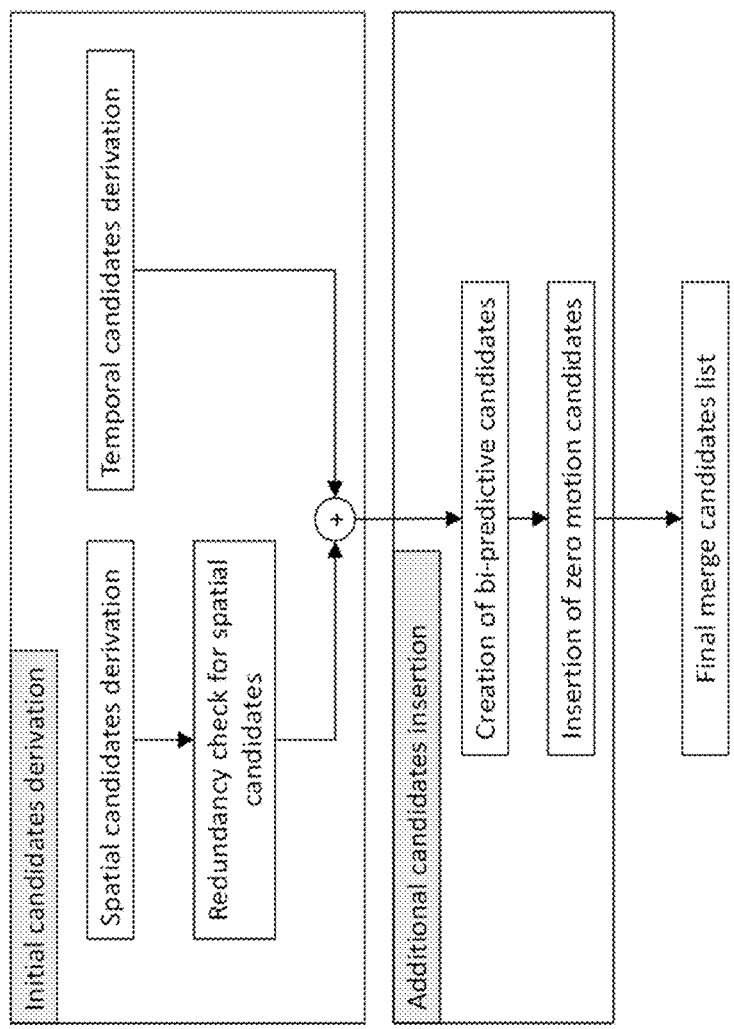
FIG. 1 shows an example derivation process for merge candidates list construction.

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. SUMMARY

This techniques described in this patent document are related to video coding technologies. Specifically, the described techniques are related to motion compensation in video coding. It may be applied to the existing video coding standard like HEVC, or the standard (Versatile Video Coding) to be finalized. It may be also applicable to future video coding standards or video codec.

2. BACKGROUND

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 2) could be found at: http://phenix.it-sudparis.eu/jvet/doc_end_user/documents/11_Ljubljana/wg11/JVET-K1001-v7.zip The latest reference software of VVC, named VTM, could be found at: https://vcgit.hhi.fraunhofer.de/jvet/VVCSoftware_VTM/tags/VTM-2.1

2.1 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Merge Mode
2.1.1.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.1.2 Spatial Candidates Derivation

Figure 2:
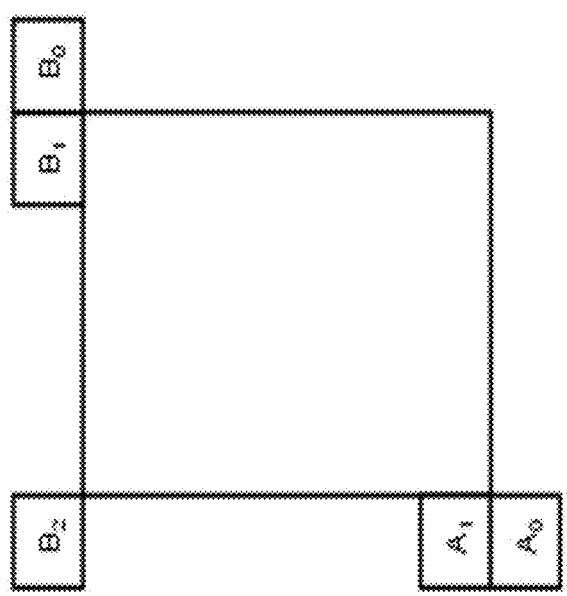
FIG. 2 shows example positions of spatial merge candidates.
Figure 3:
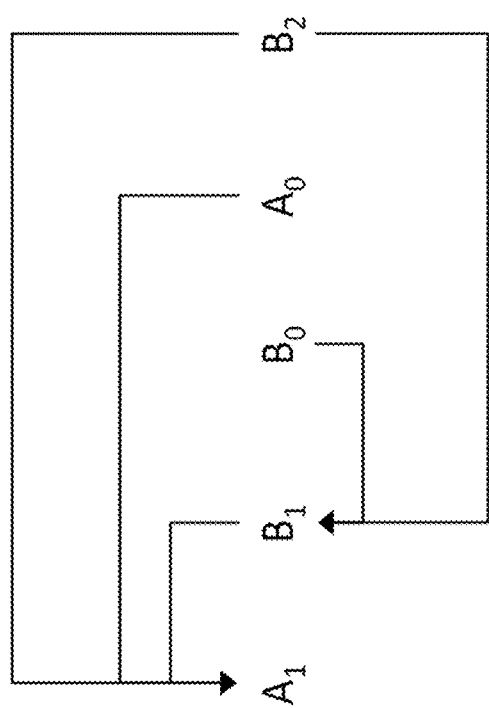
FIG. 3 shows example candidate pairs considered for redundancy check of spatial merge candidates.
Figure 4:
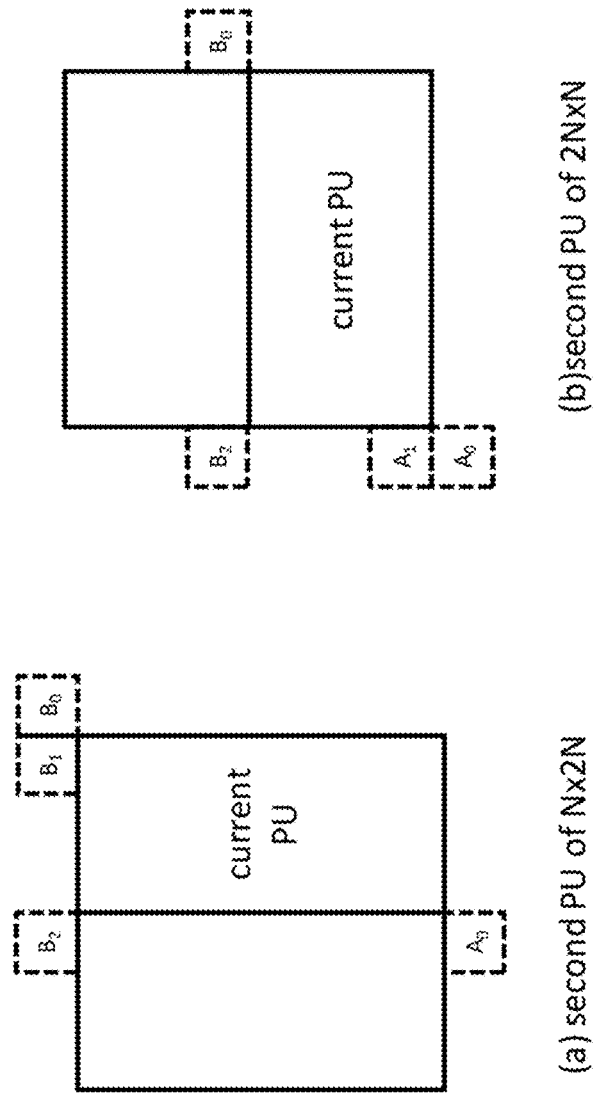
FIG. 4 shows example positions for the second PU of N×2N and 2N×N partitions.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.1.3 Temporal Candidates Derivation

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 5:
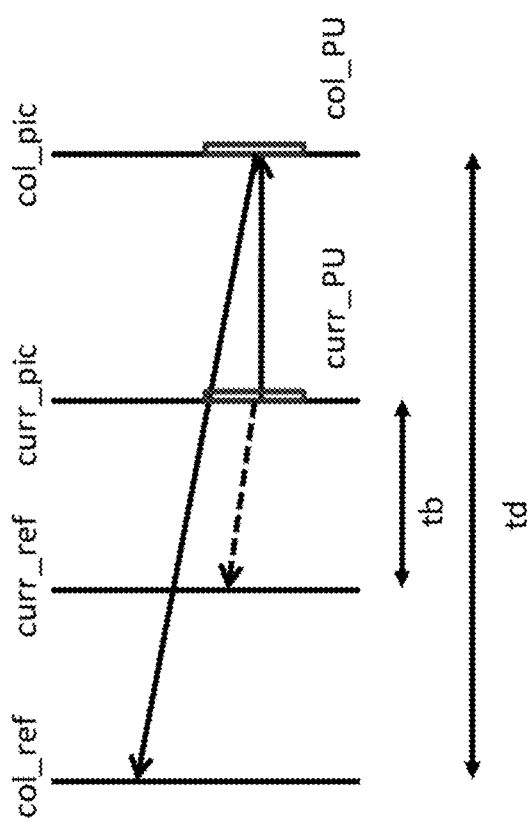
FIG. 5 shows an illustration of motion vector scaling for temporal merge candidate.

FIG. 5 shows an illustration of motion vector scaling for temporal merge candidate.

Figure 6:
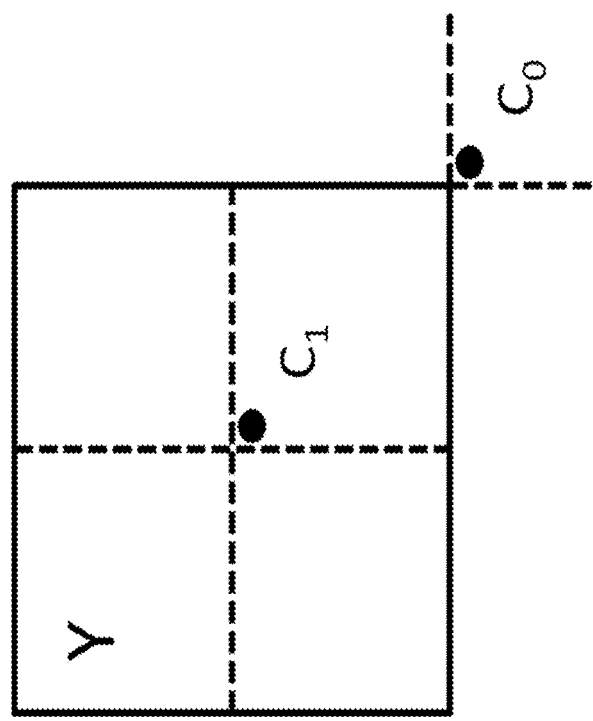
FIG. 6 shows example candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU row, position $C_1$ is used. Otherwise, position C0 is used in the derivation of the temporal merge candidate.

FIG. 6 shows example candidate positions for temporal merge candidate, C0 and C1.

2.1.1.4 Additional Candidates Insertion

Figure 7:
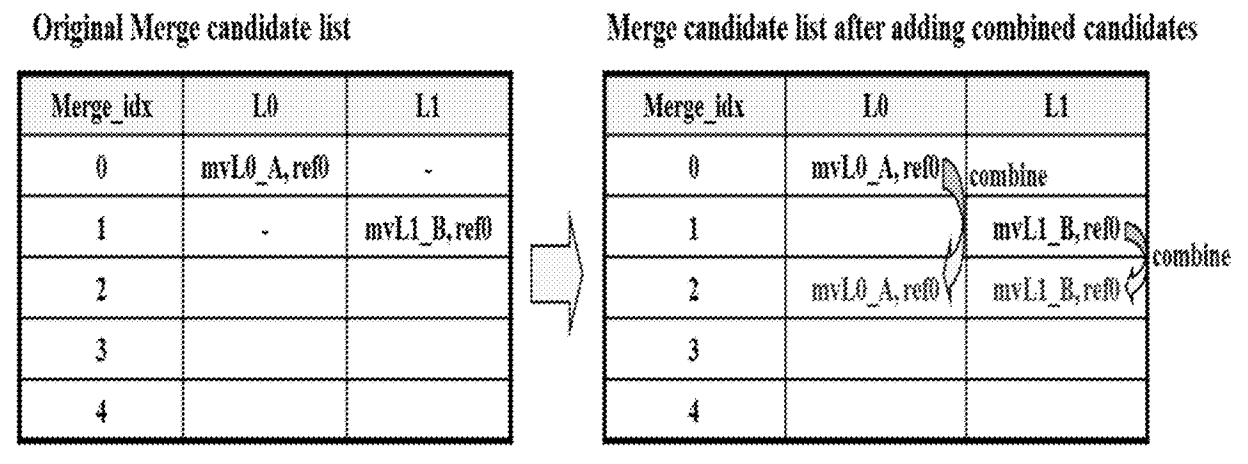

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.1.1.5 Motion Estimation Regions for Parallel Processing

To speed up the encoding process, motion estimation can be performed in parallel whereby the motion vectors for all prediction units inside a given region are derived simultaneously. The derivation of merge candidates from spatial neighbourhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using the "log 2_parallel_merge_level_minus2" syntax element. When a MER is defined, merge candidates falling in the same region are marked as unavailable and therefore not considered in the list construction.

2.1.2 AMVP

Figure 8:
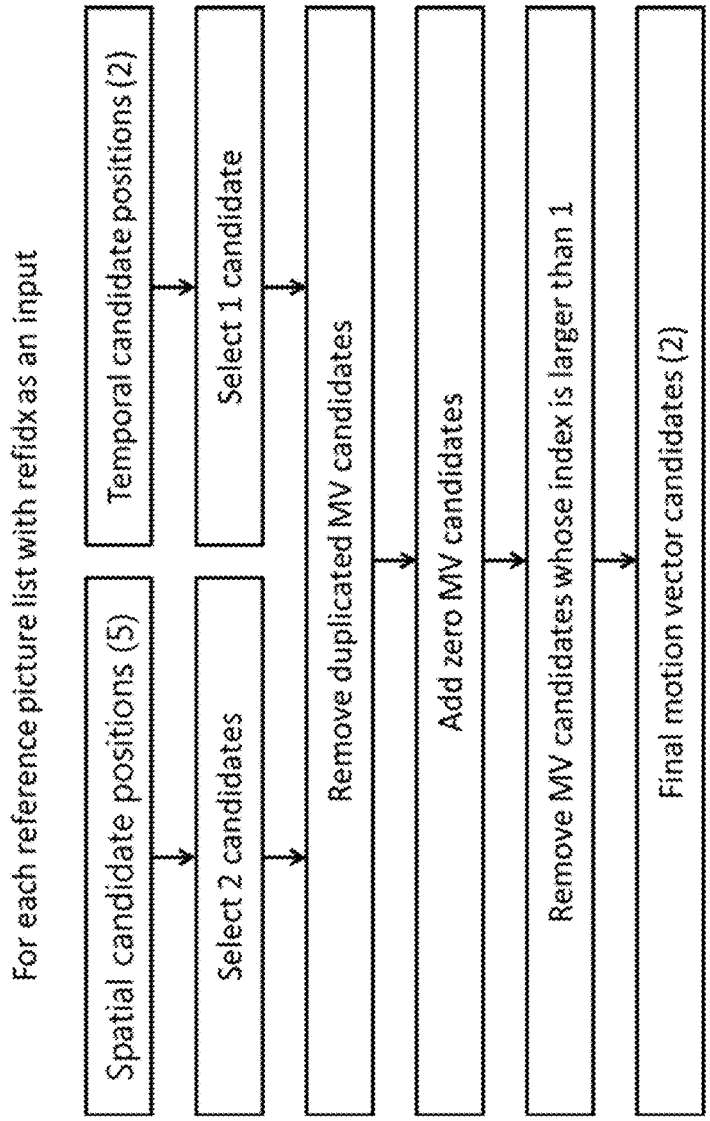
FIG. 8 summarizes derivation process for motion vector prediction candidate.

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.2.1 Derivation of AMVP Candidates

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.2.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
(1) Same reference picture list, and same reference picture index (same POC)
(2) Different reference picture list, but same reference picture (same POC)
Spatial scaling
(3) Same reference picture list, but different reference picture (different POC)
(4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
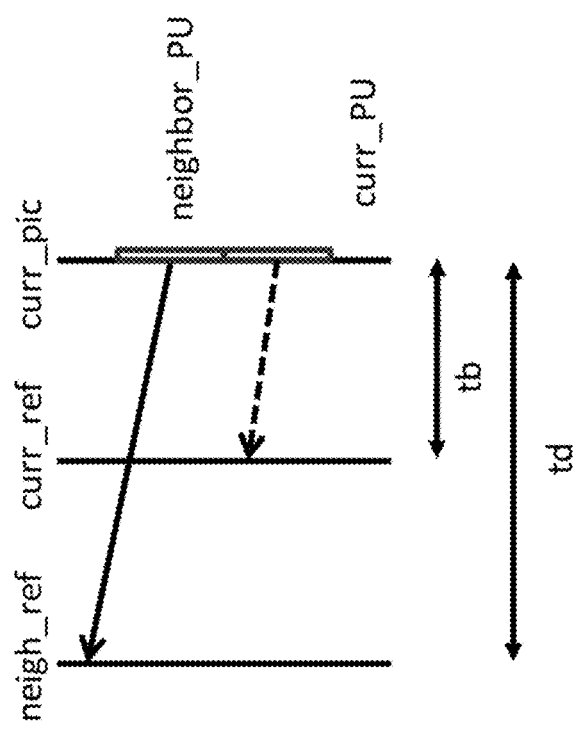
FIG. 9 shows an illustration of motion vector scaling for spatial motion vector candidate.

FIG. 9 shows an illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.2.3 Temporal Motion Vector Candidates

Apart for the reference picture index derivation, all processes for the derivation of temporal merge candidates are the same as for the derivation of spatial motion vector candidates (see FIG. 6). The reference picture index is signaled to the decoder.

2.2 New Inter Prediction Methods in JEM 2.2.1 Sub-CU Based Motion Vector Prediction In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

2.2.1.1 Alternative Temporal Motion Vector Prediction

Figure 10:
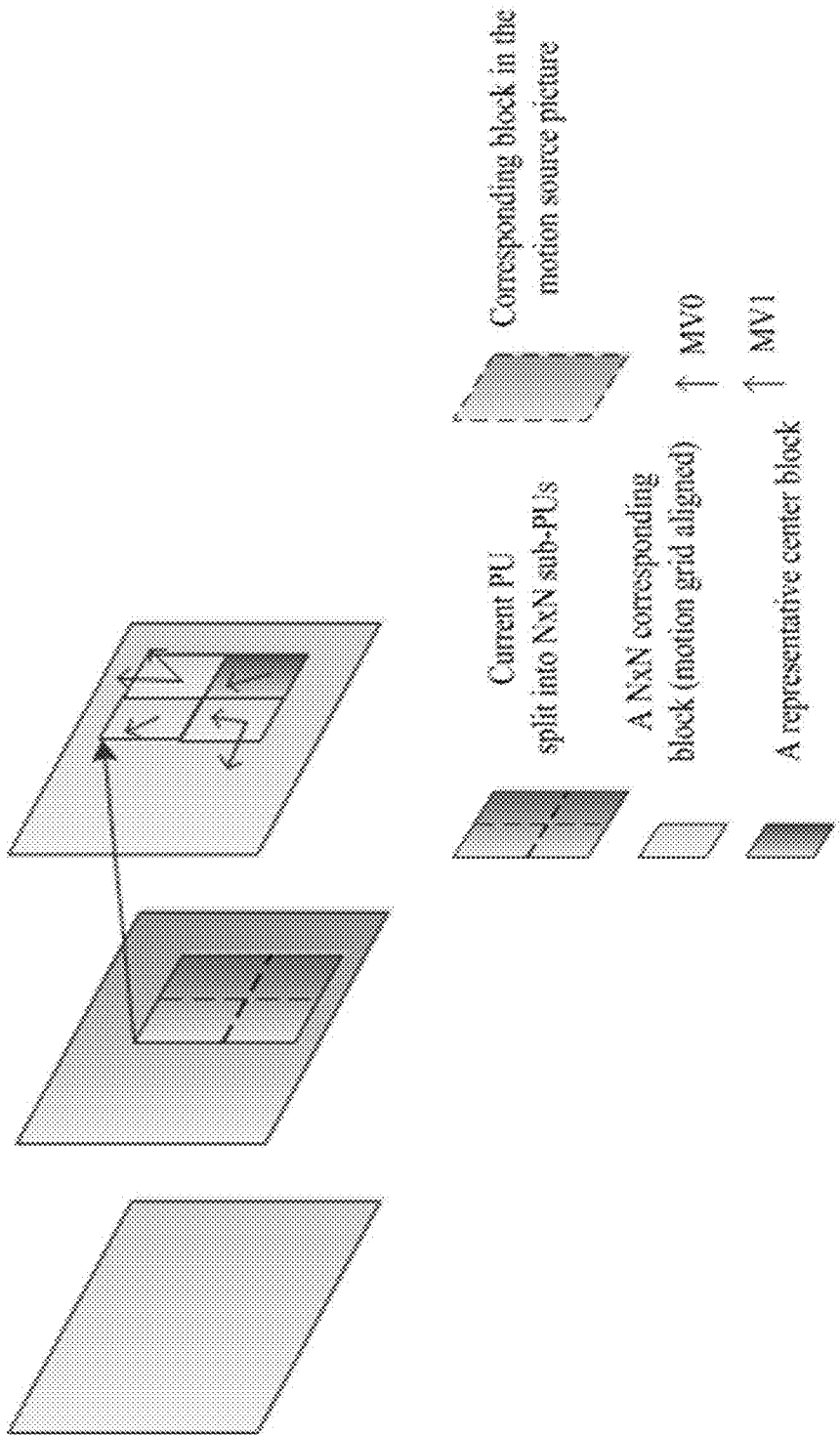
FIG. 10 shows an example of advanced temporal motion vector predictor ATMVP motion prediction for a coding unit CU.

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in FIG. 10, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 10.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1−X) for each sub-CU.

2.2.1.2 Spatial-Temporal Motion Vector Prediction

Figure 11:
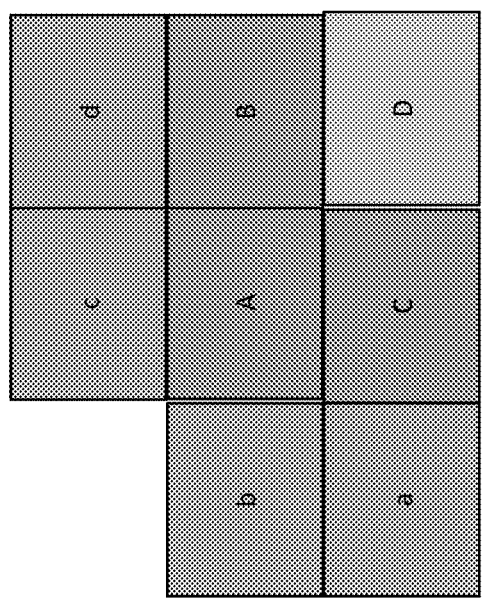
FIG. 11 shows an example of one CU with four sub-blocks (A-D) and its neighbouring blocks (a-d).

In this method, the motion vectors of the sub-CUs are derived recursively, following raster scan order. FIG. 11 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

2.2.1.3 Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index are context coded by CABAC. While in HEVC, only the first bin is context coded and the remaining bins are context by-pass coded.

2.2.2 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.2.3 Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with skip/merge mode. For the CU coded with normal AMVP mode, either the integer-pel or quarter-pel motion is used, as described in section 0.

SHVC upsampling interpolation filters, which have same filter length and normalization factor as HEVC motion compensation interpolation filters, are used as motion compensation interpolation filters for the additional fractional pel positions. The chroma component motion vector accuracy is 1/32 sample in the JEM, the additional interpolation filters of 1/32 pel fractional positions are derived by using the average of the filters of the two neighbouring 1/16 pel fractional positions.

2.2.4 Overlapped Block Motion Compensation

Figure 12:
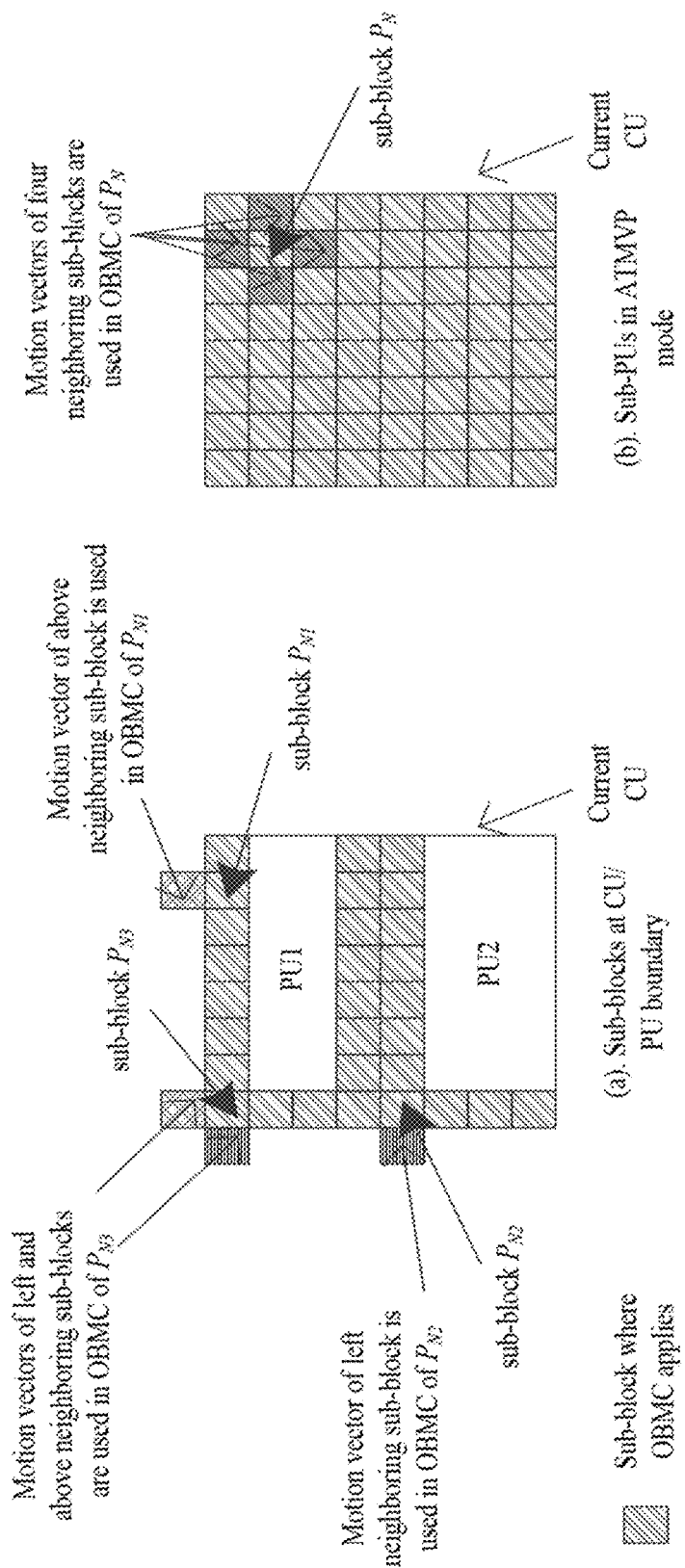
FIG. 12 is an example illustration of sub-blocks where OBMC applies.

Overlapped Block Motion Compensation (OBMC) has previously been used in H.263. In the JEM, unlike in H.263, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, a MC block is corresponding to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as illustrated in FIG. 12.

When OBMC applies to the current sub-block, besides current motion vectors, motion vectors of four connected neighbouring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighbouring sub-block is denoted as $P_N$, with N indicating an index for the neighbouring above, below, left and right sub-blocks and prediction block based on motion vectors of the current sub-block is denoted as $P_C$. When $P_N$ is based on the motion information of a neighbouring sub-block that contains the same motion information to the current sub-block, the OBMC is not performed from $P_N$. Otherwise, every sample of $P_N$ is added to the same sample in $P_C$, i.e., four rows/columns of $P_N$ are added to $P_C$. The weighting factors {¼, ⅛, 1/16, 1/32} are used for $P_N$ and the weighting factors {¾, ⅞, 15/16, 31/32} are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors {¼, ⅛} are used for $P_N$ and weighting factors {¾, ⅞} are used for $P_C$. For $P_N$ generated based on motion vectors of vertically (horizontally) neighbouring sub-block, samples in the same row (column) of $P_N$ are added to $P_C$ with a same weighting factor.

In the JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighbouring block and the left neighbouring block is used to compensate the top and left boundaries of the original signal of the current CU, and then the normal motion estimation process is applied.

2.2.5 Local Illumination Compensation

Local Illumination Compensation (LIC) is based on a linear model for illumination changes, using a scaling factor a and an offset b. And it is enabled or disabled adaptively for each inter-mode coded coding unit (CU).

Figure 13:
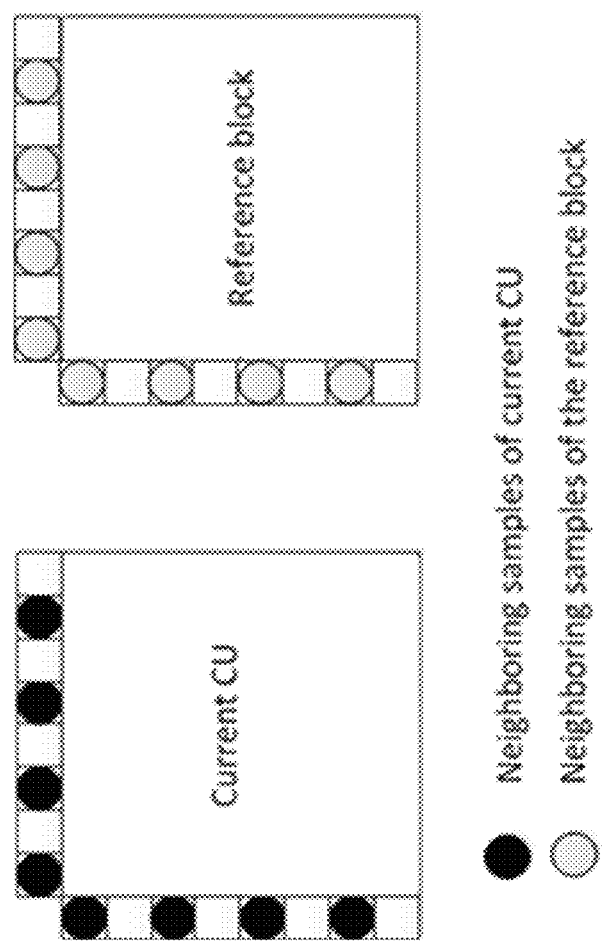
FIG. 13 shows examples of neighbouring samples used for deriving IC parameters.

FIG. 13 shows examples of neighbouring samples used for deriving IC parameters.

When LIC applies for a CU, a least square error method is employed to derive the parameters a and b by using the neighbouring samples of the current CU and their corresponding reference samples. More specifically, as illustrated in FIG. 13, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighbouring blocks, in a way similar to motion information copy in merge mode; otherwise, an LIC flag is signalled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.2.6 Affine Motion Compensation Prediction

Figure 14:
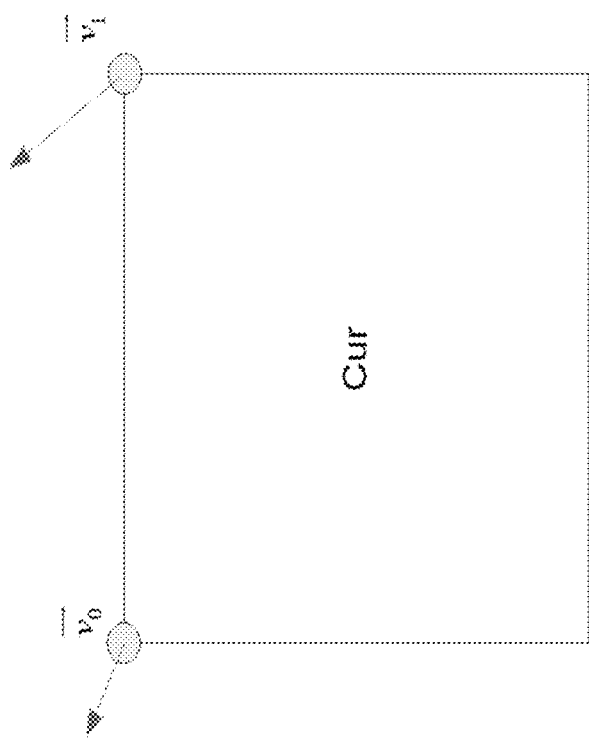
FIG. 14 shows a simplified affine motion model.

In HEVC, only translation motion model is applied for motion compensation prediction (MCP). While in the real world, there are many kinds of motion, e.g. zoom in/out, rotation, perspective motions and the other irregular motions. In the JEM, a simplified affine transform motion compensation prediction is applied. As shown FIG. 14, the affine motion field of the block is described by two control point motion vectors.

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1)$$

Where $(v_{0x}, v_{0y})$ is motion vector of the top-left corner control point, and $(v_{1x}, v_{1y})$ is motion vector of the top-right corner control point.

In order to further simplify the motion compensation prediction, sub-block based affine transform prediction is applied. The sub-block size M×N is derived as in Equation 2, where MvPre is the motion vector fraction accuracy (1/16 in JEM), $(v_{2x}, v_{2y})$ is motion vector of the bottom-left control point, calculated according to Equation 1.

$$\begin{cases} M = clip3\left(4, w, \frac{w \times MvPre}{\max(abs(v_{1x} - v_{0x}), abs(v_{1y} - v_{0y}))}\right) \\ N = clip3\left(4, h, \frac{h \times MvPre}{\max(abs(v_{2x} - v_{0x}), abs(v_{2y} - v_{0y}))}\right) \end{cases} \quad (2)$$

After derived by Equation 2, M and N should be adjusted downward if necessary to make it a divisor of w and h, respectively.

Figure 15:
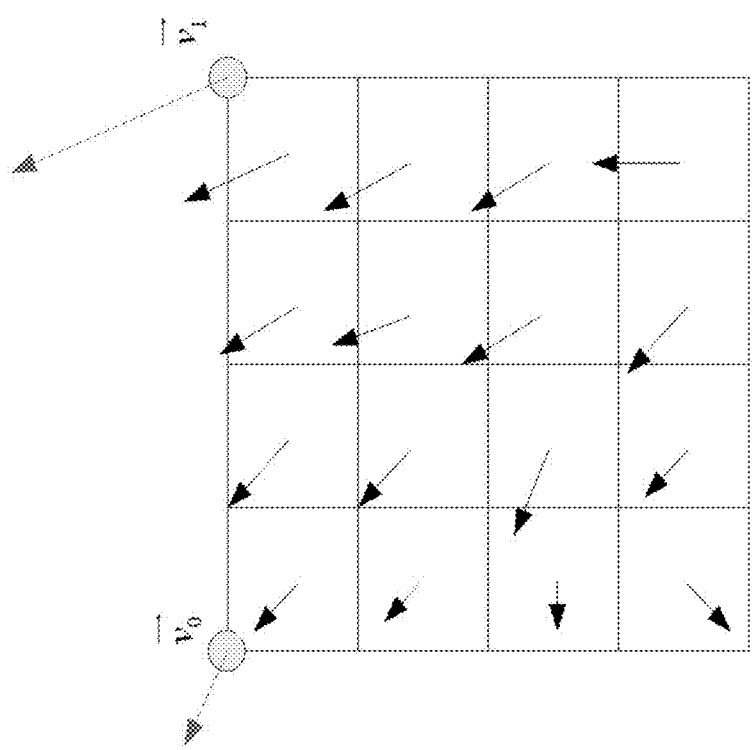
FIG. 15 shows an example of affine MVF per sub-block.

To derive motion vector of each M×N sub-block, the motion vector of the center sample of each sub-block, as shown in FIG. 15, is calculated according to Equation 1, and rounded to 1/16 fraction accuracy. Then the motion compensation interpolation filters mentioned in section 0 are applied to generate the prediction of each sub-block with derived motion vector.

After MCP, the high accuracy motion vector of each sub-block is rounded and saved as the same accuracy as the normal motion vector.

Figure 16:
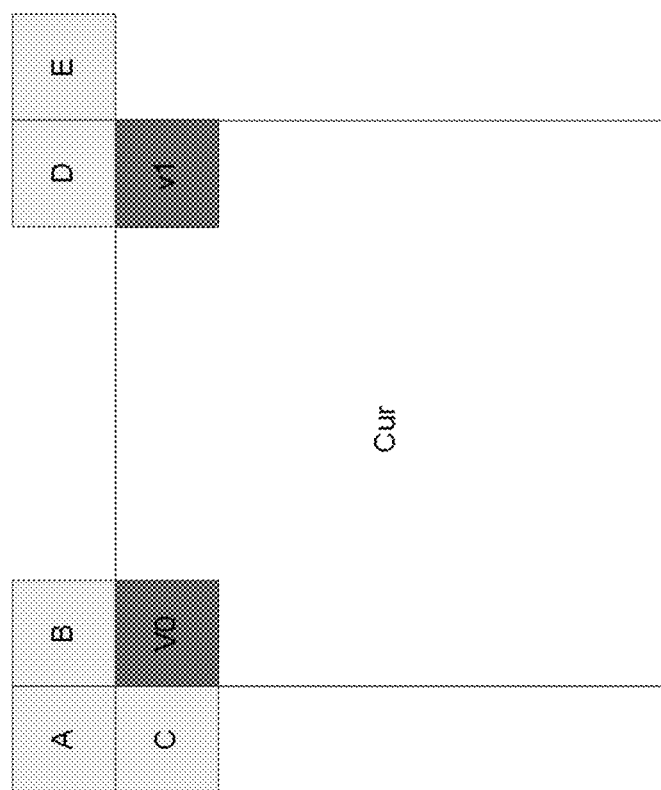
FIG. 16 shows an example of MVP for AF_INTER.

In the JEM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a candidate list with motion vector pair $\{(v_0, v_1)|v_0=\{v_A, v_B, v_C\}, v_1=\{v_D, v_E\}\}$ is constructed using the neighbour blocks. As shown in FIG. 16, $v_0$ is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select $v_1$ from the neighbour block D and E is similar. If the number of candidate list is smaller than 2, the list is padded by the motion vector pair composed by duplicating each of the AMVP candidates. When the candidate list is larger than 2, the candidates are firstly sorted according to the consistency of the neighbouring motion vectors (similarity of the two motion vectors in a pair candidate) and only the first two candidates are kept. An RD cost check is used to determine which motion vector pair candidate is selected as the control point motion vector prediction (CPMVP) of the current CU. And an index indicating the position of the CPMVP in the candidate list is signalled in the bitstream. After the CPMVP of the current affine CU is determined, affine motion estimation is applied and the control point motion vector (CPMV) is found. Then the difference of the CPMV and the CPMVP is signalled in the bitstream.

Figure 17B:
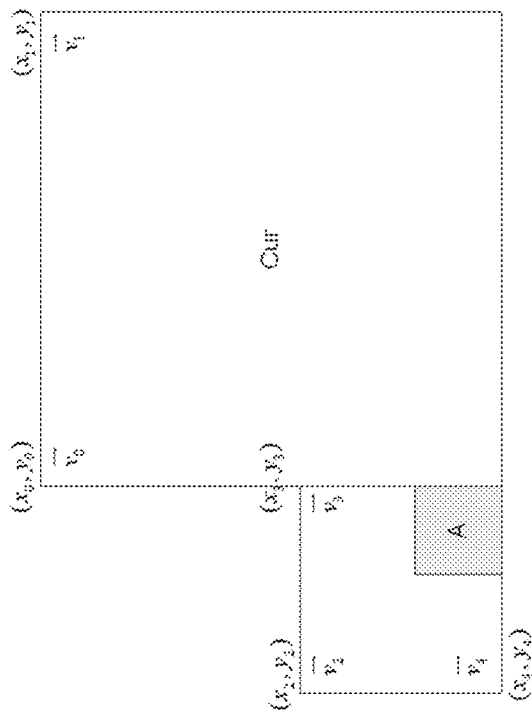
FIG. 17A-17B show Candidates for AF_MERGE.
Figure 17A:
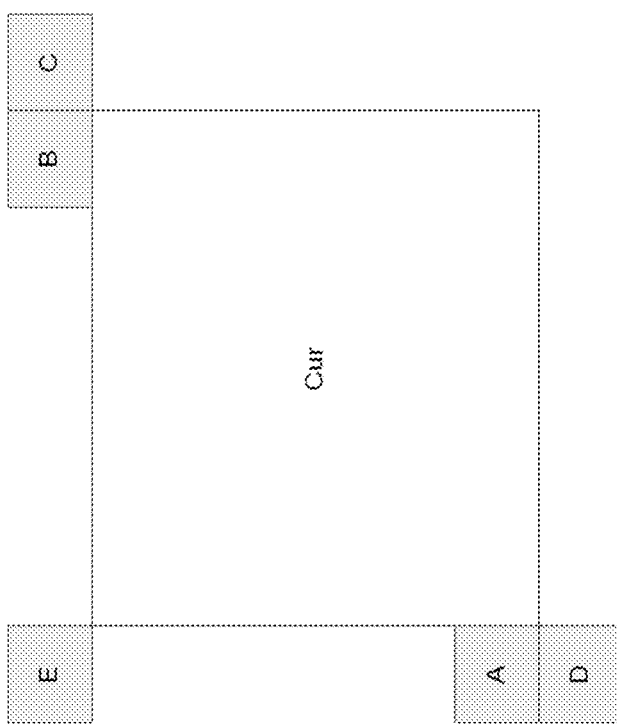

When a CU is applied in AF_MERGE mode, it gets the first block coded with affine mode from the valid neighbour reconstructed blocks. And the selection order for the candidate block is from left, above, above right, left bottom to above left as shown in FIG. 17A. If the neighbour left bottom block A is coded in affine mode as shown in FIG. 17B, the motion vectors $v_2$, $v_3$ and $v_4$ of the top left corner, above right corner and left bottom corner of the CU which contains the block A are derived. And the motion vector $v_0$ of the top left corner on the current CU is calculated according to $v_2$, $v_3$ and $v_4$. Secondly, the motion vector $v_1$ of the above right of the current CU is calculated.

After the CPMV of the current CU $v_0$ and $v_1$ are derived, according to the simplified affine motion model Equation 1, the MVF of the current CU is generated. In order to identify whether the current CU is coded with AF_MERGE mode, an affine flag is signalled in the bitstream when there is at least one neighbour block is coded in affine mode.

2.2.7 Pattern Matched Motion Vector Derivation

Pattern matched motion vector derivation (PMMVD) mode is a special merge mode based on Frame-Rate Up Conversion (FRUC) techniques. With this mode, motion information of a block is not signalled but derived at decoder side.

A FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \qquad (3)$$

Figure 18:
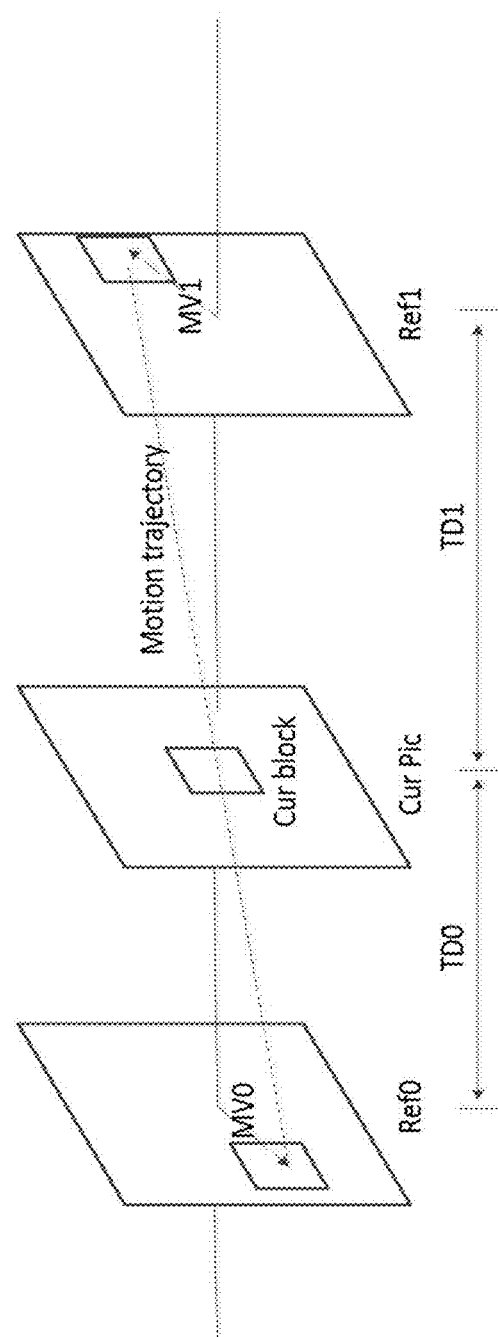
FIG. 18 shows an example of Bilateral matching.

As shown in the FIG. 18, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 19:
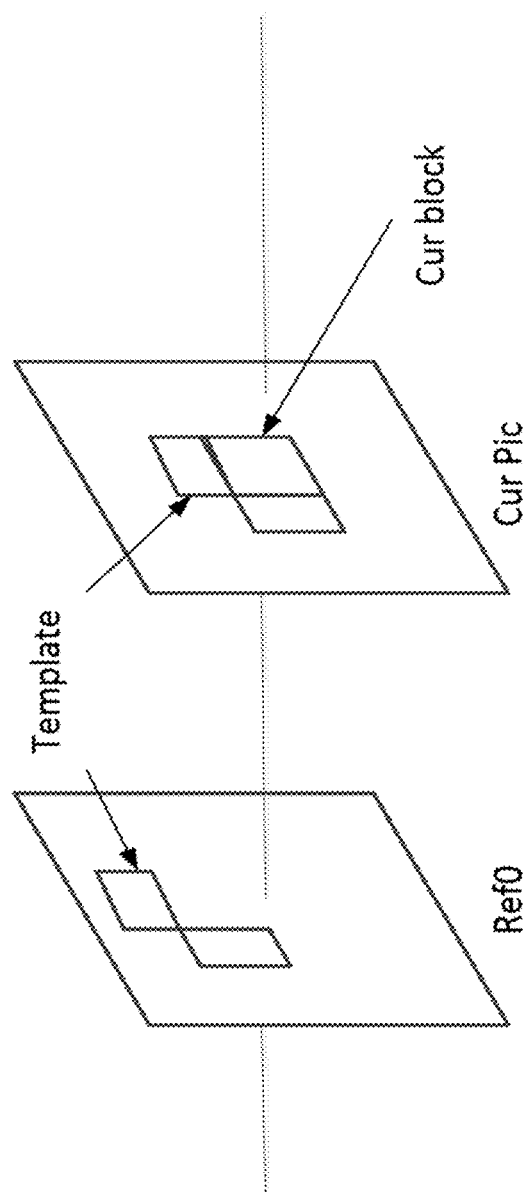
FIG. 19 shows an example of template matching.

As shown in FIG. 19, template matching is used to derive motion information of the current CU by finding the closest match between a template (top and/or left neighbouring blocks of the current CU) in the current picture and a block (same size to the template) in a reference picture. Except the aforementioned FRUC merge mode, the template matching is also applied to AMVP mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

2.2.7.1 CU Level MV Candidate Set

The MV candidate set at CU level consists of:

(i) Original AMVP candidates if the current CU is in AMVP mode (ii) all merge candidates, (iii) several MVs in the interpolated MV field, which is introduced in section 0.

(iv) top and left neighbouring motion vectors

When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

2.2.7.2 Sub-CU Level MV Candidate Set

The MV candidate set at sub-CU level consists of:
(i) an MV determined from a CU-level search,
(ii) top, left, top-left and top-right neighbouring MVs,
(iii) scaled versions of collocated MVs from reference pictures,
(iv) up to 4 ATMVP candidates,
(v) up to 4 STMVP candidates The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones.

At the sub-CU level, up to 17 MVs are added to the candidate list.

2.2.7.3 Generation of Interpolated MV Field

Before coding a frame, interpolated motion field is generated for the whole picture based on unilateral ME. Then the motion field may be used later as CU level or sub-CU level MV candidates.

Figure 20:
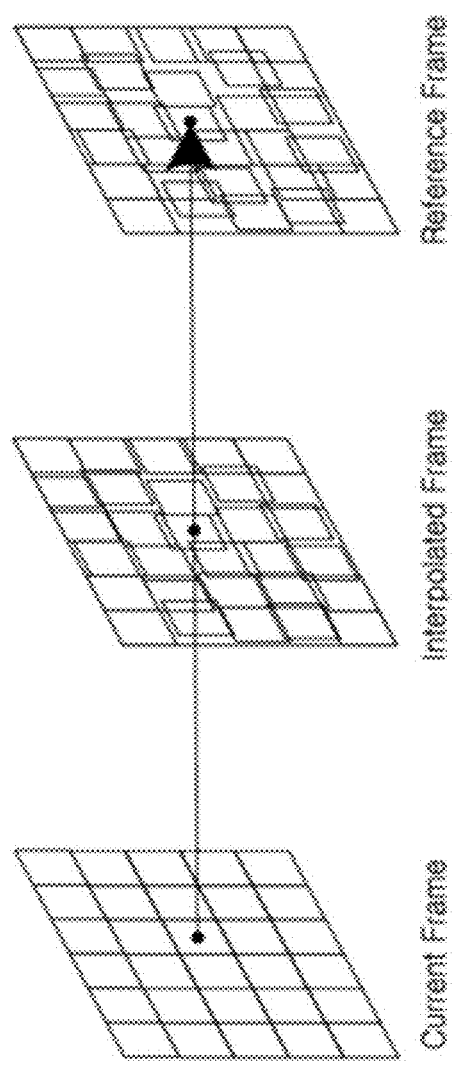
FIG. 20 shows an example of unilateral motion estimation ME in frame rate upconversion FRUC.

First, the motion field of each reference pictures in both reference lists is traversed at 4×4 block level. For each 4×4 block, if the motion associated to the block passing through a 4×4 block in the current picture (as shown in FIG. 20) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

2.2.7.4 Interpolation and Matching Cost

When a motion vector points to a fractional sample position, motion compensated interpolation is needed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \qquad (4)$$

where w is a weighting factor which is empirically set to 4, MV and $MV^s$ indicate the current MV and the starting MV, respectively. SAD is still used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

2.2.7.5 MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

2.2.7.6 Selection of Prediction Direction in Template Matching FRUC Merge Mode

In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

```
If costBi <= factor * min (cost0, cost1)
    bi-prediction is used;
Otherwise, if cost0 <= cost1
    uni-prediction from list0 is used;
Otherwise,
    uni-prediction from list1 is used;
``` where cost0 is the SAD of list0 template matching, cost1 is the SAD of list1 template matching and costBi is the SAD of bi-prediction template matching. The value of factor is equal to 1.25, which means that the selection process is biased toward bi-prediction.

The inter prediction direction selection is only applied to the CU-level template matching process.

2.2.8 Generalized Bi-Prediction Improvement

Generalized Bi-prediction improvement (GBi) proposed in JVET-L0646 is adopted into VTM-3.0.

GBi was proposed in JVET-O0047. JVET-K0248 improved the gain-complexity trade-off for GBi and was adopted into BMS2.1. The BMS2.1 GBi applies unequal weights to predictors from L0 and L1 in bi-prediction mode. In inter prediction mode, multiple weight pairs including the equal weight pair (½, ½) are evaluated based on rate-distortion optimization (RDO), and the GBi index of the selected weight pair is signaled to the decoder. In merge mode, the GBi index is inherited from a neighboring CU. In BMS2.1 GBi, the predictor generation in bi-prediction mode is shown in Equation (1).

$$P_{GBi}=(w_0*P_{L0}+w_1*P_{L1}+\text{RoundingOffset}_{GBi})\text{>>shift-Num}_{GBi},$$

where $P_{GBi}$ is the final predictor of GBi. $w_0$ and $w_1$ are the selected GBi weight pair and applied to the predictors of list 0 (L0) and list 1 (L1), respectively. RoundingOffset$_{GBi}$ and shiftNum$_{GBi}$ are used to normalize the final predictor in GBi. The supported $w_1$ weight set is $\{-¼, ⅜, ½, ⅝, 5/4\}$, in which the five weights correspond to one equal weight pair and four unequal weight pairs. The blending gain, i.e., sum of $w_1$ and $w_0$, is fixed to 1.0. Therefore, the corresponding $w_0$ weight set is $\{5/4, ⅝, ½, ⅜, -¼\}$. The weight pair selection is at CU-level.

For non-low delay pictures, the weight set size is reduced from five to three, where the $w_1$ weight set is $\{⅜, ½, ⅝\}$ and the $w_0$ weight set is $\{⅝, ½, ⅜\}$. The weight set size reduction for non-low delay pictures is applied to the BMS2.1 GBi and all the GBi tests in this contribution.

In this JVET-L0646, one combined solution based on JVET-L0197 and JVET-L0296 is proposed to further improve the GBi performance Specifically, the following modifications are applied on top of the existing GBi design in the BMS2.1.

2.2.8.1 GBi Encoder Bug Fix

To reduce the GBi encoding time, in current encoder design, the encoder will store uni-prediction motion vectors estimated from GBi weight equal to ⅘, and reuse them for uni-prediction search of other GBi weights. This fast encoding method is applied to both translation motion model and affine motion model. In VTM2.0, 6-parameter affine model was adopted together with 4-parameter affine model. The BMS2.1 encoder does not differentiate 4-parameter affine model and 6-parameter affine model when it stores the uni-prediction affine MVs when GBi weight is equal to ⅘. Consequently, 4-parameter affine MVs may be overwritten by 6-parameter affine MVs after the encoding with GBi weight ⅘. The stored 6-parameter affine MVs may be used for 4-parameter affine ME for other GBi weights, or the stored 4-parameter affine MVs may be used for 6-parameter affine ME. The proposed GBi encoder bug fix is to separate the 4-parameter and 6-parameter affine MVs storage. The encoder stores those affine MVs based on affine model type when GBi weight is equal to ⅘, and reuse the corresponding affine MVs based on the affine model type for other GBi weights.

2.2.8.2 GBi Encoder Speed-Up

Five encoder speed-up methods are proposed to reduce the encoding time when GBi is enabled.

(1) Skipping Affine Motion Estimation for Some GBi Weights Conditionally

In BMS2.1, affine ME including 4-parameter and 6-parameter affine ME is performed for all GBi weights. We propose to skip affine ME for those unequal GBi weights (weights unequal to ⅘) conditionally. Specifically, affine ME will be performed for other GBi weights if and only if the affine mode is selected as the current best mode and it is not affine merge mode after evaluating the GBi weight of ⅘. If current picture is non-low-delay picture, the bi-prediction ME for translation model will be skipped for unequal GBi weights when affine ME is performed. If affine mode is not selected as the current best mode or if affine merge is selected as the current best mode, affine ME will be skipped for all other GBi weights.

(2) Reducing the Number of Weights for RD Cost Checking for Low-Delay Pictures in the Encoding for 1-Pel and 4-Pel MVD Precision For low-delay pictures, there are five weights for RD cost checking for all MVD precisions including ¼-pel, 1-pel and 4-pd. The encoder will check RD cost for ¼-pel MVD precision first. We propose to skip a portion of GBi weights for RD cost checking for 1-pel and 4-pel MVD precisions. We order those unequal weights according to their RD cost in ¼-pel MVD precision. Only the first two weights with the smallest RD costs, together with GBi weight ⅘, will be evaluated during the encoding in 1-pel and 4-pel MVD precisions. Therefore, three weights at most will be evaluated for 1-pel and 4-pel MVD precisions for low delay pictures.

(3) Conditionally Skipping Bi-Prediction Search when the L0 and L1 Reference Pictures are the Same For some pictures in RA, the same picture may occur in both reference picture lists (list-0 and list-1). For example, for random access coding configuration in CTC, the reference picture structure for the first group of pictures (GOP) is listed as follows.

| | |
|---|---|
| POC: 16, TL: 0, [L0: 0] | [L1: 0] |
| POC: 8, TL: 1, [L0: 0 16] | [L1: 16 0] |
| POC: 4, TL: 2, [L0: 0 8] | [L1: 8 16] |
| POC: 2, TL: 3, [L0: 0 4] | [L1: 4 8] |
| POC: 1, TL: 4, [L0: 0 2] | [L1: 2 4] |
| POC: 3, TL: 4, [L0: 2 0] | [L1: 4 8] |
| POC: 6, TL: 3, [L0: 4 0] | [L1: 8 16] |
| POC: 5, TL: 4, [L0: 4 0] | [L1: 6 8] |
| POC: 7, TL: 4, [L0: 6 4] | [L1: 8 16] |
| POC: 12, TL: 2, [L0: 8 0] | [L1: 16 8] |
| POC: 10, TL: 3, [L0: 8 0] | [L1: 12 16] |
| POC: 9, TL: 4, [L0: 8 0] | [L1: 10 12] |
| POC: 11, TL: 4, [L0: 10 8] | [L1: 12 16] |
| POC: 14, TL: 3, [L0: 12 8] | [L1: 12 16] |
| POC: 13, TL: 4, [L0: 12 8] | [L1: 14 16] |
| POC: 15, TL: 4, [L0: 14 12] | [L1: 16 14] |

We can see that pictures 16, 8, 4, 2, 1, 12, 14 and 15 have the same reference picture(s) in both lists. For bi-prediction for these pictures, it is possible that the L0 and L1 reference pictures are the same. We propose that the encoder skips bi-prediction ME for unequal GBi weights when 1) two reference pictures in bi-prediction are the same and 2) temporal layer is greater than 1 and 3) the MVD precision is ¼-pel. For affine bi-prediction ME, this fast skipping method is only applied to 4-parameter affine ME.

(4) Skipping RD Cost Checking for Unequal GBi Weight Based on Temporal Layer and the POC Distance Between Reference Picture and Current Picture We propose to skip those RD cost evaluations for those unequal GBi weights when the temporal layer is equal to 4 (highest temporal layer in RA) or the POC distance between reference picture (either list-0 or list-1) and current picture is equal to 1 and coding QP is greater than 32.

(5) Changing Floating-Point Calculation to Fixed-Point Calculation for Unequal GBi Weight During ME For existing bi-prediction search, the encoder will fix the MV of one list and refine MV in another list. The target is modified before ME to reduce the computation complexity. For example, if the MV of list-1 is fixed and encoder is to refine MV of list-0, the target for list-0 MV refinement is modified with Eq. (5). O is original signal and $P_1$ is the prediction signal of list-1. w is GBi weight for list-1.

$$T=((O<<3)-w*P_1)*(1/(8-w)) \quad (5)$$

Where the term $(1/(8-w))$ is stored in floating point precision, which increases computation complexity. We propose to change Eq. (5) to fixed-point as Eq. (6).

$$T=(O*a_1-P_1*a_2+\text{round})>>N \quad (6)$$

where $a_1$ and $a_2$ are scaling factors and they are calculated as:

$\gamma=(1<<N)/(8-w); a_1=\gamma<<3; a_2=\gamma*w;$ round=$1<<(N-1)$

2.2.8.3 CU Size Constraint for GBi

In this method, GBi is disabled for small CUs. In inter prediction mode, if bi-prediction is used and the CU area is smaller than 128 luma samples, GBi is disabled without any signaling.

2.2.9 Bi-Directional Optical Flow
2.2.9.1 Theoretical Analysis

In BIO, motion compensation is first performed to generate the first predictions (in each prediction direction) of the current block. The first predictions are used to derive the spatial gradient, the temporal gradient and the optical flow of each subblock/pixel within the block, which are then used to generate the second prediction, i.e., the final prediction of the subblock/pixel. The details are described as follows.

Bi-directional Optical flow (BIO) is sample-wise motion refinement which is performed on top of block-wise motion compensation for bi-prediction. The sample-level motion refinement doesn't use signalling.

Figure 21:
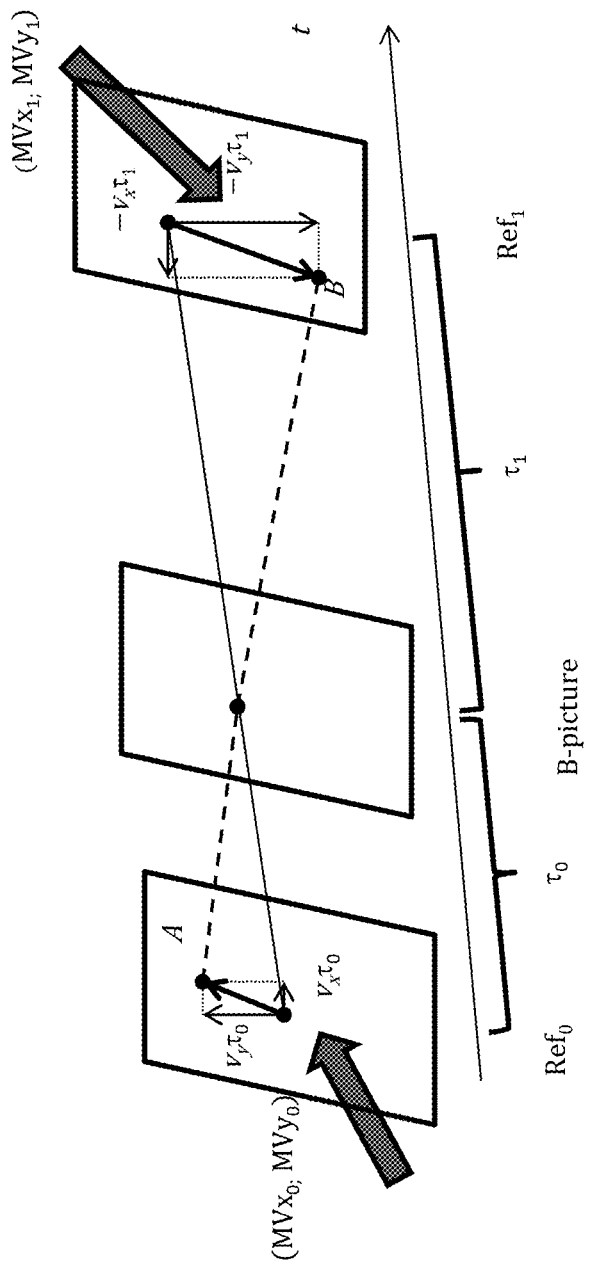
FIG. 21 shows an example of optical flow trajectory.

FIG. 21 shows an example of an optical flow trajectory.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by an equation $$\partial I^{(k)}/\partial t + v_x \partial I^{(k)}/\partial x + v_y \partial I^{(k)}/\partial y = 0. \quad (7)$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$\text{pred}_{BIO} = \frac{1}{2} \cdot (I^{(0)} + I^{(1)}) + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad (8)$$

Here, $\tau_0$ and $\tau_1$ denote the distances to the reference frames as shown on a FIG. 21. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (either both from the past or both from the future) then the signs are different (i.e., $\tau_0 \cdot \tau_1 < 0$). In this case, BIO is applied only if the prediction is not from the same time moment (i.e., $\tau_0 \neq \tau_1$), both referenced regions have non-zero motion ($MVx_0, MVy_0, MVx_1, MVy_1 \neq 0$) and the block motion vectors are proportional to the time distance ($MVx_0/MVx_1 = MVy_0/MVy_1 = -\tau_0/\tau_1$).

The motion vector field $(v_x, v_y)$ is determined by minimizing the difference $\Delta$ between values in points A and B (intersection of motion trajectory and reference frame planes on FIG. 9). Model uses only first linear term of a local Taylor expansion for $\Delta$:

$$\Delta = (I^{(0)} - I^{(1)}) + v_x(\tau_1 \partial I^{(1)}/\partial x + \tau_0 \partial I^{(0)}/\partial x) + v_y(\tau_1 \partial I^{(1)}/\partial y - \tau_0 \partial I^{(0)}/\partial y)) \quad (9)$$

All values in Equation (9) depend on the sample location (i', j'), which was omitted from the notation so far. Assuming the motion is consistent in the local surrounding area, we minimize $\Delta$ inside the (2M+1)×(2M+1) square window $\Omega$ centered on the currently predicted point (i, j), where M is equal to 2:

$$(v_x, v_y) = \arg\min_{v_x, v_y} \sum_{[i', j'] \in \Omega} \Delta^2[i', j'] \quad (10)$$

For this optimization problem, the JEM uses a simplified approach making first a minimization in the vertical direction and then in the horizontal direction. This results in $$v_x = (s_1 + r) > m ? clip3\left(-thBIO, thBIO, -\frac{s_3}{(s_1 + r)}\right) : 0 \quad (11)$$

$$v_y = (s_5 + r) > m ? clip3\left(-thBIO, thBIO, -\frac{s_6 - v_x s_2/2}{(s_5 + r)}\right) : 0 \quad (12)$$

where, $$s_1 = \sum_{[i', j'] \in \Omega} (\tau_1 \partial I^{(1)}/\partial x + \tau_0 \partial I^{(0)}/\partial x)^2; \quad (13)$$

$$s_3 = \sum_{[i', j'] \in \Omega} (I^{(1)} - I^{(0)})(\tau_1 \partial I^{(1)}/\partial x + \tau_0 \partial I^{(0)}/\partial x);$$

$$s_2 = \sum_{[i', j'] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i', j'] \in \Omega} (\tau_1 \partial I^{(1)}/\partial y + \tau_0 \partial I^{(0)}/\partial y)^2;$$

$$s_6 = \sum_{[i', j'] \in \Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m are introduced in Equations (11) and (12).

$$r = 500 \cdot 4^{d-8} \quad (14)$$

$$m = 700 \cdot 4^{d-8} \quad (15)$$

Here d is bit depth of the video samples.

Figure 22B:
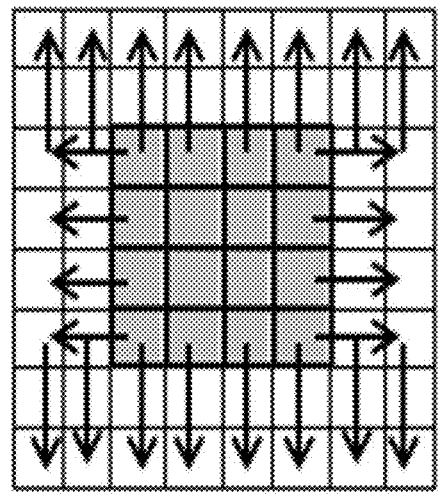
FIG. 22A-22B show examples of access positions outside of the block and an example of how padding is used in order to avoid extra memory access and calculation
Figure 22A:
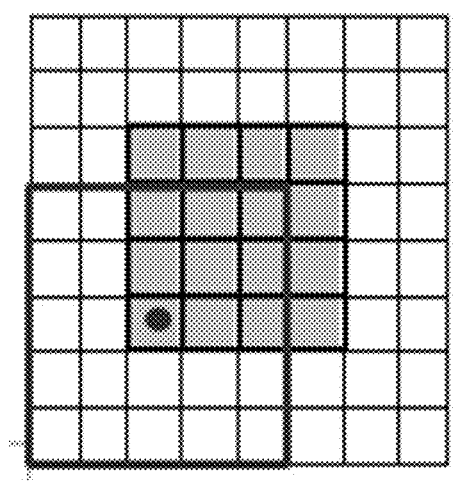

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated only for positions inside the current block. In Equation (13), 2M+1)×(2M+1) square window $\Omega$ centered in currently predicted point on a boundary of predicted block needs to accesses positions outside of the block (as shown in FIG. 22A). In the JEM, values of $I^{(k)}$, $\partial I^{(k)}/\partial x$, $\partial I^{(k)}/\partial y$, outside of the block are set to be equal to the nearest available value inside the block. For example, this can be implemented as padding, as shown in FIG. 22B.

With BIO, it's possible that the motion field can be refined for each sample. To reduce the computational complexity, a block-based design of BIO is used in the JEM. The motion refinement is calculated based on 4×4 block. In the block-based BIO, the values of $s_n$ in Equation (13) of all samples in a 4×4 block are aggregated, and then the aggregated values of $s_n$ in are used to derived BIO motion vectors offset for the 4×4 block. More specifically, the following formula is used for block-based BIO derivation:

$$s_{1,b_k} = \sum_{(x,y) \in b_k} \sum_{[i', j'] \in \Omega(x,y)} (\tau_1 \partial I^{(1)}/\partial x + \tau_0 \partial I^{(0)}/\partial x)^2; \quad (16)$$

$$s_{3,b_k} = \sum_{(x,y) \in b_k} \sum_{[i', j'] \in \Omega} (I^{(1)} - I^{(0)})(\tau_1 \partial I^{(1)}/\partial x + \tau_0 \partial I^{(0)}/\partial x);$$

$$s_{2,b_k} = \sum_{(x,y) \in b_k} \sum_{[i', j'] \in \Omega} (\tau_1 \partial I^{(1)}/\partial x + \tau_0 \partial I^{(0)}/\partial x)$$

-continued $$s_{5,b_k} = \sum_{(x,y)\in b_k} \sum_{[i',j]\in\Omega} (\tau_1 \partial I^{(1)}/\partial y + \tau_0 \partial I^{(0)}/\partial y);$$

$$(\tau_1 \partial I^{(1)}/\partial y + \tau_0 \partial I^{(0)}/\partial y)^2;$$

$$s_{6,b_k} = \sum_{(x,y)\in b_k} \sum_{[i',j]\in\Omega} (I^{(1)} - I^{(0)})(\tau_1 \partial I^{(1)}/\partial y + \tau_0 \partial I^{(0)}/\partial y)$$

where $b_k$ denotes the set of samples belonging to the k-th 4×4 block of the predicted block. $s_n$ in Equations (11) and (12) are replaced by $((s_{n,bk})\gg 4)$ to derive the associated motion vector offsets.

In some cases, MV regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12\times 2^{14-d}$; otherwise, it is set to $12\times 2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case of horizontal gradient $\partial I/\partial x$ signal first interpolated vertically using BIOfilterS corresponding to the fractional position fracY with de-scaling shift d−8, then gradient filter BIOfilterG is applied in horizontal direction corresponding to the fractional position fracX with de-scaling shift by 18−d. In case of vertical gradient $\partial I/\partial y$ first gradient filter is applied vertically using BIOfilterG corresponding to the fractional position fracY with de-scaling shift d−8, then signal displacement is performed using BIOfilterS in horizontal direction corresponding to the fractional position fracX with de-scaling shift by 18−d. The length of interpolation filter for gradients calculation BIOfilterG and signal displacement BIOfilterF is shorter (6-tap) in order to maintain reasonable complexity. Table 1 shows the filters used for gradients calculation for different fractional positions of block motion vector in BIO.

Table 2 shows the interpolation filters used for prediction signal generation in BIO.

TABLE 1

Filters for gradients calculation in BIO

| Fractional pel position | Interpolation filter for gradient(BIOfilterG) |
|---|---|
| 0 | { 8, −39, −3, 46, −17, 5} |
| 1/16 | { 8, −32, −13, 50, −18, 5} |
| 1/8 | { 7, −27, −20, 54, −19, 5} |
| 3/16 | { 6, −21, −29, 57, −18, 5} |
| 1/4 | { 4, −17, −36, 60, −15, 4} |
| 5/16 | { 3, −9, −44, 61, −15, 4} |
| 3/8 | { 1, −4, −48, 61, −13, 3} |
| 7/16 | { 0, 1, −54, 60, −9, 2} |
| 1/2 | { −1, 4, −57, 57, −4, 1} |

TABLE 2

Interpolation filters for prediction signal generation in BIO

| Fractional pel position | Interpolation filter for prediction signal(BIOfilterS) |
|---|---|
| 0 | { 0, 0, 64, 0, 0, 0} |
| 1/16 | { 1, −3, 64, 4, −2, 0} |
| 1/8 | { 1, −6, 62, 9, −3, 1} |
| 3/16 | { 2, −8, 60, 14, −5, 1} |
| 1/4 | { 2, −9, 57, 19, −7, 2} |
| 5/16 | { 3, −10, 53, 24, −8, 2} |
| 3/8 | { 3, −11, 50, 29, −9, 2} |
| 7/16 | { 3, −11, 44, 35, −10, 3} |
| 1/2 | { 3, −10, 35, 44, −11, 3} |

In the JEM, BIO is applied to all bi-predicted blocks when the two predictions are from different reference pictures. When LIC is enabled for a CU, BIO is disabled.

In the JEM, OBMC is applied for a block after normal MC process. To reduce the computational complexity, BIO is not applied during the OBMC process. This means that BIO is only applied in the MC process for a block when using its own MV and is not applied in the MC process when the MV of a neighboring block is used during the OBMC process.

2.2.9.2 BIO in VTM-3.0 as proposed in JVET-L0256

Step 1: Judge Whether BIO is Applicable (W and H are Width and Height of Current Block)

BIO is not applicable if
Affine coded
ATMVP coded
(iPOC−iPOC0)*(iPOC−iPOC1)>=0
H==4 or (W==4 and H==8)
With Weighted Prediction
GBi weights are not (1,1)
BIO is not used if
Total SAD between the two reference blocks (denoted as R0 and R1) is smaller than a threshold.

$$SAD = \sum_{(x,y)} |R0(x, y) - R1(x, y)|$$

Step 2: Data Preparation

For a W×H block, (W+2)×(H+2) samples are interpolated.

The inner W×H samples are interpolated with the 8-tap interpolation filter as in normal motion compensation.

Figure 23:
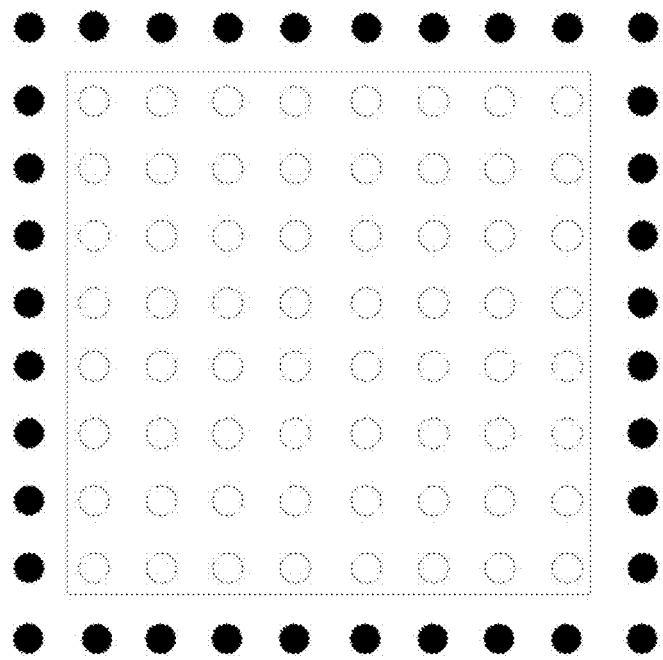
FIG. 23 shows examples of interpolated samples used in BIO

The four side outer lines of samples (black circles in FIG. 23) are interpolated with the bi-linear filter.

For each position, gradients are calculated on the two reference blocks (denoted as R0 and R1)

$$Gx0(x,y)=(R0(x+1,y)-R0(x-1,y))\gg 4$$

$$Gy0(x,y)=(R0(x,y+1)-R0(x,y-1))\gg 4$$

$$Gx1(x,y)=(R1(x+1,y)-R1(x-1,y))\gg 4$$

$$Gy1(x,y)=(R1(x,y+1)-R1(x,y-1))\gg 4$$

For each position, internal values are calculated as $$T1=(R0(x,y)\gg 6)-(R1(x,y)\gg 6), T2=(Gx0(x,y)+Gx1(x,y))\gg 3, T3=(Gy0(x,y)+Gy1(x,y))\gg 3$$

$$B1(x,y)=T2*T2, B2(x,y)=T2*T3, B3(x,y)=-T1*T2, B5(x,y)=T3*T3, B6(x,y)=-T1*T3$$

Step 3: Calculate Prediction for Each Block

BIO is skipped for a 4×4 block if SAD between the two 4×4 reference blocks is smaller than a threshold.

Calculate Vx and Vy.

Calculate the final prediction for each position in the 4×4 block.

$$b(x,y)=(Vx(Gx^0(x,y)-Gx^1(x,y))+Vy(Gy^0(x,y)-Gy^1(x,y))+1)>>1$$

$$P(x,y)=(R^0(x,y)+R^1(x,y)+b(x,y)+\text{offset})>>\text{shift}$$

b(x,y) is known as a correction item.

2.2.9.3 BIO in VTM-3.0

The section numbers below refer to the sections in the current version of the VVC standards document.

8.3.4 Decoding Process for Inter Blocks

If predFlagL0 and predFlagL1 are equal to 1, DiffPicOrderCnt(currPic, refPicList0[refIdx0])*DiffPicOrderCnt (currPic, refPicList1[refIdx1])<0, MotionModelIdc [xCb][yCb] is equal to 0 and MergeModeList [merge_idx[xCb][yCb]] is not equal to SbCol, set the value of bioAvailableFlag to TRUE.

Otherwise, set the value of bioAvailableFlag to FALSE.

. . . (text of the original specification continues)

If bioAvailableFlag is equal to TRUE, the following is applied:

The variable shift is set equal to Max(2, 14−bitDepth).

The variables cuLevelAbsDiffThres and subCuLevelAbsDiffThres are set equal to (1<<(bitDepth−8+shift)) *cbWidth*cbHeight and 1<<(bitDepth−3+shift). The variable cuLevelSumAbsoluteDiff is set to 0.

For xSbIdx=0 . . . (cbWidth>>2)−1 and ySbIdx=0 . . . (cbHeight>>2)−1, the variable subCuLevelSumAbsoluteDiff[xSbIdx][ySbIdx] and the bidirectional optical flow utilization flag bioUtilizationFlag[xSbIdx][ySbIdx] of the current subblock are derived as:

subCuLevelSumAbsoluteDiff[xSbIdx][ySbIdx]=□Σ$_i$Σ$_j$ Abs(predSamplesL0L[(xSbIdx<<2)+1+i][(ySbIdx<<2)+1+ j]−predSamplesL1L[(xSbIdx<<2)+1+i][(xSbIdx<<2)+1+j]) with i, j=0 . . . 3 bioUtilizationFlag [xSbIdx][ySbIdx]=subCuLevelSumAbsoluteDiff[xSbIdx][ySbIdx]>=subCuLevelAbsDiffThres cuLevelSumAbsoluteDiff+=subCuLevelSumAbsoluteDiff[xSbIdx][ySbIdx]

If cuLevelSumAbsoluteDiff is smaller than cuLevelAbsDiffThres, set bioAvailableFlag to FALSE.

If bioAvailableFlag is equal to TRUE, the prediction samples inside the current luma coding subblock, predSamplesL[xL+xSb][yL+ySb] with xL=0 . . . sbWidth−1 and yL=0 . . . sbHeight−1, are derived by invoking the bi-directional optical flow sample prediction process specified in clause 8.3.4.5 with the luma coding subblock width sbWidth, the luma coding subblock height sbHeight and the sample arrays predSamplesL0L and predSamplesL1L, and the variables predFlagL0, predFlagL1, refIdxL0, refIdxL1.

8.3.4.3 Fractional Sample Interpolation Process 8.3.4.3.1 General

Inputs to this process are:

a luma location (xSb, ySb) specifying the top-left sample of the current coding subblock relative to the top left luma sample of the current picture, a variable sbWidth specifying the width of the current coding subblock in luma samples, a variable sbHeight specifying the height of the current coding subblock in luma samples, a luma motion vector mvLX given in 1/16-luma-sample units, a chroma motion vector mvCLX given in 1/32-chroma-sample units, the selected reference picture sample array refPicLXL and the arrays refPicLXCb and refPicLXCr.

the bidirectional optical flow enabling flag bioAvailableFlag.

Outputs of this process are:

an (sbWidth)×(sbHeight) array predSamplesLXL of prediction luma sample values when bioAvailableFlag is FALSE, or an (sbWidth+2)×(sbHeight+2) array predSamplesLXL of prediction luma sample values when bioAvailableFlag is TRUE.

two (sbWidth/2)×(sbHeight/2) arrays predSamplesLXCb and predSamplesLXCr of prediction chroma sample values.

Let (xIntL, yIntL) be a luma location given in full-sample units and (xFracL, yFracL) be an offset given in 1/16-sample units. These variables are used only in this clause for specifying fractional-sample locations inside the reference sample arrays refPicLXL, refPicLXCb and refPicLXCr.

When bioAvailableFlag is equal to TRUE, for each luma sample location (xL=−1 . . . sbWidth, yL=−1 . . . sbHeight) inside the prediction luma sample array predSamplesLXL, the corresponding prediction luma sample value predSamplesLXL[xL][yL] is derived as follows:

The variables xIntL, yIntL, xFracL and yFracL are derived as follows:

$$xIntL=xSb-1+(mvLX[0]>>4)+xL$$

$$yIntL=ySb-1+(mvLX[1]>>4)+yL$$

$$xFracL=mvLX[0]\ \&\ 15$$

$$yFracL=mvLX[1]\ \&\ 15$$

The value of bilinearFiltEnabledFlag is derived as follows:

If xL is equal to −1 or sbWidth, or yL is equal to −1 or sbHeight, set the value of bilinearFiltEnabledFlag to TRUE.

Else, set the value of bilinearFiltEnabledFlag to FALSE

The prediction luma sample value predSamplesLXL[xL][yL] is derived by invoking the process specified in clause 8.3.4.3.2 with (xIntL, yIntL), (xFracL, yFracL), refPicLXL and bilinearFiltEnabledFlag as inputs.

When bioAvailableFlag is equal to FALSE, for each luma sample location (xL=0 . . . sbWidth−1, yL=0 . . . sbHeight−1) inside the prediction luma sample array predSamplesLXL, the corresponding prediction luma sample value predSamplesLXL[xL][yL] is derived as follows:

The variables xIntL, yIntL, xFracL and yFracL are derived as follows:

$$xIntL=xSb+(mvLX[0]>>4)+xL$$

$$yIntL=ySb+(mvLX[1]>>4)+yL$$

$$xFracL=mvLX[0]\ \&\ 15$$

$$yFracL=mvLX[1]\ \&\ 15$$

The variable bilinearFiltEnabledFlag is set to FALSE.

The prediction luma sample value predSamplesLXL[xL][yL] is derived by invoking the process specified in clause 8.3.4.3.2 with (xIntL, yIntL), (xFracL, yFracL), and refPicLXL and bilinearFiltEnabledFlag as inputs.

. . . (text of the original specification continues)

8.3.4.5 Bi-Directional Optical Flow Prediction Process

Inputs to this process are:

two variables nCbW and nCbH specifying the width and the height of the current coding block, two (nCbW+2)×(nCbH+2) luma prediction sample arrays predSamplesL0 and predSamplesL1, the prediction list utilization flags, predFlagL0 and pred-FlagL1, the reference indices refIdxL0 and refIdxL1, the bidirectional optical flow utilization flags bioUtilizationFlag[xSbIdx][ySbIdx] with xSbIdx=0 . . . (nCbW>>2)−1, ySbIdx=0 . . . (nCbH>>2)−1

Output of this process is the (nCbW)×(nCbH) array pbSamples of luma prediction sample values.

The variable bitDepth is set equal to BitDepthY.

The variable shift2 is set equal to Max(3, 15−bitDepth) and the variable offset2 is set equal to 1<<(shift2−1).

The variable mvRefineThres is set equal to 1<< (13−bitDepth).

For xSbIdx=0 . . . (nCbW>>2)−1 and ySbIdx=0 . . . (nCbH>>2)−1,

If bioUtilizationFlag[xSbIdx][ySbIdx] is FALSE, for x=xSb . . . xSb+3, y=ySb . . . ySb+3, the prediction sample values of the current prediction unit are derived as follows:

pbSamples[x][y]=Clip3(0,(1<<bitDepth)−1, (predSamplesL0[x][y]+predSamplesL1[x][y]+offset2)
>>shift2)

Otherwise, the prediction sample values of the current prediction unit are derived as follows:

The location (xSb, ySb) specifying the top-left sample of the current subblock relative to the top left sample of prediction sample arrays predSamplesL0 and predSampleL1 is derived as follows:

xSb=(xSbIdx<<2)+1 ySb=(ySbIdx<<2)+1

For x=xSb−1 . . . xSb+4, y=ySb−1 . . . ySb+4, the followings are applied:

The locations (hx, vy) for each of the corresponding sample (x, y) inside the prediction sample arrays are derived as follows:

hx=Clip3(1,nCbW,x)

vy=Clip3(1,nCbH,y)

The variables gradientHL0[x][y], gradientVL0[x][y], gradientHL1[x][y] and gradientVL1[x][y] are derived as follows:

gradientHL0[x][y]=(predSamplesL0[hx+1][vy]−predSampleL0[hx−1][vy])>>4 gradientVL0[x][y]=(predSampleL0[hx][vy+1]−predSampleL0[hx][vy−1])>>4 gradientHL1[x][y]=(predSamplesL1[hx+1][vy]−predSampleL1[hx−1][vy])>>4 gradientVL1[x][y]=(predSampleL1[hx][vy+1]−predSampleL1[hx][vy1])>>4

The variables temp, tempX and tempY are derived as follows:

temp[x][y]=(predSamplesL0[hx][vy]>>6)−(predSamplesL1[hx][vy]>>6)

tempX[x][y]=(gradientHL0[x][y]+gradientHL1[x][y])
>>3 tempY[x][y]=(gradientVL0[x][y]+gradientVL1[x][y])
>>3

The variables sGx2, sGy2, sGxGy, sGxdI and sGydI are derived as follows:

sGx2=□Σ$_x$Σ$_y$(tempX[xSb+x][ySb+y]*tempX[xSb+x]
[ySb+y]) with x,y=−1 . . . 4 sGy2=□Σ$_x$Σ$_y$(tempY[xSb+x][ySb+y]*tempY[xSb+x]
[ySb+y]) with x,y=−1 . . . 4 sGxGy=Σ$_x$Σ$_y$(tempX[xSb+x][ySb+y]*tempY[xSb+x]
[ySb+y]) with x,y=−1 . . . 4 sGxdI=Σ$_x$Σ$_y$(−tempX[xSb+x][ySb+y]*temp[xSb+x]
[ySb+y]) with x,y=−1 . . . 4 sGydI=Σ$_x$Σ$_y$(−tempY[xSb+x][ySb+y]*temp[xSb+x]
[ySb+y]) with x,y=−1 . . . 4

The horizontal and vertical motion refinements of the current subblock are derived as:

vx=sGx2>0?Clip3(−mvRefineThres, mvRefineThres,
−(sGxdI<<3)>>Floor(Log 2(sGx2))): 0 vy=sGy2>0?Clip3(−mvRefineThres, mvRefineThres,
((sGydI<<3)−((vx*sGxGym)<<12+vx*sGxGys)
>>1)>>Floor(Log 2(sGy2))): 0 sGxGym=sGxGy>>12;

sGxGys=sGxGy&((1<<12)−1)

For x=xSb−1 . . . xSb+2, y=ySb−1 . . . ySb+2, the followings are applied:

sampleEnh=Round((vx*(gradientHL1[x+1][y+1]−
gradientHL0[x+1][y+1]))>>1)+Round((vy*(gradientVL1[x+1][y+1]−gradientVL0[x+1][y+1]))
>>1)

pbSamples[x][y]=Clip3(0,(1<<bitDepth)−1,(predSamplesL0[x+1][y+1]+predSamplesL1[x+1][y+1]+
sampleEnh+offset2)>>shift2)

2.2.10 Decoder-Side Motion Vector Refinement

DMVR is one kind of Decoder-side Motion Vector Derivation (DMVD)

In bi-prediction operation, for the prediction of one block region, two prediction blocks, formed using a motion vector (MV) of list0 and a MV of list 1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 24:
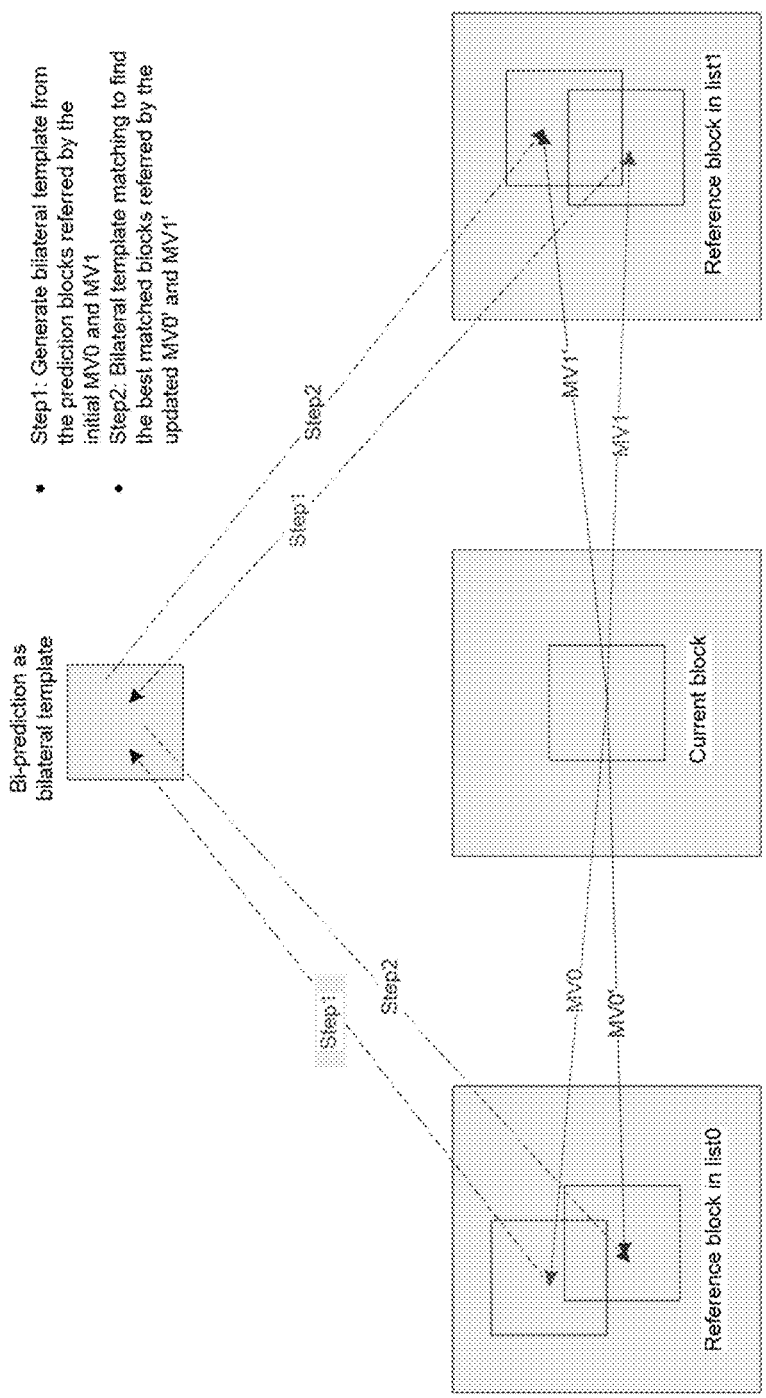
FIG. 24 shows an example of DMVR based on bilateral template matching.

In DMVR, a bilateral template is generated as the weighted combination (i.e. average) of the two prediction blocks, from the initial MV0 of list0 and MV1 of list1, respectively, as shown in FIG. 24. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 24, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

2.2.11 JVET-N0236

This contribution proposes a method to refine the sub-block based affine motion compensated prediction with optical flow. After the sub-block based affine motion compensation is performed, prediction sample is refined by adding a difference derived by the optical flow equation, which is referred as prediction refinement with optical flow (PROF). The proposed method can achieve inter prediction in pixel level granularity without increasing the memory access bandwidth.

To achieve a finer granularity of motion compensation, this contribution proposes a method to refine the sub-block based affine motion compensated prediction with optical flow. After the sub-block based affine motion compensation is performed, luma prediction sample is refined by adding a difference derived by the optical flow equation. The proposed PROF (prediction refinement with optical flow) is described as following four steps.

Step 1) The sub-block-based affine motion compensation is performed to generate sub-block prediction I(i,j).

Step 2) The spatial gradients $g_x(i, j)$ and $g_y(i,j)$ of the sub-block prediction are calculated at each sample location using a 3-tap filter [−1, 0, 1].

$$g_x(i,j)=I(i+1,j)-I(i-1,j)$$

$$g_y(i,j)=I(i,j+1)-I(i,j-1)$$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Figure 25:
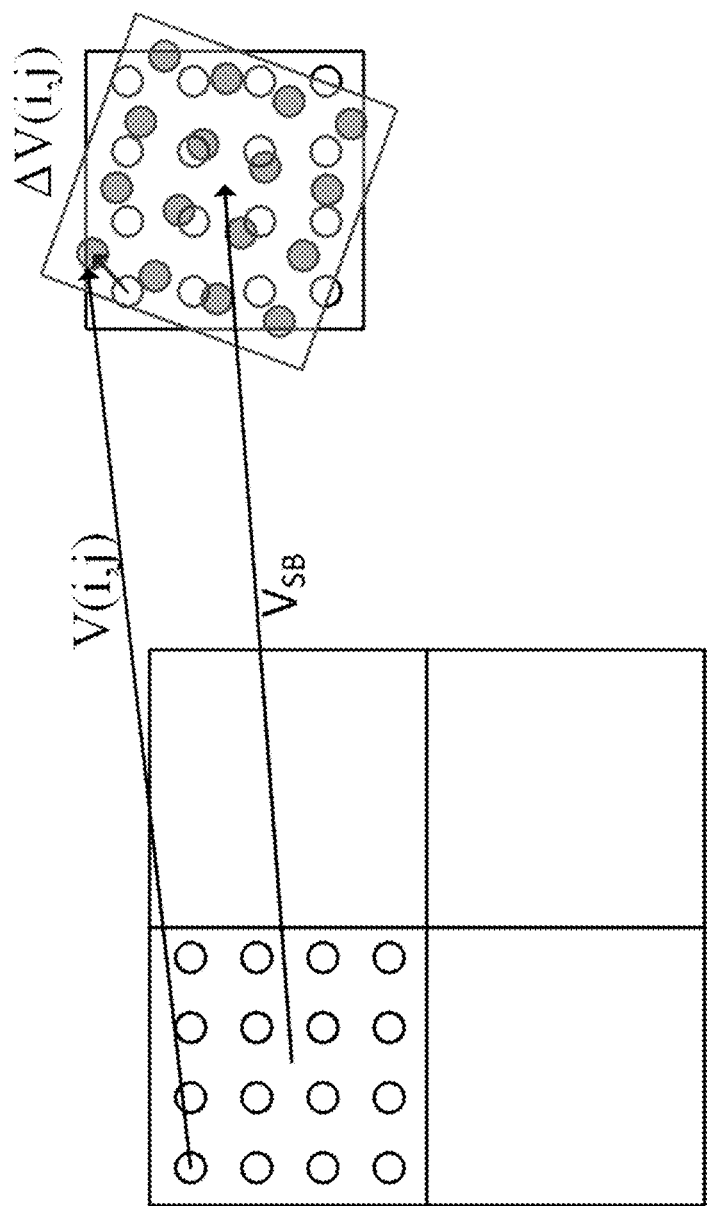
FIG. 25 shows examples of Sub-block MV VSB and pixel Δv(i,j) (shown as arrow).

Step 3) The luma prediction refinement is calculated by the optical flow equation.

$$\Delta I(i,j)=g_x(i,j)*\Delta v_x(i,j)+g_y(i,j)*\Delta v_y(i,j)$$

where the $\Delta v(i, j)$ is the difference between pixel MV computed for sample location (i,j), denoted by v(i,j), and the sub-block MV of the sub-block to which pixel (i,j) belongs, as shown in FIG. 25.

Since the affine model parameters and the pixel location relative to the sub-block center are not changed from sub-block to sub-block, $\Delta v(i, j)$ can be calculated for the first sub-block, and reused for other sub-blocks in the same CU. Let x and y be the horizontal and vertical offset from the pixel location to the center of the sub-block, $\Delta v(x, y)$ can be derived by the following equation, $$\begin{cases} \Delta v_x(x, y) = c*x + d*y \\ \Delta v_y(x, y) = e*x + f*y \end{cases}$$

For 4-parameter affine model, $$\begin{cases} c = f = \frac{v_{1x} - v_{0x}}{w} \\ e = -d = \frac{v_{1y} - v_{0y}}{w} \end{cases}$$

For 6-parameter affine model, $$\begin{cases} c = \frac{v_{1x} - v_{0x}}{w} \\ d = \frac{v_{2x} - v_{0x}}{h} \\ e = \frac{v_{1y} - v_{0y}}{w} \\ f = \frac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement is added to the sub-block prediction I(i,j). The final prediction I' is generated as the following equation.

$$I'(i,j)=I(i,j)+\Delta I(i,j)$$

2.2.12 JVET-N0510

Phase-Variant Affine Subblock Motion Compensation (PAMC)

To better approximate the affine motion model in an affine subblock, phase-variant MC is applied to the subblock. In the proposed method, the affine coded block is also divided into 4×4 subblocks, and a subblock MV is derived for each subblock as done in VTM4.0. The MC of each subblock is divided into two stages. The first stage is to filter an (4+L−1)×(4+L−1) reference block window with (4+L−1) rows of horizontal filtering, where the L is the filter tap length of the interpolation filer. However, different from the translational MC, in the proposed phase-variant affine subblock MC, the filter phase of each sample row is different. For each sample row, MVx is derived as follows.

MVx=(subblockMVx<<7+dMvVerXx(rowIdx−L/2− 2))>>7 (Equation 1)

The filter phase of each sample row is derived from the MVx. The subblockMVx is the x component of the MV of the derived subblock MV as done in VTM4.0. The rowIdx is the sample row index. The dMvVerX is (cuBottomLeftCPMVx−cuTopLeftCPMVx)<<(7−log 2LumaCbHeight), where cuBottomLeftCPMVx is the x component of the CU bottom left control point MV, cuTopLeftCPMVx is the x component of the CU top left control point MV, and LumaCbHeight is the log 2 of the height of the luma coding block (CB).

Figure 30:
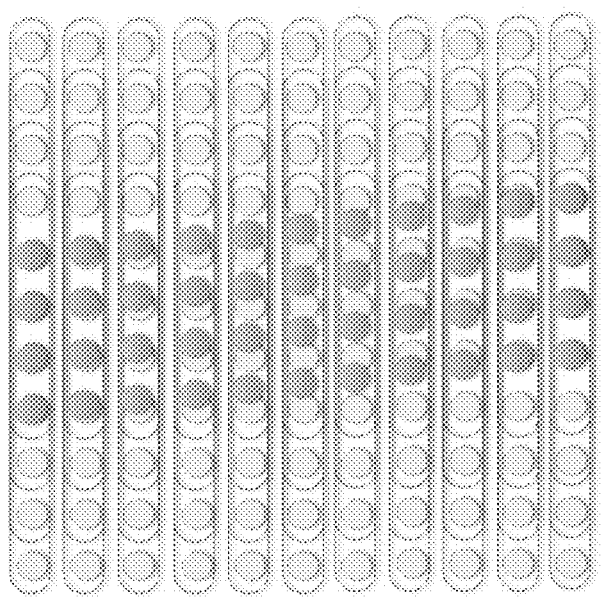
FIG. 30 shows an example of phase-variant horizontal filtering.
Figure 31:
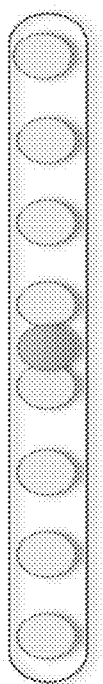
FIG. 31 shows an example of applying one time of 8-tap horizontal filtering.

After the horizontal filtering, a 4×(4+L−1) horizontally filtered samples are generated. FIG. 1 shows the concept of the proposed horizontal filtering. The gray points are the samples of the reference block window, and the orange points denote the horizontally filtered samples. A blue tube of 8×1 samples denotes applying one time of 8-tap horizontal filtering, as shown in FIG. 30 and FIG. 31. Each sample row needs four times of horizontal filtering. The filter phases on a sample row are the same. However, the filter phases on different rows are different. Skewed 4×11 samples are generated.

In the second stage, the 4×(4+L−1) horizontally filtered samples (orange samples in FIG. 1) are further vertically filtered. For each sample column, MVy is derived as follows.

$$MVy=(\text{subblockMV}y<<7+d\text{MvHorY}\times(\text{columnIdx}-2))$$
$$>>7 \quad \text{(Equation 2)}$$

The filter phase of each sample column is derived from the MVy. The subblockMVy is the y component of the MV of the derived subblock MV as done in VTM4.0. The columnIdx is the sample column index. The dMvHorY is (cuTopRightCPMVy−cuTopLeftCPMVy)<<(7−log 2LumaCbWidth), where cuTopRightCPMVy is the y component of the CU top right control point MV, cuTopLeftCPMVy is the y component of the CU top left control point MV, and log 2LumaCbWidth is the log 2 of the width of the luma CB.

Figure 32:
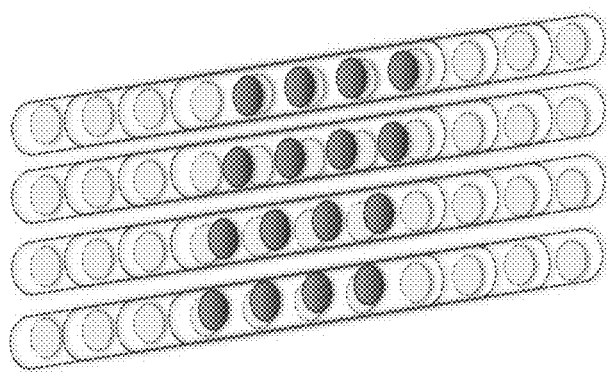
FIG. 32 shows an example of non-uniform phase vertical filtering.

After the vertical filtering, 4×4 affine subblock prediction samples are generated. FIG. 32 shows the concept of the proposed vertical filtering. The light orange points are the horizontally filtered samples from first stage. The red points are the vertically filtered samples as the final prediction samples.

In this proposal, the used interpolation filter sets are the same as those in VTM4.0. The only difference is that the horizontal filter phases on one sample row are different and the vertical filter phases on one sample column are different. As for the number of filtering operations for each affine subblock in the proposed method, it is the same as that in VTM4.0.

3. EXAMPLES OF PROBLEMS SOLVED BY DISCLOSED TECHNICAL SOLUTIONS

1. BIO only considers bi-prediction.
2. The derivation of vx and vy does not consider the motion information of the neighboring blocks.
3. Optical flow is used for affine prediction in JVET-N0236, but far from being optimal.

4. EXAMPLES OF EMBODIMENTS AND TECHNIQUES

To tackle the problems, we propose different formations for derivation of refined prediction samples with optical flow. In addition, we propose to use neighboring (e.g., adjacent or non-adjacent) blocks' information (such as reconstructed samples or motion information), and/or gradients of one sub-block/block and prediction blocks of the sub-block/block to obtain the final prediction blocks of current sub-block/block.

The techniques and embodiments listed below should be considered as examples to explain general concepts. These embodiments should not be interpreted in a narrow way. Furthermore, these techniques can be combined in any suitable manner.

Denote reference picture of current picture from list 0 and list 1 by Ref0 and Ref1 respectively, denote $\tau_0$=POC(current)−POC(Ref0), $\tau_1$=POC(Ref1)−POC(current), and denote reference block of the current block from Ref0 and Ref1 by refblk0 and refblk1 respectively. For a subblock in current block, MV of its corresponding reference subblock in refblk0 pointing to refblk1 is denoted by $(v_x, v_y)$. MVs of the current subblock referring to Ref0 and Ref1 are denoted by $(mvL0_x, mvL0_y)$ and $(mvL1_x, mvL1_y)$ respectively.

In the following discussion, SatShift(x, n) is defined as $$\text{SatShift}(x, n) = \begin{cases} (x + \text{offsset0}) >> n & \text{if } x \geq 0 \\ -((-x + \text{offset1}) >> n) & \text{if } x < 0 \end{cases}$$

Shift(x, n) is defined as Shift(x, n)=(x+offset0)>>n.

In one example, offset0 and/or offset1 are set to (1<<n)>>1 or (1<<(n−1)). In another example, offset0 and/or offset1 are set to 0.

In another example, offset0=offset1=((1<<n)>>1)−1 or ((1<<(n−1)))−1.

Clip3(min, max, x) is defined as $$\text{Clip3}(\text{Min}, \text{Max}, x) = \begin{cases} \text{Min} & \text{if } x < \text{Min} \\ \text{Max} & \text{if } x > \text{Max} \\ x & \text{Otherwise} \end{cases}$$

In the following discussion, an operation between two motion vectors means the operation will be applied to both the two components of the motion vector. For example, MV3=MV1+MV2 is equivalent to $MV3_x=MV1_x+MV2_x$ and $MV3_y=MV1_y+MV2_y$. alternatively, the operation may be only applied to the horizontal or vertical component of the two motion vectors.

In the following discussion, the left neighbouring block, left-bottom neighbouring block, above neighbouring block, right-above neighbouring block and left-above neighbouring block are denoted as block $A_1$, $A_0$, $B_1$, $B_0$ and $B_2$ as shown in FIG. 2.

1. It is proposed that the prediction sample P(x,y) at position (x, y) in a block can be refined as P'(x,y)=P(x,y)+Gx(x,y)×Vx(x,y)+Gy(x,y)×Vy(x,y). P'(x,y) will be used together with the residue sample Res(x,y) to generate the reconstructed Rec(x,y). (Gx(x,y), Gy(x,y)) represents the gradient at position (x,y), such as along the horizontal direction and vertical direction, respectively. (Vx(x,y), Vy(x,y)) represents the motion displacement at position (x,y) which may be derived on-the-fly.

a. Alternatively, weighted function may be applied to the prediction sample, gradients and motion displacement. For example, P'(x,y)=α(x,y)×P(x,y)+β(x,y)×Gx(x,y)×Vx(x,y)+γ(x,y)×Gy(x,y)×Vy(x,y),
      where α (x,y), β (x,y) and γ(x,y) are weighting values at position (x,y), which may be integers or real numbers.
      i. For example, P'(x,y)=(α(x,y)×P(x,y)+β(x,y)×Gx(x,y)×Vx(x,y)+γ(x,y)×Gy(x,y)×Vy(x,y)+offsetP)/(α(x,y)+β(x,y)+γ(x,y)). In one example, offsetP is set to 0. Alternatively, the division may be replaced by shifting.
      ii. For example, P'(x,y)=P(x,y)−Gx(x,y)×Vx(x,y)+Gy(x,y)×Vy(x,y);
      iii. For example, P'(x,y)=P(x,y)−Gx(x,y)×Vx(x,y)−Gy(x,y)×Vy(x,y);
      iv. For example, P'(x,y)=P(x,y)+Gx(x,y)×Vx(x,y)−Gy(x,y)×Vy(x,y);
      v. For example, P'(x,y)=0.5×P(x,y)+0.25×Gx(x,y)×Vx(x,y)+0.25×Gy(x,y)×Vy(x,y);
      vi. For example, P'(x,y)=0.5×P(x,y)+0.5×Gx(x,y)×Vx(x,y)+0.5×Gy(x,y)×Vy(x,y);
      vii. For example, P'(x,y)=P(x,y)+0.5×Gx(x,y)×Vx(x,y)+0.5×Gy(x,y)×Vy(x,y);
   b. Alternatively, P'(x,y)=Shift(α(x,y)×P(x,y), n1)+Shift(β(x,y)×Gx(x,y)×Vx(x,y), n2)+Shift(γ(x,y)×Gy(x,y)×Vy(x,y), n3), where α (x,y), β (x,y) and γ(x,y) are weighting values at position (x,y), which are integers. n1, n2, n3 are non-negative integers such as 1.
   c. Alternatively, P'(x,y)=SatShift(α(x,y)×P(x,y), n1)+SatShift(β(x,y)×Gx(x,y)×Vx(x,y), n2)+SatShift(γ(x, $y) \times Gy(x,y) \times Vy(x,y)$, n3), where α (x,y), β (x,y) and γ(x,y) are weighting values at position (x,y), which are integers. n1, n2, n3 are non-negative integers such as 1.

d. Alternatively, P'(x,y)=Shift(α(x,y)×P(x,y)+β(x,y)× Gx(x,y)×Vx(x,y)+γ(x,y)×Gy(x,y)×Vy(x,y), n1), where α (x,y), β (x,y) and γ(x,y) are weighting values at position (x,y), which are integers. n1 is a non-negative integer such as 1.

e. Alternatively, P'(x,y)=SatShift(α(x,y)×P(x,y)+β(x,y)×Gx(x,y)×Vx(x,y)+γ(x,y)×Gy(x,y)×Vy(x,y), n1), where α (x,y), β (x,y) and γ(x,y) are weighting values at position (x,y), which are integers. n1 is a non-negative integer such as 1.

f. Alternatively, P'(x,y)=α(x,y)×P(x,y)+Shift(β(x,y)×Gx(x,y)×Vx(x,y), n2)+Shift(γ(x,y)×Gy(x,y)×Vy(x,y), n3), where α (x,y), β (x,y) and γ(x,y) are weighting values at position (x,y), which are integers. n2, n3 are non-negative integers such as 1.

g. Alternatively, P'(x,y)=α(x,y)×P(x,y)+SatShift(β(x,y)×Gx(x,y)×Vx(x,y), n2)+SatShift(γ(x,y)×Gy(x,y)×Vy(x,y), n3), where α (x,y), β (x,y) and γ(x,y) are weighting values at position (x,y), which are integers. n2, n3 are non-negative integers such as 1.

h. Alternatively, P'(x,y)=α(x,y)×P(x,y)+Shift(β(x,y)×Gx(x,y)×Vx(x,y)+γ(x,y)×Gy(x,y)×Vy(x,y), n3), where α (x,y), β (x,y) and γ(x,y) are weighting values at position (x,y), which are integers. n3 is a non-negative integer such as 1.

i. Alternatively, P'(x,y)=α(x,y)×P(x,y)+SatShift(β(x,y)×Gx(x,y)×Vx(x,y)+γ(x,y)×Gy(x,y)×Vy(x,y), n3), where α (x,y), β (x,y) and γ(x,y) are weighting values at position (x,y), which are integers. n3 is a non-negative integer such as 1.

j. Alternatively, P'(x,y)=f0(P(x,y))+f1(Gx(x,y)×Vx(x,y))+f2(Gy(x,y)×Vy(x,y)) wherein f0, f1 and f2 are three functions.

k. In one example, (Gx(x,y), Gy(x,y)) is calculated with P(x1, y1) where x1 belong to the range of [x−Bx0, x+Bx1] and y1 belongs to the range of [y−By0, y+By1], and where Bx0, Bx1, By0, By1 are integers.
   i. For example, Gx(x,y)=P(x+1, y)−P(x−1, y), Gy(x,y)=P(x, y+1)−P(x,y−1);
      (i) Alternatively, Gx(x,y)=Shift(P(x+1, y)−P(x−1, y), n1), Gy(x,y)=Shift (P(x, y+1)−P(x,y−1), n2). For example, n1=n2=1;
      (ii) Alternatively, Gx(x,y)=SatShift(P(x+1, y)−P(x−1, y), n1), Gy(x,y)=SatShift (P(x, y+1)−P(x,y−1), n2). For example, n1=n2=1;

l. P(x,y) may be the prediction value of uni-prediction (inter-prediction with one MV);

m. P(x,y) may be the final prediction value after bi-prediction (inter-prediction with two MVs);
   i. For example, Vx(x,y), Vy(x,y) may be derived following the ways specified in BIO (a.k.a. Bi-Directional Optical Flow BDOF).

n. P(x,y) may be multiple hypothesis inter-prediction (inter-prediction with more than two MVs);

o. P(x,y) may be affine prediction;

p. P(x,y) may be intra-prediction;

q. P(x,y) may be intra-block copy (IBC) prediction.

r. P(x,y) may be generated by triangular prediction mode (TPM) or may be generated by a geographic prediction mode (GPM) technique.

s. P(x,y) may be inter-intra combined prediction;

t. P(x,y) may be global inter prediction, where a region shares the same motion model and parameters;

u. P(x,y) may be generated by palette coding mode;

v. P(x,y) may be inter-view prediction in multi-view or 3D video coding;

w. P(x,y) may be inter-layer prediction in scalable video coding;

x. P(x,y) may be filtered before be refined;

y. P(x,y) may be the final prediction which will be added with the residue sample value to get the reconstructed sample value. In some embodiments, P(x,y) may be the final prediction when a refinement process is not applied. In some embodiments, P'(x,y) may be the final prediction when a refinement process is applied.
   i. In one example, for bi-prediction or multiple hypothesis-prediction applied blocks (or sub-blocks), the above functions are applied once to the final prediction values.
   ii. In one example, for bi-prediction or multiple hypothesis-prediction applied blocks (or sub-blocks), the above functions are applied multiple times, so that for each prediction block according to one prediction direction or reference picture or motion vector, the above process is invoked to update the prediction block. Afterwards, the final prediction block may be generated with the updated prediction blocks.
   iii. Alternatively, P(x,y) may be the intermediate-prediction, which will be used to derive the final prediction.
      (i) For example, P(x,y) may be prediction from one reference picture list if the current block is inter-predicted with bi-prediction;
      (ii) For example, P(x,y) may be prediction from one reference picture list if the current block is inter-predicted with TPM or with a GPM technique;
      (iii) For example, P(x,y) may be prediction from one reference picture if the current block is inter-predicted with multiple hypothesis;
      (iv) For example, P(x,y) may be inter-prediction the current block is inter-intra combined predicted;
      (v) For example, P(x,y) may be the inter-prediction before Local Illuminance Compensation (LIC) is applied when the current block uses LIC;
      (vi) For example, P(x,y) may be the inter-prediction before DMVR (or other kind of DMVD) is applied when the current block uses DMVR (or other kind of DMVD);
      (vii) For example, P(x,y) may be the inter-prediction before weighting factors are multiplied when the current block uses weighted prediction or Generalized-Bi prediction (GBi);

z. The gradients denoted as G(x,y), e.g. Gx(x,y) or/and Gy(x,y), may be derived on the final prediction which will be added with the residue sample value to get the reconstructed sample value. In some embodiments, the final prediction sample value is added to the residue sample value to get the reconstructed sample value when a refinement process is not applied.
   i. For example, G(x,y) may be derived on P(x, y).
   ii. Alternatively, G(x,y) may be derived on the middle-prediction, which will be used to derive the final prediction.

(i) For example, G(x,y) may be derived on the prediction from one reference picture list if the current block is inter-predicted with bi-prediction;
(ii) For example, G(x,y) may be derived on the prediction from one reference picture list if the current block is inter-predicted with TPM or with GPM technique;
(iii) For example, G(x,y) may be derived on the prediction from one reference picture if the current block is inter-predicted with multiple hypothesis;
(iv) For example, G(x,y) may be derived on the inter-prediction the current block is inter-intra combined predicted;
(v) For example, G(x,y) may be derived on the inter-prediction before Local Illuminance Compensation (LIC) is applied when the current block uses LIC;
(vi) For example, G(x,y) may be derived on the inter-prediction before DMVR (or other kind of DMVD) is applied when the current block uses DMVR (or other kind of DMVD);
(vii) For example, G(x,y) may be derived on the inter-prediction before weighting factors are multiplied when the current block uses weighted prediction or Generalized-Bi prediction (GBi);

aa. Alternatively, P'(x,y) may be further processed by other methods to get the final prediction sample.

bb. Alternatively, the reconstructed sample Rec(x,y) at position (x, y) in a block can be refined as Rec'(x,y)=Rec(x,y)+Gx(x,y)×Vx(x,y)+Gy(x,y)×Vy(x,y). Rec'(x,y) will be used to replace the reconstructed Rec(x,y). (Gx(x,y), Gy(x,y)) represents the gradient at position (x,y), such as along the horizontal direction and vertical direction, respectively. (Vx(x,y), Vy(x,y)) represents the motion displacement at position (x,y) which may be derived on-the-fly.
  i. In one example, (Gx(x,y), Gy(x,y)) is derived on the reconstructed samples.

Figure 26:
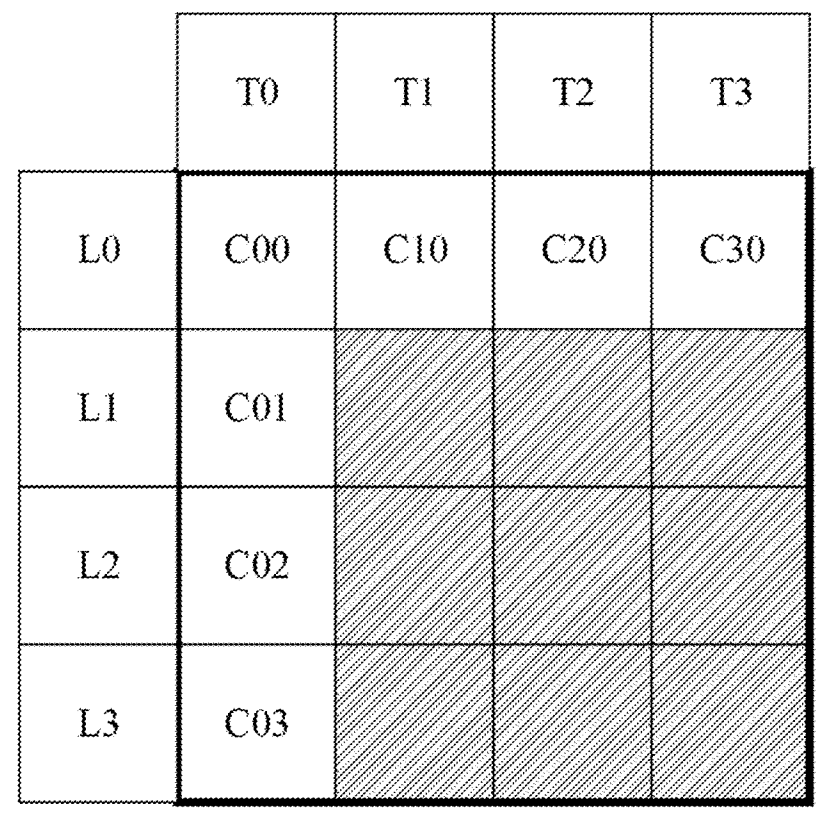

2. It is proposed that Vx(x,y) and/or Vy(x,y) utilized in optical flow based methods (such as in Bullet 1) may depend on spatial or temporal neighbouring blocks.
  a. Alternatively, Vx(x,y) and/or Vy(x,y) in the process of BIO (a.k.a. BDOF) may depend on spatial or temporal neighbouring blocks.
  b. In one example, the "dependence" on spatial or temporal neighbouring blocks may include dependence on motion information (e.g. MVs), coding mode (e.g. inter-coded or intra-coded), neighbouring CU dimensions, neighbouring CU positions, etc.
  c. In one example, (Vx(x,y), Vy(x,y)) may be equal to $MV_{Mix}$.
    i. In one example, $MV_{Mix}$ may be equal to $Wc(x,y) \times MVc + W_{N1}(x,y) \times MV_{N1} + W_{N2}(x,y) \times MV_{N2} + \ldots + W_{Nk}(x,y) \times MV_{Nk}$, where MVc is the MV of the current block, $MV_{N1} \ldots MV_{Nk}$ are MVs of k spatial or temporal neighbouring blocks: N1 . . . Nk. Wc, $W_{N1} \ldots W_{Nk}$ are weighting values which may be integers or real numbers.
    ii. Alternatively, $MV_{Mix}$ may be equal to Shift $(Wc(x,y) \times MVc + W_{N1}(x,y) \times MV_{N1} + W_{N2}(x,y) \times MV_{N2} + \ldots + W_{Nk}(x,y) \times MV_{Nk}, n1)$, where MVc is the MV of the current block, $MV_{N1} \ldots MV_{Nk}$ are MVs of k spatial or temporal neighbouring blocks: N1 . . . Nk. Wc, $W_{N1} \ldots W_{Nk}$ are weighting values which are integers. n1 is an integer.
    iii. Alternatively, $MV_{Mix}$ may be equal to SatShift $(Wc(x,y) \times MVc + W_{N1}(x,y) \times MV_{N1} + W_{N2}(x,y) \times MV_{N2} + \ldots + W_{Nk}(x,y) \times MV_{Nk}, n1)$, where MVc is the MV of the current block, $MV_{N1} \ldots MV_{Nk}$ are MVs of k spatial or temporal neighbouring blocks: N1 . . . Nk. Wc, $W_{N1} \ldots W_{Nk}$ are weighting values which are integers. n1 is an integer.
    iv. In one example, Wc(x,y)=0.
    v. In one example, k=1. And N1 is a spatial neighboring block.
      (i) In one example, N1 is a spatial neighboring block closest to position (x,y);
      (ii) In one example, $W_{N1}$ (x,y) is larger when position (x,y) is closer to N1.
    vi. In one example, k=1. And N1 is a temporal neighboring block.
      (i) For example, N1 is the collocated block in the collocated picture for position (x,y).
    In one example, different positions may use different spatial or temporal neighbouring blocks.
    vii. FIG. 26 shows an example of how to derive Vx(x,y) and/or Vy(x,y). In the figure, each block represents basic block (e.g. 4×4 block). The current block is marked with bolded lines.
      (i) For example, prediction samples in shaded basic blocks, which are not at top or left boundaries, will not be refined with optical flow.
      (ii) For example, prediction samples in basic blocks at the top-boundary such as C00, C10, C20 and C30, will be refined with optical flow.
        a. For example, $MV_{Mix}$ for prediction samples in a basic block at the top-boundary will be derived depending on the adjacent above neighbouring block. For example, $MV_{Mix}$ for prediction samples in C10 will be derived depending on above neighbouring block T1.
      (iii) For example, prediction samples in basic blocks at the left-boundary such as C00, C01, C02 and C03, will be refined with optical flow.
        a. For example, $MV_{Mix}$ for prediction samples in a basic block at the left-boundary will be derived depending on the adjacent left neighbouring block. For example, $MV_{Mix}$ for prediction samples in C01 will be derived depending on left neighbouring block L1.
    viii. In one example, MVc and $MV_{N1} \ldots MV_{Nk}$ may be scaled to the same reference picture;
      (i) In one example, they are scaled to the reference picture MVc referring to.
    ix. In one example, spatial or temporal neighbouring block Ns can be used to derive $MV_{Mix}$ only when it is not intra-coded.
    x. In one example, spatial or temporal neighbouring block Ns can be used to derive $MV_{Mix}$ only when it is not IBC coded.
    xi. In one example, spatial or temporal neighbouring block Ns can be used to derive $MV_{Mix}$ only if MVs refers to the same reference picture as MVc.
  d. In one example, (Vx(x,y), Vy(x,y)) may be equal to $f(MV_{Mix}, MVc)$, where f is a function and MVc is the MV of the current block.
    i. For example, (Vx(x,y), Vy(x,y)) may be equal to $MV_{Mix}$-MVc.
    ii. For example, (Vx(x,y), Vy(x,y)) may be equal to MVc-$MV_{Mix}$.

iii. For example, (Vx(x,y), Vy(x,y)) may be equal to p×MV$_{Mix}$+q×MVc, where p and q are real numbers. Some example of p and q are: p=q=0.5, or p=1, q=−0.5, or q=1,p=−0.5 and so on.
  (i) Alternatively, (Vx(x,y), Vy(x,y)) may be equal to Shift(p×MV$_{Mix}$+q×MVc, n) or SatShift(p×MV$_{Mix}$+p×MVc, n), where p, q and n are integers. Some example of n, p and q are n=1, p=2 and q=−1, or n=1, p=q=1 or n=1 p=−1, q=2, and so on.
e. In one example, the current block is inter-predicted with uni-prediction, and MVc may refer to reference picture list 0.
f. In one example, the current block is inter-predicted with uni-prediction, and MVc may refer to reference picture list 1.
g. In one example, the current block is inter-predicted with bi-prediction, and MVc may refer to reference picture list 0 or reference picture list 1.
  i. In one example, the final prediction is refined by optical flow. (Vx(x,y), Vy(x,y)) may be derived with MVc refer to one of the reference picture list, such as reference picture list 0 or reference picture list 1.
  ii. In one example, the prediction from reference list 0 is refined by optical flow. (Vx(x,y), Vy(x,y)) may be derived with MVc referring to reference list 0.
  iii. In one example, the prediction from reference list 1 is refined by optical flow. (Vx(x,y), Vy(x,y)) may be derived with MVc referring to reference list 1.
  iv. The prediction from reference list 0 after being refined by optical flow, and the prediction from reference list 1 after being refined by optical flow independently, can be combined (e.g. averaged or weighted averaged) to get the final prediction.
h. In one example, the current block is inter-predicted with bi-prediction, and BDOF is applied, with Vx(x, y), Vy(x,y) being modified depending on spatial or temporal neighbouring blocks.
  i. For example, suppose (Vx(x,y), Vy(x,y)) derived in the BDOF process is denoted as V'(x,y)=(V'x(x,y), V'y(x,y)), (Vx(x,y), Vy(x,y)) derived with the disclosed methods are denoted as V"(x,y)=(V"x(x,y), V"y(x,y)), then the final V(x,y)=(Vx(x,y), Vy(x,y)) can be derived as:
    (i) For example, V(x,y)=V'(x,y)×W'(x,y)+V"(x,y)×W"(x,y), where W'(x,y) and W"(x,y) are integer numbers or real numbers. e.g. W'(x,y)=0, W"(x,y)=1, or W'(x,y)=1, W"(x,y)=0, or W'(x,y)=0.5, W"(x,y)=0.5.
    (ii) For example, V(x,y)=Shift(V'(x,y)×W'(x,y)+V"(x,y)×W"(x,y), n1), where W'(x,y) and W"(x,y) are integer numbers. n1 is a non-negative integer such as 1.
    (iii) For example, V(x,y)=SatShift(V'(x,y)×W'(x,y)+V"(x,y)×W"(x,y), n1), where W'(x,y) and W"(x,y) are integer numbers. n1 is a non-negative integer such as 1.
  ii. For example, whether to modify (Vx(x,y), Vy(x,y)) in BDOF depending on spatial or temporal neighbouring blocks may depend on the position (x,y).
    (i) For example, (Vx(x,y), Vy(x,y)) in shaded basic blocks in FIG. 26, which are not at top or left boundaries, will not be modified depending on spatial or temporal neighbouring blocks.
  i. Vx(x,y) and/or Vy(x,y) may be clipped.
  j. Alternatively, the spatial or temporal neighboring blocks in the methods disclosed above may be replaced by non-adjacent blocks of current block.
  k. Alternatively, the spatial or temporal neighboring blocks in the methods disclosed above may be replaced by non-adjacent sub-blocks of current sub-block.
  l. Alternatively, the spatial or temporal neighboring blocks in the methods disclosed above may be replaced by non-adjacent sub-blocks of current block/current CTU/current VPDU/current region covering the current sub-block.
  m. Alternatively, the spatial or temporal neighboring blocks in the methods disclosed above may be replaced by entries in the history-based motion vector
3. It is proposed that Vx(x,y) and/or Vy(x,y) in the refinement on the affine prediction with optical flow disclosed in JVET-N0236 may be derived as:
  a. Vx(x, y)=a×(x−xc)+b×(y−yc), Vy(x, y)=c×(x−xc)+d×(y−yc), where (x, y) is the position under consideration, (xc, yc) is the center position of the basic block with dimensions w×h (e.g. 4×4 or 8×8) which covers the position (x, y), where a, b, c and d are affine parameters
    i. Alternatively, Vx(x, y)=Shift(a×(x−xc)+b×(y−yc), n1), Vy(x, y)=Shift(c×(x−xc)+d×(y−yc), n1), where n1 is an integer.
    ii. Alternatively, Vx(x, y)=SatShift(a×(x−xc)+b×(y−yc), n1), Vy(x, y)=SatShift(c×(x−xc)+d×(y−yc), n1), where n1 is an integer.
    iii. For example, suppose the top-left position of the basic block (e.g. 4×4 or 8×8) which covers the position (x, y) is (x0, y0), then (xc, yc)=(x0+(w/2), y0+(h/2)).
      (i) Alternatively, (xc, yc)=(x0+(w/2)−1, y0+(h/2)−1).
      (ii) Alternatively, (xc, yc)=(x0+(w/2), y0+(h/2)−1).
      (iii) Alternatively, (xc, yc)=(x0+(w/2)−1, y0+(h/2)).
    iv. In one example, c=−b and d=a if the current block applies the 4-parameter affine mode.
    v. In one example, a, b, c and d may be derived from CPMVs together with width (W) and height (H) of the current block. For example, $$a = \frac{(mv_1^h - mv_0^h)}{W}, b = \frac{(mv_1^v - mv_0^v)}{W}, c = \frac{(mv_2^h - mv_0^h)}{H} \text{ and}$$

$$d = \frac{(mv_2^v - mv_0^v)}{H},$$

where $mv_0$, $mv_1$, and $mv_2$ are CPMVs.
      (i) a, b, c and d may be clipped;
      (ii) a, b, c and d may be shifted.
    vi. In one example, a, b, c and d may be obtained from storage of neighbouring blocks as disclosed in PCT/CN2018/111176, incorporated by reference herein.
    vii. In one example, a, b, c and d may be obtained from a history-based storage as disclosed in PCT/CN2019/075867, incorporated by reference herein.

viii. Alternatively, $Vx(x, y)=-a \times (x-xc)-b \times (y-yc)$, $Vy(x, y)=-c \times (x-xc)-d \times (y-yc)$ b. In one example, $Vx(x+1, y)=Vx(x,y)+a$ and $Vy(x+1, y)=Vy(x, y)+c$.

i. Alternatively, $Vx(x+1, y)=Shift(Vx(x,y)+a, n1)$, $Vy(x+1, y)=Shift(Vy(x, y)+c, n1)$, where n1 is an integer.

ii. Alternatively, $Vx(x+1, y)=SatShift(Vx(x,y)+a, n1)$, $Vy(x+1, y)=SatShift(Vy(x, y)+c, n1)$, where n1 is an integer.

iii. Alternatively, $Vx(x+1, y)=Vx(x,y)+Shift(a, n1)$, $Vy(x+1, y)=Vy(x, y)+Shift(c, n1)$, where n1 is an integer.

iv. Alternatively, $Vx(x+1, y)=Vx(x,y)+SatShift(a, n1)$, $Vy(x+1, y)=Vy(x, y)+SatShift(c, n1)$, where n1 is an integer.

c. In one example, $Vx(x,y+1)=Vx(x,y)+b$ and $Vy(x+1, y)=Vy(x, y)+d$.

i. Alternatively, $Vx(x,y+1)=Shift(Vx(x,y)+b, n1)$, $Vy(x, y+1)=Shift(Vy(x, y)+d, n1)$, where n1 is an integer.

ii. Alternatively, $Vx(x,y+1)=SatShift(Vx(x,y)+b, n1)$, $Vy(x, y+1)=SatShift(Vy(x, y)+d, n1)$, where n1 is an integer.

iii. Alternatively, $Vx(x,y+1)=Vx(x,y)+Shift(b, n1)$, $Vy(x, y+1)=Vy(x, y)+Shift(d, n1)$, where n1 is an integer.

iv. Alternatively, $Vx(x,y+1)=Vx(x,y)+SatShift(b, n1)$, $Vy(x, y+1)=Vy(x, y)+SatShift(d, n1)$, where n1 is an integer.

d. In one example, if the current block is affine-predicted with bi-prediction, then {a, b, c, d} may refer to reference picture list 0 or reference picture list 1.

i. In one example, the final prediction is refined by optical flow. $(Vx(x,y), Vy(x,y))$ may be derived with {a, b, c, d} refer to one of the reference picture list, such as reference picture list 0 or reference picture list 1. The final prediction samples are refined with $(Vx(x,y), Vy(x,y))$.

ii. In one example, the prediction from reference list 0 is refined by optical flow. $(Vx(x,y), Vy(x,y))$ may be derived with {a, b, c, d} referring to reference list 0.

iii. In one example, the prediction from reference list 1 is refined by optical flow. $(Vx(x,y), Vy(x,y))$ may be derived with {a, b, c, d} referring to reference list 1.

iv. The prediction from reference list 0 after being refined by optical flow (e.g., refined with a first motion displacement vector $(V^0x(x,y), V^0y(x,y))$ derived using a, b, c, and d that refer to a reference picture list 0), and the prediction from reference list 1 after being refined by optical flow (e.g., refined with a second motion displacement vector $(V^1x(x,y), V^1y(x,y))$ derived using a, b, c, and d that refer to a reference picture list 1) independently, can be combined (e.g. averaged or weighted averaged) to get the final prediction.

e. $Vx(x, y), Vy(x, y)$ may be with different precision from MVc.

i. In one example, $Vx(x, y), Vy(x, y)$ may be with $1/8$-pel precision.

ii. In one example, $Vx(x, y), Vy(x, y)$ may be with $1/16$-pel precision.

iii. In one example, $Vx(x, y), Vy(x, y)$ may be with $1/32$-pel precision.

iv. In one example, $Vx(x, y), Vy(x, y)$ may be with $1/64$-pel precision.

v. In one example, $Vx(x, y), Vy(x, y)$ may be with $1/128$-pel precision.

f. $Vx(x, y), Vy(x, y)$ may be with float pixel precision.

4. It is proposed that the gradients denoted as $G(x,y)$, e.g. $Gx(x,y)$ or/and $Gy(x,y)$, in the optical flow based methods (such as in the refinement on the affine prediction with optical flow disclosed in JVET-N0236) may be derived on the final prediction which will be added with the residue sample value to get the reconstructed sample value.

i. Alternatively, $G(x,y)$ may be derived on the intermediate-prediction, which will be used to derive the final prediction.

(i) For example, $G(x,y)$ may be derived on the prediction from one reference picture list if the current block is affine-predicted with bi-prediction;

(ii) For example, $G(x,y)$ may be the derived on the inter-prediction before Local Illuminance Compensation (LIC) is applied when the current block uses both affine mode and LIC;

(iii) For example, $G(x,y)$ may be the derived on the inter-prediction before being multiplied by weighting factors when the current block uses both affine mode and weighted prediction or Generalized-Bi prediction (GBi) or Bi-prediction with CU-level Weights (BCW);

(iv) For example, $G(x,y)$ may be the derived on the inter-prediction with Local Illuminance Compensation (LIC) applied when the current block uses both affine mode and LIC;

(v) For example, $G(x,y)$ may be the derived on the inter-prediction being multiplied by weighting factors when the current block uses both affine mode and weighted prediction or Generalized-Bi prediction (GBi) or a Bi-prediction with CU-level Weights (BCW);

5. It is proposed that the reconstructed sample $Rec(x,y)$ at position (x, y) in an affine coded block can be refined as $Rec'(x,y)=Rec(x,y)+Gx(x,y) \times Vx(x,y)+Gy(x,y) \times Vy(x,y)$. $Rec'(x,y)$ will be used to replace the reconstructed $Rec(x,y)$. $(Gx(x,y), Gy(x,y))$ represents the gradient at position (x,y), such as along the horizontal direction and vertical direction, respectively. $(Vx(x,y), Vy(x,y))$ may be derived with methods proposed in JVET-N0236 or methods disclosed in this document.

a. In one example, $(Gx(x,y), Gy(x,y))$ is derived on the reconstructed samples.

b. In one example, $Vx(x, y)$ and $Vy(x, y)$ may be derived at 2*2 block level.

6. $V(x, y)$, i.e., $Vx(x, y)$ and $Vy(x, y)$, may be derived at sub-block level, and optical flow based refinement may be performed at sub-block level.

a. In one example, $Vx(x, y)$ and $Vy(x, y)$ may be derived at 2*2 block level.

b. In one example, $Vx(x, y)$ and $Vy(x, y)$ may be derived at 4*1 block level.

7. Only $Vx(x, y)$ or $Vy(x, y)$ may be used in PROF.

a. In one example, $Vx(x, y)$ is used in PROF and $Vy(x, y)$ is assumed to be zero.

b. In one example, $Vy(x, y)$ is used in PROF and $Vx(x, y)$ is assumed to be zero.

c. In one example, whether $Vx(x, y)$ or $Vy(x, y)$ is used in RPOF may depend on the affine parameters.

i. For example, if sum of absolute of Vx(x, y) is larger than or equal to sum of absolute of Vy(x, y), Vx(x, y) may be used in PROF and Vy(x, y) may be assumed to be zero.
ii. For example, if sum of absolute of Vx(x, y) is smaller than or equal to sum of absolute of Vy(x, y), Vy(x, y) may be used in PROF and Vx(x, y) may be assumed to be zero.
iii. For example, if sum of absolute horizontal gradient is larger than or equal to sum of absolute vertical gradient, Vx(x, y) may be used in PROF and Vy(x, y) may be assumed to be zero.
iv. For example, if sum of absolute horizontal gradient is smaller than or equal to sum of absolute vertical gradient, Vy(x, y) may be used in PROF and Vx(x, y) may be assumed to be zero.

8. Motion vector derived in affine mode may be with 1/N-pel precision, and Vx(x, y), Vy(x, y) may be with 1/M-pel precision, wherein N and M are positive integer.
   a. In one example, N is equal to 8 and M is equal to 16.
   b. In one example, N is equal to 8 and M is equal to 32.
   c. In one example, N is equal to 8 and M is equal to 64.
   d. In one example, N is equal to 8 and M is equal to 128.
   e. In one example, N is equal to 4 and M is equal to 8.
   f. In one example, N is equal to 4 and M is equal to 16.
   g. In one example, N is equal to 4 and M is equal to 32.
   h. In one example, N is equal to 4 and M is equal to 64.
   i. In one example, N is equal to 4 and M is equal to 128.

9. In TMVP or/and SbTMVP, two set of MVs (denoted as MV1 and MV2 respectively) with different precision may be derived for each block or/and sub-block.
   a. In one example, MV1 may be with 1/N-pel precision and MV2 may be with 1/M-pel precision, wherein N and M are positive integer.
   b. N and M described in bullet 8 may be employed.
   c. In one example, N is equal to 16 and M is equal to 32.
   d. In one example, N is equal to 16 and M is equal to 64.
   e. In one example, N is equal to 16 and M is equal to 128.
   f. Optical flow based refinement may be applied with MV1 as the MVc and MV2−MV1 as the V(x, y) for each block or/and sub-block.

10. For a motion vector Mv with 1/M-pel precision, it may be rounded to 1/N-pel precision (denoted as MvR) before used for motion compensation, then the delta MV between Mv and the rounded MV MvR is used to perform PROF and generate the final prediction sample.
    a. In one example, M is 16 and N is 1.
    b. In one example, M is 8 and N is 1.
    c. In one example, M is 4 and N is 1.
    d. In one example, M is 16 and N is 2.
    e. In one example, M is 8 and N is 2.
    f. In one example, M is 4 and N is 2.
    g. In one example, Mv may be rounded to 1/N-pel precision in only horizontal or vertical direction, and PROF may be performed in horizontal or vertical direction correspondingly.
    h. In one example, for bi-prediction blocks, this method may be applied to motion vectors in prediction direction X only, with X=0, 1.
    i. In one example, for bi-prediction blocks, this method may be applied to motion vectors in both prediction directions.
    j. In one example, suppose there are K1 fractional MV components (i.e., one MV component corresponds to one horizontal or vertical MV), this method may be applied to K2 of the fractional MV components, wherein K1>=0, K2>=0, K2<=K1.

11. Motion vector derived in motion vector refinement method (on top of BDOF) proposed in PCT/CN2019/072060 or/and PCT/CN2018/109425 may be with 1/N MV precision. In an example embodiment, a method of video processing comprises determining, using a multi-step decoder-side motion vector refinement process a current video block, a final motion vector; and performing conversion between the current block and the bitstream representation using the final motion vector. In some embodiments, the multi-step decoder-side motion vector refinement process for the current macroblock is performed on a refinement values at an ith step of a multi-step refinement process, where i is an integer. In some embodiments, the multi-step refinement process includes using refinement values of (i−1) th step for generating refinement values of ith step, wherein i=1 to N, where N is a total number of refinement steps performed during the multi-step refinement process and wherein N is greater than 1.
    a. In one example, N is equal to 32.
    b. In one example, N is equal to 64.
    c. In one example, N is equal to 128.
    d. When the refined MV is used to perform motion compensation, method described in bullet 10 may be applied.
       i. In one example, the refined MV is with 1/32-pel precision, it is first rounded to 1/16-pel precision before used for motion compensation, and the delta MV between the refined MV and the rounded MV is used to perform PROF and generate the final prediction sample.
       ii. In one example, the refined MV is with 1/32-pel precision, it is first rounded to 1-pel precision before used for motion compensation, and the delta MV between the refined MV and the rounded MV is used to perform PROF and generate the final prediction sample.
       iii. In one example, the refined MV is with 1/64-pel precision, it is first rounded to 1/16-pel precision before used for motion compensation, and the delta MV between the refined MV and the rounded MV is used to perform PROF and generate the final prediction sample.
       iv. In one example, the refined MV is with 1/64-pel precision, it is first rounded to 1-pel precision before used for motion compensation, and the delta MV between the refined MV and the rounded MV is used to perform PROF and generate the final prediction sample.

Figure 27:
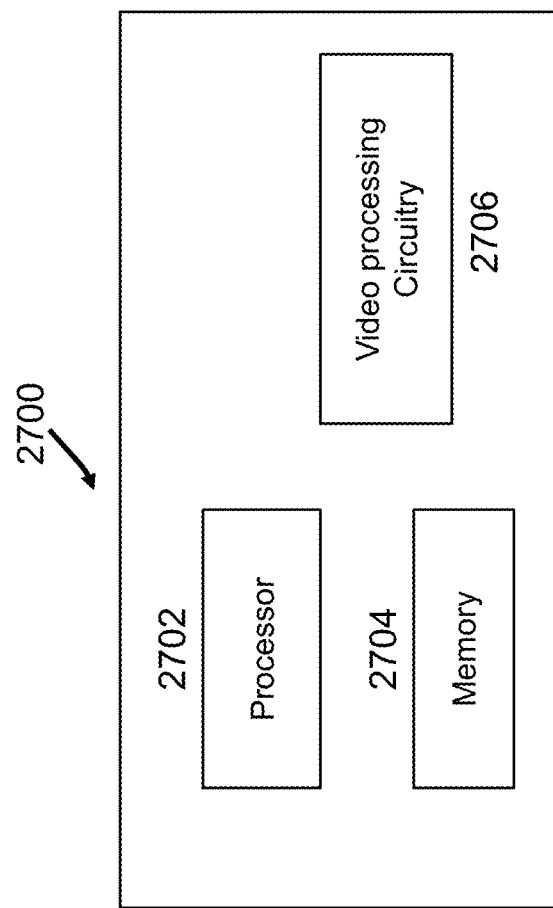
FIG. 27 shows an example of a video processing apparatus.
Figure 29:
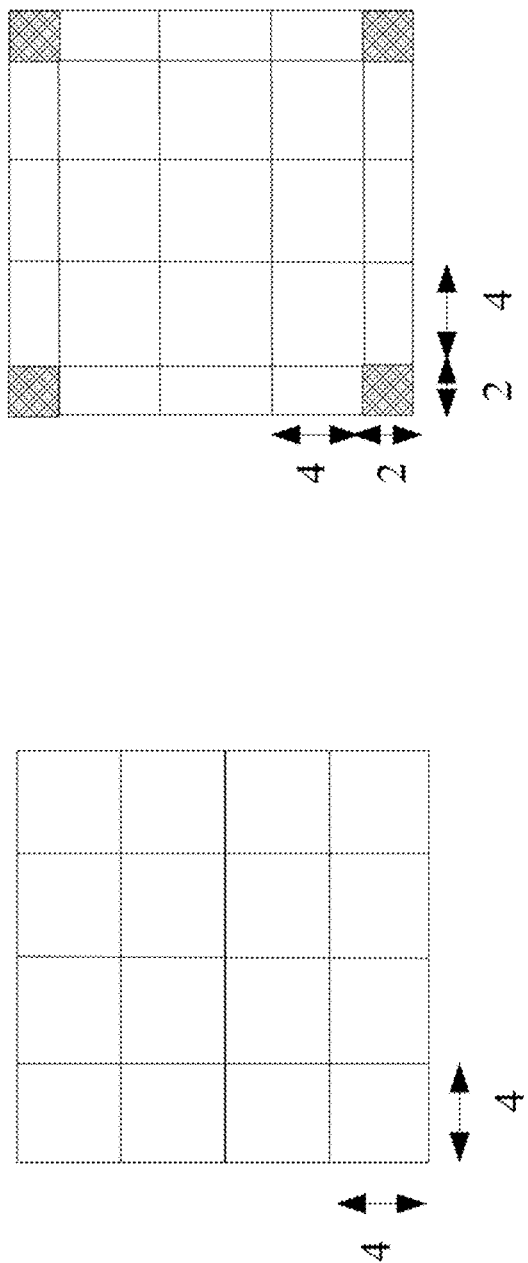
FIG. 29 shows an example of a split pattern in inter-weaved prediction.

12. It is proposed that the above methods, including the method described in JVET-N0236 may be applied to a certain type of blocks.
    a. In one example, the methods are only applied to 8×4 blocks or subblocks;
    b. In one example, the methods are only applied to 4×8 blocks or subblocks;
    c. In one example, the methods are only applied to 4×4 uni-prediction blocks or subblocks;
    d. In one example, the methods are only applied to 8×4, 4×8 and 4×4 uni-prediction blocks or subblocks.

e. In one example, the methods are applied to all possible blocks other than 4×4 bi-prediction blocks or subblocks.
f. In one example, the methods are only applied to luma blocks.
g. In one example, whether to apply the methods may depend on
  i. Color components;
  ii. Block size;
  iii. Color format;
  iv. Block position;
  v. Motion type;
  vi. Magnitude of motion vectors;
  vii. Coding mode;
  viii. Magnitude of pixel gradients;
  ix. Transform type;
  x. If BIO is applied;
  xi. If bi-prediction is applied;
  xii. If DMVR is applied;
13. PROF may be applied to interweaved prediction described in PCT/CN2019/071507, incorporated by reference herein. In interweaved prediction, intermediate prediction values are generated from two different sub-block partitions of a given block, where the two different sub-block partitions are different at least such that some or all of sub-blocks in one partition have different sizes than some or all sub-blocks on another partition.
  a. In one example, the block coded in affine mode may be split into sub-blocks in K patterns. An example for K=2 is shown in FIG. 29. In the first pattern, motion compensation is performed to generate prediction samples (denoted as P(x, y)) of each sub-block. In the Lth (1<L<=K) pattern, motion compensation is not performed, instead, an offset (denoted as OL(x, y)) is derived for each sample using PROF based on prediction samples of the first pattern and the MV difference between MVs derived in the first pattern (denoted as MV1(x, y)) and the Lth pattern (denoted as MVL(x, y)). The final prediction sample is generated as an function of P(x, y) and OL(x, y).
    i. In one example, K is equal to 2.
      (i) In one example, the final prediction sample may be generated as: P(x, y)+((O1(x, y)+1)>>1).
      (ii) In one example, the final prediction sample may be generated as: P(x, y)+(O1(x, y)>>1).
    ii. In one example, the final prediction sample may be generated as: P(x, y)+(O1(x, y)+ . . . +OK(x, y)+K/2)/K.
    iii. In one example, the final prediction sample may be generated as: P(x, y)+(O1(x, y)+ . . . +OK(x, y))/K.
  b. In one example, OL(x, y) may be derived using intermediate P(x, y).
    i. For example, OL(x, y) may be derived using intermediate P(x, y) that is generated after horizontal and vertical interpolation but before converting it to the same bit-depth of the input sample.
  c. In one example, OL(x, y) may be derived for each prediction direction.
  d. In one example, VL(x, y), i.e., V(x, y) in the Lth pattern, may be derived as MVL(x, y)−MV1(x, y).
  e. In one example, MV1(x, y) may be with 1/N-pel MV precision and MVL(x, y) may be with 1/ML-pel MV precision.
    i. In one example, N is equal to 16 and ML is equal to 32.
    ii. In one example, N is equal to 16 and ML is equal to 64.
    iii. In one example, N is equal to 16 and ML is equal to 128.
    iv. In one example, N is equal to 8 and ML is equal to 16.
    v. In one example, N is equal to 8 and ML is equal to 32.
    vi. In one example, N is equal to 8 and ML is equal to 64.
    vii. In one example, N is equal to 8 and ML is equal to 128.
    viii. In one example, N is equal to 4 and ML is equal to 8.
    ix. In one example, N is equal to 4 and ML is equal to 16.
    x. In one example, N is equal to 4 and ML is equal to 32.
    xi. In one example, N is equal to 4 and ML is equal to 64.
    xii. In one example, N is equal to 4 and ML is equal to 128.
    xiii. ML may be different for different L
14. Optical flow-based prediction refinement method (PROF for short) may be combined with interweaved prediction.
  a. In one example, interweaved prediction may be firstly applied to generate some intermediate prediction blocks, and PROF may be further applied to refine those intermediate prediction blocks. The final prediction block may be derived according to the refined intermediate prediction blocks.
  b. In one example, the block coded in affine mode may be split into sub-blocks in K patterns. For each pattern, motion compensation may be performed to generate prediction samples of each sub-block. Then PROF may be further performed for each pattern to update the prediction of the pattern. Finally, prediction samples of each pattern are fused (such as described in any one or more of PCT/CN2018/089242, PCT/CN2018/103770, PCT/CN2018/104984, PCT/CN2019/070058, PCT/CN2019/071507, PCT/CN2019/071576) to generate the final prediction of the block. In an example embodiment, a method for improving block-based motion prediction in a video system comprises selecting a set of pixels from a video frame to form a block; partitioning the block into a first set of sub-blocks according to a first pattern; generating a first intermediate prediction block based on the first set of sub-blocks; partitioning the block into a second set of sub-blocks according to a second pattern, wherein at least one sub-block in the second set has a different size than a sub-block in the first set; generating a second intermediate prediction block based on the second set of sub-blocks; and determining a prediction block based on the first intermediate prediction block and the second intermediate prediction block. In some embodiments, the determining the prediction block includes using a partial prediction in which samples a first subset of the prediction samples are calculated as a weighted combination of the first intermediate prediction block and samples a second subset of the prediction samples are copied from sub-blocked based prediction wherein the first subset and the second subset are based on a dividing pattern.
c. In one example, for the uni-prediction, PROF and interweaved prediction may be applied to one block.
d. In one example, for the bi-prediction, interweaved prediction may be disabled while PROF may be enabled.
e. In one example, when both PROF and interweaved prediction (named comb-mode) is applied to one block, shorter tap filter may be utilized, such as 6-tap or bi-linear interpolation filter which may be different from the interpolation filter used for coding other blocks not coded with the comb-mode.
f. In one example, when both PROF and interweaved prediction (named comb-mode) is applied to one block, affine sub-block size may be set to 8×4 or 4×8 or others. Alternatively, furthermore, the sub-block size used for the comb-mode may be different from that used for coding other affine-coded blocks but not coded with the comb-mode.
g. Whether and/or how to apply PROF and interweaved prediction may be determined according to the coded information, such as prediction direction, reference picture information, color component etc. al.
15. PROF may be applied in intra prediction
a. In one example, in angular prediction, the sub-pixel position reference samples are generated by PROF. Here, neighboring reconstructed samples are considered as prediction samples, and the difference between sub-pixel position and integer-pel position are considered as V(x, y).
i. In one example, for sub-pixel position in the above or/and above-right line, the Vy(x, y) may be always zero.
ii. In one example, for sub-pixel position in the left or/and bottom-left column, the Vx(x, y) may be always zero.
iii. In one example, sub-pixel position may be with 1/N-pel precision.
(i) For example, N may be equal to 32.
(ii) For example, N may be equal to 64.
(iii) For example, N may be equal to 128.
iv. In one example, sub-pixel position may be with float precision.
16. In one example, PROF and interweaved prediction may be applied in a combined way.
a. For example, PROF is first applied, then interweaved prediction is applied.
i. The prediction with two different dividing patterns may be first processed by PROF, then they may be weighted summed to get the final prediction (or an intermedia prediction before another prediction process).
b. For example, interweaved prediction is first applied, then PROF is applied.
i. The prediction with two different dividing patterns may be weighted summed to get an intermedia prediction, then PROF is applied on the intermedia prediction to final prediction (or an intermedia prediction before another prediction process).
17. In one example, PAMC and interweaved prediction may be applied in a combined way.
a. For example, PAMC is first applied, then interweaved prediction is applied.
i. The prediction with two different dividing patterns may be generated with interpolation methods of PAMC, then they may be weighted summed to get the final prediction (or an intermedia prediction before another prediction process).
b. For example, interweaved prediction is first applied, then PAMC is applied.
18. In one example, PROF and PAMC may be applied in a combined way.
a. For example, PAMC is first applied, then PROF is applied.
i. The prediction may be generated with interpolation methods of PAMC, then they may be processed by PROF to get the final prediction (or an intermedia prediction before another prediction process).
b. For example, PROF is first applied, then PAMC is applied FIG. 27 is a block diagram of a video processing apparatus 2700. The apparatus 2700 may be used to implement one or more of the methods described herein. The apparatus 2700 may be embodied in a smartphone, tablet, computer, Internet of Things (IoT) receiver, and so on. The apparatus 2700 may include one or more processors 2702, one or more memories 2704 and video processing hardware 2706. The processor(s) 2702 may be configured to implement one or more methods described in the present document. The memory (memories) 604 may be used for storing data and code used for implementing the methods and techniques described herein. The video processing hardware 606 may be used to implement, in hardware circuitry, some techniques described in the present document, and may be partly or completely be a part of the processors 2702 (e.g., graphics processor core GPU or other signal processing circuitry).

Figure 28A:
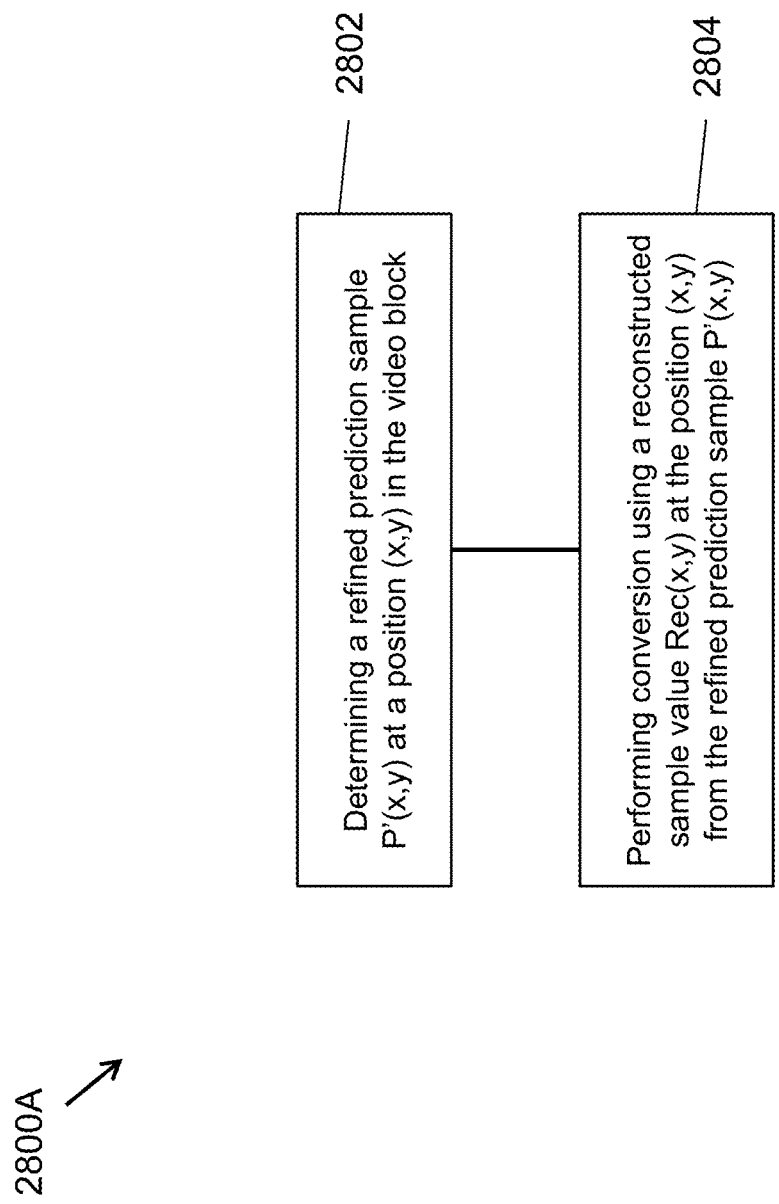
FIG. 28A to 28U are example flowcharts for methods of video processing.

FIG. 28A is a flowchart for an example of a video processing method. The method 2800A includes determining (2802), during a conversion between a video block and a bitstream representation of the video block, a refined prediction sample P'(x,y) at a position (x,y) in the video block by modifying a prediction sample P(x,y) at the position (x,y) as a function of gradients in a first direction and/or a second direction estimated at the position (x,y) and a first motion displacement and/or a second motion displacement estimated for the position (x,y), and performing (2804) the conversion using a reconstructed sample value Rec(x,y) at the position (x,y) from the refined prediction sample P'(x,y).

FIG. 28B is a flowchart for an example of a video processing method. The method 2800B includes determining (2812) a refined prediction sample P'(x,y) at a position (x,y) in a video block by modifying a prediction sample P(x,y) at the position (x,y) with a first gradient component Gx(x, y) in a first direction estimated at the position (x,y) and a second gradient component Gy(x, y) in a second direction estimated at the position (x,y) and a first motion displacement Vx(x,y) estimated for the position (x,y) and a second motion displacement Vy(x,y) estimated for the position (x,y), wherein x and y are integer numbers; and performing (2814) a conversion between the video block and a bitstream representation of the video block using a reconstructed sample value Rec(x,y) at the position (x,y) that is obtained based on the refined prediction sample P'(x,y) and a residue sample value Res(x,y).

FIG. 28C is a flowchart for an example of a video processing method. The method 2800C includes determining (2822) a refined prediction sample P'(x,y) at a position (x,y) in a video block by modifying a prediction sample P(x,y) at the position (x,y) with a first gradient component Gx(x, y) in a first direction estimated at the position (x,y) and a second gradient component Gy(x, y) in a second direction estimated at the position (x,y) and a first motion displacement Vx(x,y) estimated for the position (x,y) and a second motion displacement Vy(x,y) estimated for the position (x,y), where x and y are integer numbers; and encoding (2824) a bitstream representation of the video block to include a residue sample value Res(x,y) based on a reconstructed sample value Rec(x,y) at the position (x,y) that is based at least on the refined prediction sample P'(x,y).

In some embodiments for methods 2800B and/or 2800C, the first direction and the second direction are orthogonal to each other. In some embodiments for methods 2800B and/or 2800C, the first motion displacement represents a direction parallel to the first direction and the second motion displacement represents a direction parallel to the second direction. In some embodiments for methods 2800B and/or 2800C, P'(x,y)=P(x,y)+Gx(x,y)×Vx(x,y)+Gy(x,y)×Vy(x,y). In some embodiments for methods 2800B and/or 2800C, P'(x,y)=α(x,y)×P(x,y)+β(x,y)×Gx(x,y)×Vx(x,y)+γ(x,y)×Gy(x,y)×Vy(x,y), wherein α (x,y), β (x,y) and γ(x,y) are weighting values at the position (x,y), and wherein α (x,y), β (x,y) and γ(x,y) are integers or real numbers. In some embodiments for methods 2800B and/or 2800C, P'(x,y)=(α(x,y)×P(x,y)+β(x,y)×Gx(x,y)×Vx(x,y)+γ(x,y)×Gy(x,y)×Vy(x,y)+offsetP)/(α(x,y)+β(x,y)+γ(x,y)), wherein α (x,y), β (x,y) and γ(x,y) are weighting values at the position (x,y), and wherein α (x,y), β (x,y) and γ(x,y) are integers or real numbers. In some embodiments for methods 2800B and/or 2800C, offsetP is equal to 0. In some embodiments for methods 2800B and/or 2800C, the P'(x,y) is obtained using a binary shift operation.

In some embodiments for methods 2800B and/or 2800C, P'(x,y)=P(x,y)−Gx(x,y)×Vx(x,y)+Gy(x,y)×Vy(x,y). In some embodiments for methods 2800B and/or 2800C, P'(x,y)=P(x,y)−Gx(x,y)×Vx(x,y)−Gy(x,y)×Vy(x,y). In some embodiments for methods 2800B and/or 2800C, P'(x,y)=P(x,y)+Gx(x,y)×Vx(x,y)−Gy(x,y)×Vy(x,y). In some embodiments for methods 2800B and/or 2800C, P'(x,y)=0.5×P(x,y)+0.25×Gx(x,y)×Vx(x,y)+0.25×Gy(x,y)×Vy(x,y). In some embodiments for methods 2800B and/or 2800C, P'(x,y)=0.5×P(x,y)+0.5×Gx(x,y)×Vx(x,y)+0.5×Gy(x,y)×Vy(x,y). In some embodiments for methods 2800B and/or 2800C, P'(x,y)=P(x,y)+0.5×Gx(x,y)×Vx(x,y)+0.5×Gy(x,y)×Vy(x,y). In some embodiments for methods 2800B and/or 2800C, P'(x,y)=Shift(α(x,y)×P(x,y), n1)+Shift(β(x,y)×Gx(x,y)×Vx(x,y), n2)+Shift(γ(x,y)×Gy(x,y)×Vy(x,y), n3), wherein a Shift( ) function indicates a binary shift operation, wherein α (x,y), β (x,y) and γ(x,y) are weighting values at position (x,y), wherein α (x,y), β (x,y) and γ(x,y) are integers, and wherein n1, n2, n3 are non-negative integers. In some embodiments for methods 2800B and/or 2800C, n1, n2, n3 are equal to 1.

In some embodiments for methods 2800B and/or 2800C, P'(x,y)=SatShift(α(x,y)×P(x,y), n1)+SatShift(β(x,y)×Gx(x,y)×Vx(x,y), n2)+SatShift(γ(x,y)×Gy(x,y)×Vy(x,y), n3), wherein a SatShift( ) function indicates a saturated binary shift operation, wherein α (x,y), β (x,y) and γ(x,y) are weighting values at position (x,y), wherein α (x,y), β (x,y) and γ(x,y) are integers, and wherein n1, n2, n3 are non-negative integers. In some embodiments for methods 2800B and/or 2800C, n1, n2, n3 are equal to 1. In some embodiments for methods 2800B and/or 2800C, P'(x,y)=Shift(α(x,y)×P(x,y)+β(x,y)×Gx(x,y)×Vx(x,y)+γ(x,y)×Gy(x,y)×Vy(x,y), n1), wherein a SatShift( ) function indicates a saturated binary shift operation, wherein α (x,y), β (x,y) and γ(x,y) are weighting values at position (x,y), wherein a (x,y), β (x,y) and γ(x,y) are integers, and wherein n1 is a non-negative integer. In some embodiments for methods 2800B and/or 2800C, n1 is equal to 1.

In some embodiments for methods 2800B and/or 2800C, P'(x,y)=SatShift(α(x,y)×P(x,y)+β(x,y)×Gx(x,y)×Vx(x,y)+γ(x,y)×Gy(x,y)×Vy(x,y), n1), wherein a SatShift( ) function indicates a saturated binary shift operation, wherein α (x,y), β (x,y) and γ(x,y) are weighting values at position (x,y), wherein α (x,y), β (x,y) and γ(x,y) are integers, and wherein n1 is a non-negative integer. In some embodiments for methods 2800B and/or 2800C, n1 is equal to 1. In some embodiments for methods 2800B and/or 2800C, P'(x,y)=α(x,y)×P(x,y)+Shift(β(x,y)×Gx(x,y)×Vx(x,y), n2)+Shift(γ(x,y)×Gy(x,y)×Vy(x,y), n3), wherein a Shift( ) function indicates a binary shift operation, wherein α (x,y), β (x,y) and γ(x,y) are weighting values at position (x,y), wherein α (x,y), β (x,y) and γ(x,y) are integers, and wherein n2 and n3 are non-negative integers. In some embodiments for methods 2800B and/or 2800C, n2 and n3 are equal to 1.

In some embodiments for methods 2800B and/or 2800C, P'(x,y)=α(x,y)×P(x,y)+SatShift(β(x,y)×Gx(x,y)×Vx(x,y), n2)+SatShift(γ(x,y)×Gy(x,y)×Vy(x,y), n3), wherein a SatShift( ) function indicates a saturated binary shift operation, wherein α (x,y), β (x,y) and γ(x,y) are weighting values at position (x,y), wherein α (x,y), β (x,y) and γ(x,y) are integers, and wherein n2 and n3 are non-negative integers. In some embodiments for methods 2800B and/or 2800C, n2 and n3 are equal to 1. In some embodiments for methods 2800B and/or 2800C, P'(x,y)=α(x,y)×P(x,y)+Shift(β(x,y)×Gx(x,y)×Vx(x,y)+γ(x,y)×Gy(x,y)×Vy(x,y), n3), wherein a Shift( ) function indicates a binary shift operation, wherein α (x,y), β (x,y) and γ(x,y) are weighting values at position (x,y), wherein α (x,y), β (x,y) and γ(x,y) are integers, and wherein n3 is a non-negative integer. In some embodiments for methods 2800B and/or 2800C, n3 is equal to 1.

In some embodiments for methods 2800B and/or 2800C, P'(x,y)=α(x,y)×P(x,y)+SatShift(β(x,y)×Gx(x,y)×Vx(x,y)+γ(x,y)×Gy(x,y)×Vy(x,y), n3), wherein a SatShift( ) function indicates a saturated binary shift operation, wherein α (x,y), β (x,y) and γ(x,y) are weighting values at position (x,y), wherein α (x,y), β (x,y) and γ(x,y) are integers, and wherein n3 is a non-negative integer. In some embodiments for methods 2800B and/or 2800C, n3 is equal to 1. In some embodiments for methods 2800B and/or 2800C, 1-4, wherein P'(x,y)=f0(P(x,y))+f1(Gx(x,y)×Vx(x,y))+f2(Gy(x,y)×Vy(x,y)), and wherein the f0( ), the f1( ), and the f2( ) are three functions. In some embodiments for methods 2800B and/or 2800C, the first gradient component Gx(x, y) and the second gradient component Gy(x,y) is calculated with a second prediction sample P(x1, y1), wherein x1 belong to a first range of [x−Bx0, x+Bx1] and y1 belongs to a second range of [y−By0, y+By1], wherein Bx0 and By0 are integers, and wherein Bx1 and By1 are integers.

In some embodiments for methods 2800B and/or 2800C, the first gradient component Gx(x,y)=P(x+1, y)−P(x−1, y) and the second gradient component Gy(x,y)=P(x, y+1)−P(x,y−1). In some embodiments for methods 2800B and/or 2800C, the first gradient component Gx(x,y)=Shift(P(x+1, y)−P(x−1, y), n1) and the second gradient component Gy(x, y)=Shift (P(x, y+1)−P(x,y−1), n2), wherein a Shift( ) function indicates a binary shift operation. In some embodiments for methods 2800B and/or 2800C, the first gradient component Gx(x,y)=SatShift(P(x+1, y)−P(x−1, y), n1) and the second gradient component Gy(x,y)=SatShift (P(x, y+1)−P(x,y−1), n2), wherein a SatShift( ) function indicates a saturated binary shift operation. In some embodiments for methods 2800B and/or 2800C, n1 and n2 are equal to 1. In some embodiments for methods 2800B and/or 2800C, the prediction sample P(x,y) is a uni-prediction sample at the position (x,y). In some embodiments for methods 2800B and/or 2800C, the prediction sample P(x,y) is a final result of a bi-prediction.

In some embodiments for methods 2800B and/or 2800C, the Vx(x,y) and the Vy(x,y) are derived using a Bi-Directional Optical Flow (BIO) technique. In some embodiments for methods 2800B and/or 2800C, the prediction sample P(x,y) satisfies any one of the following: a result of multiple hypothesis inter-prediction technique; a result of affine prediction technique; a result of intra-prediction technique; a result of intra-block copy (IBC) prediction technique; generated by a triangular prediction mode (TPM) technique; generated by a geographic prediction mode (GPM) technique; a result of inter-intra combined prediction technique; a result of a global inter prediction technique, wherein the global inter prediction technique includes a region that shares a same motion model and parameters; a result of a palette coding mode; a result of inter-view prediction in multi-view or 3D video coding; a result of an inter-layer prediction in scalable video coding; and a result of a filtering operation before the determining the refined prediction sample P'(x,y).

In some embodiments for methods 2800B and/or 2800C, the prediction sample P(x,y) is a final prediction sample value when a refinement process is not applied, and the reconstructed sample value Rec(x,y) is obtained by adding the prediction sample P(x,y) with the residue sample value Res(x,y). In some embodiments for methods 2800B and/or 2800C, the refined prediction sample P'(x,y) refined from the prediction sample P(x,y) is a final prediction sample value when a refinement process is applied, and the reconstructed sample value Rec(x,y) is obtained by adding the refined prediction sample P'(x,y) with the residue sample value Res(x,y). In some embodiments for methods 2800B and/or 2800C, a bi-prediction technique or a multiple hypothesis-prediction technique applied to the video block or to sub-blocks of the video block, and the first gradient component, the second gradient component, the first motion displacement, and the second motion displacement are applied once to the final prediction sample value.

In some embodiments for methods 2800B and/or 2800C, a bi-prediction technique or a multiple hypothesis-prediction technique applied to the video block or to sub-blocks of the video block, wherein the first gradient component, the second gradient component, the first motion displacement, and the second motion displacement are applied multiple times for prediction blocks of the video block to obtain multiple sets of the first gradient component, the second gradient component, the first motion displacement, and the second motion displacement, and wherein updated predictions block are obtained by updating each prediction block based on the refined prediction sample P'(x,y), and wherein a final prediction block for the video block is generated using the updated prediction blocks. In some embodiments for methods 2800B and/or 2800C, a first set comprises at least one of the first gradient component, the second gradient component, the first motion displacement, or the second motion displacement at one position applied on a first prediction block that is different from a corresponding at least one of the first gradient component, the second gradient component, the first motion displacement, or the second motion displacement at the same one position applied on a second prediction block in a second set.

In some embodiments for methods 2800B and/or 2800C, the prediction sample P(x,y) is an intermediate prediction sample value with which a final prediction sample value is to be derived. In some embodiments for methods 2800B and/or 2800C, the prediction sample P(x,y) is a prediction sample from one reference picture list in response to the video block being inter-predicted using a bi-prediction technique. In some embodiments for methods 2800B and/or 2800C, the prediction sample P(x,y) is a prediction sample from one reference picture list in response to the video block being inter-predicted using a triangular prediction mode (TPM) technique. In some embodiments for methods 2800B and/or 2800C, the prediction sample P(x,y) is a prediction sample from one reference picture list in response to the video block being inter-predicted using a Geometric Partitioning Mode (GPM) technique. In some embodiments for methods 2800B and/or 2800C, the prediction sample P(x,y) is a prediction sample from one reference picture in response to the video block being inter-predicted using a multiple hypothesis-prediction technique.

In some embodiments for methods 2800B and/or 2800C, the prediction sample P(x,y) is an inter-prediction sample for the video block that is inter-inter combined predicted. In some embodiments for methods 2800B and/or 2800C, the prediction sample P(x,y) is an inter-prediction sample before a local illuminance compensation (LIC) technique is applied to the video block, wherein the video block uses the LIC technique. In some embodiments for methods 2800B and/or 2800C, the prediction sample P(x,y) is an inter-prediction sample before a decoder-side motion vector refinement (DMVR) technique or a decoder-side motion vector derivation (DMVD) technique is applied to the video block, wherein the video block uses the DMVR technique or the DMVD technique. In some embodiments for methods 2800B and/or 2800C, the prediction sample P(x,y) is an inter-prediction sample before weighting factors are multiplied, wherein the video block uses a weighted prediction technique or a Generalized-Bi prediction (GBi) technique.

In some embodiments for methods 2800B and/or 2800C, the first gradient component in the first direction and/or the second gradient component in the second direction is derived on a final prediction sample value, wherein the final prediction sample value is added to the residue sample value Res(x,y) to obtain the reconstructed sample value Rec(x,y) when a refinement process is not applied. In some embodiments for methods 2800B and/or 2800C, the final prediction sample value is the prediction sample P(x,y). In some embodiments for methods 2800B and/or 2800C, the first gradient component in the first direction and/or the second gradient component in the second direction is derived on an intermediate prediction sample value with which a final prediction sample value is to be derived. In some embodiments for methods 2800B and/or 2800C, the first gradient component in the first direction and/or the second gradient component in the second direction is derived from a prediction sample from one reference picture list in response to the video block being inter-predicted using a bi-prediction technique.

In some embodiments for methods 2800B and/or 2800C, the first gradient component in the first direction and/or the second gradient component in the second direction is derived from one reference picture list in response to the video block being inter-predicted using a triangular prediction mode (TPM) technique. In some embodiments for methods 2800B and/or 2800C, the first gradient component in the first direction and/or the second gradient component in the second direction is derived from one reference picture list in response to the video block being inter-predicted using a Geometric prediction mode (GPM) technique. In some embodiments for methods 2800B and/or 2800C, the first gradient component in the first direction and/or the second gradient component in the second direction is derived from one reference picture in response to the video block being inter-predicted using a multiple hypothesis-prediction technique. In some embodiments for methods 2800B and/or 2800C, the first gradient component in the first direction and/or the second gradient component in the second direction is derived from an inter-prediction sample for the video block that is inter-inter combined predicted.

In some embodiments for methods 2800B and/or 2800C, the first gradient component in the first direction and/or the second gradient component in the second direction is derived from an inter-prediction sample before a local illuminance compensation (LIC) technique is applied to the video block, wherein the video block uses the LIC technique. In some embodiments for methods 2800B and/or 2800C, the first gradient component in the first direction and/or the second gradient component in the second direction is derived from an inter-prediction sample before a decoder-side motion vector refinement (DMVR) technique or a decoder-side motion vector derivation (DMVD) technique is applied to the video block, wherein the video block uses the DMVR technique or the DMVD technique. In some embodiments for methods 2800B and/or 2800C, the first gradient component in the first direction and/or the second gradient component in the second direction is derived from an inter-prediction sample before weighting factors are multiplied, wherein the video block uses a weighted prediction technique or a Generalized-Bi prediction (GBi) technique.

In some embodiments for methods 2800B and/or 2800C, the refined prediction sample P'(x,y) is further modified to get a final prediction sample value. In some embodiments for methods 2800B and/or 2800C, the first gradient component in the first direction is represented as Gx(x, y), the second gradient component in the second direction is represented as Gy(x,y), the first motion displacement Vx(x,y), and the second motion displacement Vy(x,y), wherein the reconstructed sample value Rec(x,y) at the position (x,y) is replaced with a refined reconstruction sample value Rec'(x, y), and wherein Rec'(x,y)=Rec(x,y)+Gx(x,y)×Vx(x,y)+Gy(x,y)×Vy(x,y). In some embodiments for methods 2800B and/or 2800C, the first gradient component Gx(x, y) and the second gradient component Gy(x,y) are derived based on the reconstructed sample values.

In some embodiments for methods 2800B and/or 2800C, where the method further comprises determining the first motion displacement Vx(x,y) at the position (x,y) and the second motion displacement Vy(x,y) at the position (x,y) in the video block based on information from at least a spatial neighboring video block of the video block or from at least a temporal neighboring video block located in time relative to that of the video block. In some embodiments for methods 2800B and/or 2800C, the spatial neighboring video block is located adjacent to the video block and the temporal neighboring video block is located in time adjacent to that of the video block. In some embodiments for methods 2800B and/or 2800C, the first motion displacement Vx(x,y) and the second motion displacement Vy(x,y) are determined using a Bi-Directional Optical Flow (BIO) technique based on at least the spatial neighboring video block of the video block or at least the temporal neighboring video block located in time relative to that of the video block.

In some embodiments for methods 2800B and/or 2800C, the information from the spatial neighboring video block or from the temporal neighboring video block includes motion information, coding mode, neighboring coding unit (CU) dimensions, or neighboring CU positions. In some embodiments for methods 2800B and/or 2800C, (Vx(x,y), Vy(x,y)) is equal to MVMix that is equal to Wc(x,y)×MVc+WN1(x,y)×MVN1+WN2(x,y)×MVN2+ . . . +WNk(x,y)×MVNk, wherein MVc is a motion vector of the video block, wherein MVN1 . . . MVNk are motion vectors of k spatial neighboring video blocks or temporal neighboring video blocks, wherein N1 . . . Nk are the spatial neighboring video blocks or the temporal neighboring video blocks, and wherein. Wc, WN1 . . . WNk are weighting values that are integers or real numbers.

In some embodiments for methods 2800B and/or 2800C, (Vx(x,y), Vy(x,y)) is equal to MVMix that is equal to Shift(Wc(x,y)×MVc+WN1(x,y)×MVN1+WN2(x,y)×MVN2+ . . . +WNk(x,y)×MVNk, n1), wherein a Shift( ) function indicates a binary shift operation, wherein MVc is a motion vector of the video block, wherein MVN1 . . . MVNk are motion vectors of k spatial neighboring video blocks or temporal neighboring video blocks, wherein N1 . . . Nk are the spatial neighboring video blocks or the temporal neighboring video blocks, wherein Wc, WN1 . . . WNk are weighting values that are integers or real numbers, and wherein n1 is an integer. In some embodiments for methods 2800B and/or 2800C, (Vx(x,y), Vy(x,y)) is equal to MVMix that is equal to SatShift(Wc(x,y)×MVc+WN1(x,y)×MVN1+WN2(x,y)×MVN2+ . . . +WNk(x,y)×MVNk, n1), wherein a SatShift( ) function indicates a saturated binary shift operation, wherein MVc is a motion vector of the video block, wherein MVN1 . . . MVNk are motion vectors of k spatial neighboring video blocks or temporal neighboring video blocks, wherein N1 . . . Nk are the spatial neighboring video blocks or the temporal neighboring video blocks, wherein Wc, WN1 . . . WNk are weighting values that are integers or real numbers, and wherein n1 is an integer.

In some embodiments for methods 2800B and/or 2800C, Wc(x,y) is equal to zero. In some embodiments for methods 2800B and/or 2800C, k is equal to 1 and N1 is the spatial neighboring video block. In some embodiments for methods 2800B and/or 2800C, N1 is the spatial neighboring video block closest in position to the position (x,y) in the video block. In some embodiments for methods 2800B and/or 2800C, WN1(x,y) increases in value as N1 moves closer to the position (x,y) in the video block. In some embodiments for methods 2800B and/or 2800C, k is equal to 1 and N1 is the temporal neighboring video block. In some embodiments for methods 2800B and/or 2800C, N1 is a collocated video block in a collocated picture for the position (x,y) in the video block. In some embodiments for methods 2800B and/or 2800C, prediction samples in a basic video block are not refined in response to the prediction samples not being located at a top boundary or a left boundary of the video block.

In some embodiments for methods 2800B and/or 2800C, prediction samples in a basic video block are refined in response to the prediction samples being located at a top boundary of the video block. In some embodiments for methods 2800B and/or 2800C, (Vx(x,y), Vy(x,y)) is equal to MVMix, wherein MVMix for a basic video block located at a top boundary of the video block is derived based on an adjacent neighboring video block located above the video block. In some embodiments for methods 2800B and/or 2800C, prediction samples in a basic video block are refined in response to the prediction samples being located at a left boundary of the video block. In some embodiments for methods 2800B and/or 2800C, (Vx(x,y), Vy(x,y)) is equal to MVMix, wherein MVMix for a basic video block located at a left boundary of the video block is derived based on an adjacent neighboring video block located to left of the video block. In some embodiments for methods 2800B and/or 2800C, a motion vector of the video block and motion vectors of a number of spatial neighboring video blocks or of a number of temporal neighboring video blocks are scaled to a same reference picture.

In some embodiments for methods 2800B and/or 2800C, the same reference picture is a reference picture referred by the motion vector of the video block. In some embodiments for methods 2800B and/or 2800C, the spatial neighboring video block or the temporal neighboring video block is used to derive (Vx(x,y), Vy(x,y)) only when the spatial neighboring video block or the temporal neighboring video block is not intra-coded. In some embodiments for methods 2800B and/or 2800C, the spatial neighboring video block or the temporal neighboring video block is used to derive (Vx(x,y), Vy(x,y)) only when the spatial neighboring video block or the temporal neighboring video block is not intra-block copy (IBC) prediction coded. In some embodiments for methods 2800B and/or 2800C, the spatial neighboring video block or the temporal neighboring video block is used to derive (Vx(x,y), Vy(x,y)) only when a first motion vector of the spatial neighboring video block or the temporal neighboring video block refers to a same reference picture of a second motion vector of the video block.

In some embodiments for methods 2800B and/or 2800C, (Vx(x,y), Vy(x,y)) is equal to f(MVMix, MVc), wherein f is a function, and wherein MVc is a motion vector of the video block. In some embodiments for methods 2800B and/or 2800C, (Vx(x,y), Vy(x,y)) is equal to MVMix−MVc. In some embodiments for methods 2800B and/or 2800C, (Vx(x,y), Vy(x,y)) is equal to MVc−MVMix. In some embodiments for methods 2800B and/or 2800C, (Vx(x,y), Vy(x,y)) is equal to p×MVMix+q×MVc, where p and q are real numbers. In some embodiments for methods 2800B and/or 2800C, (Vx(x,y), Vy(x,y)) is equal to Shift(p×MVMix+q×MVc, n) or SatShift(p×MVMix+p×MVc, n), wherein p, q and n are integers, wherein a Shift( ) function indicates a binary shift operation, and wherein the SatShift( ) function indicates a saturated binary shift operation. In some embodiments for methods 2800B and/or 2800C, the video block is inter-predicted with uni-prediction, and wherein a motion vector of the video block refers to a reference picture list 0. In some embodiments for methods 2800B and/or 2800C, the video block is inter-predicted with uni-prediction, and wherein a motion vector of the video block refers to a reference picture list 1.

In some embodiments for methods 2800B and/or 2800C, the video block is inter-predicted with a bi-prediction technique, and wherein a motion vector of the video block refers to a reference picture list 0 or a reference picture list 1. In some embodiments for methods 2800B and/or 2800C, a final prediction sample value is refined based on the first motion displacement Vx(x,y) and the second motion displacement Vy(x,y) which are derived from the motion vector of the video block that refers to the reference picture list 0 or the reference picture list 1. In some embodiments for methods 2800B and/or 2800C, a first prediction sample value from the reference picture list 0 is refined based on the first motion displacement Vx(x,y) and the second motion displacement Vy(x,y) which are derived from the motion vector that refers to the reference picture list 0. In some embodiments for methods 2800B and/or 2800C, a second prediction sample value from the reference picture list 1 is refined based on the first motion displacement Vx(x,y) and the second motion displacement Vy(x,y) which are derived from the motion vector that refers to the reference picture list 1.

In some embodiments for methods 2800B and/or 2800C, the first prediction sample value refined from the reference picture list 0 and the second first prediction sample value refined from the reference picture list 1 are used to derive the final prediction sample value. In some embodiments for methods 2800B and/or 2800C, the final prediction sample value is equal to an average or a weighted average of the first prediction sample value refined from the reference picture list 0 and the second prediction sample value refined from the reference picture list 1. In some embodiments for methods 2800B and/or 2800C, the video block is inter-predicted with a bi-prediction technique, wherein a Bi-Directional Optical Flow (BIO) technique is applied to the video block, and wherein the first motion displacement Vx(x,y) and the second motion displacement Vy(x,y) are modified based on the spatial neighboring video block or the temporal neighboring video block.

In some embodiments for methods 2800B and/or 2800C, a first motion displacement vector V'(x,y)=(V'x(x,y), V'y(x,y)) is derived from the BIO technique, wherein a second motion displacement vector derived using methods other than the BIO technique is denoted as V"(x,y)=(V"x(x,y), V"y(x,y)), wherein a third motion displacement vector V(x,y)=(Vx(x,y), Vy(x,y)) is obtained as a function of the first set of motion displacement vectors and the second set of motion displacement vectors, wherein the third motion displacement vector V(x,y) is used to refine the prediction sample P(x,y). In some embodiments for methods 2800B and/or 2800C, the third set of motion displacement vector is obtained using a following equation: V(x,y)=V'(x,y)×W'(x,y)+V"(x,y)×W"(x,y), wherein W'(x,y) and W"(x,y) are integer numbers or real numbers. In some embodiments for methods 2800B and/or 2800C, the third set of motion displacement vector is obtained using a following equation: V(x,y)=Shift(V'(x,y)×W'(x,y)+V"(x,y)×W"(x,y), n1), wherein a Shift( ) function indicates a binary shift operation, and wherein W'(x,y) and W"(x,y) are integer numbers and n1 is a non-negative integer.

In some embodiments for methods 2800B and/or 2800C, the third set of motion displacement vector is obtained using a following equation: V(x,y)=SatShift(V'(x,y)×W'(x,y)+V"(x,y)×W"(x,y), n1), wherein a SatShift( ) function indicates a saturated binary shift operation, and wherein W'(x,y) and W"(x,y) are integer numbers and n1 is a non-negative integer. In some embodiments for methods 2800B and/or 2800C, the first motion displacement Vx(x,y) and the second motion displacement Vy(x,y) are modified based on the spatial neighboring video block or the temporal neighboring video block and based on the position (x,y). In some embodiments for methods 2800B and/or 2800C, the first motion displacement Vx(x,y) and the second motion displacement Vy(x,y) that are located not at a top boundary of the video block or a left boundary of the video block are not are modified. In some embodiments for methods 2800B and/or 2800C, the first motion displacement Vx(x,y) and the second motion displacement Vy(x,y) are clipped.

In some embodiments for methods 2800B and/or 2800C, the spatial neighboring video block or the temporal neighboring video block is a non-adjacent video block to the video block. In some embodiments for methods 2800B and/or 2800C, the spatial neighboring video block or the temporal neighboring video block is a non-adjacent sub-block to the video block. In some embodiments for methods 2800B and/or 2800C, the spatial neighboring video block or the temporal neighboring video block is a non-adjacent sub-block to any one of the video block or a coding tree unit (CTU) or a video processing and distribution unit (VPDU) or a current region covering a sub-block. In some embodiments for methods 2800B and/or 2800C, motion vector of the spatial neighboring video block or the temporal neighboring video block include entries in a history-based motion vector. In some embodiments for methods 2800B and/or 2800C, the determining the first motion displacement and the second motion displacement at a decoder side includes determining a presence of information associated with the first motion displacement and the second motion displacement by parsing the bitstream representation of the video block.

In some embodiments for methods 2800B and/or 2800C, the first motion displacement Vx(x,y) and the second motion displacement Vy(x,y) are derived at a sub-block level of the video block. In some embodiments for methods 2800B and/or 2800C, the first motion displacement and the second motion displacement are derived at a 2*2 block level. In some embodiments for methods 2800B and/or 2800C, the first motion displacement and the second motion displacement are derived at a 4*1 block level. In some embodiments for methods 2800B and/or 2800C, the video block is a 8×4 video block or the sub-block is a 8×4 sub-block. In some embodiments for methods 2800B and/or 2800C, the video block is a 4×8 video block or the sub-block is a 4×8 sub-block. In some embodiments for methods 2800B and/or 2800C, the video block is a 4×4 uni-prediction video block or the sub-block is a 4×4 uni-prediction sub-block. In some embodiments for methods 2800B and/or 2800C, the video block is a 8×4, 4×8 and 4×4 uni-prediction video block or the sub-block is a 8×4, 4×8 and 4×4 uni-prediction sub-block.

In some embodiments for methods 2800B and/or 2800C, the video block excludes a 4×4 bi-prediction video block or the sub-block excludes a 4×4 bi-prediction sub-block. In some embodiments for methods 2800B and/or 2800C, the video block is a luma video block. In some embodiments for methods 2800B and/or 2800C, the determining and the performing are performed based on any one or more of: a color component of the video block, a block size of the video block, a color format of the video block, a block position of the video block, a motion type, a magnitude of motion vectors, a coding mode, a magnitude of pixel gradients, a transform type, whether a bi-directional optical flow (BIO) technique is applied, whether a bi-prediction technique is applied, and whether a decoder-side motion vector refinement (DMVR) method is applied.

Figure 28D:
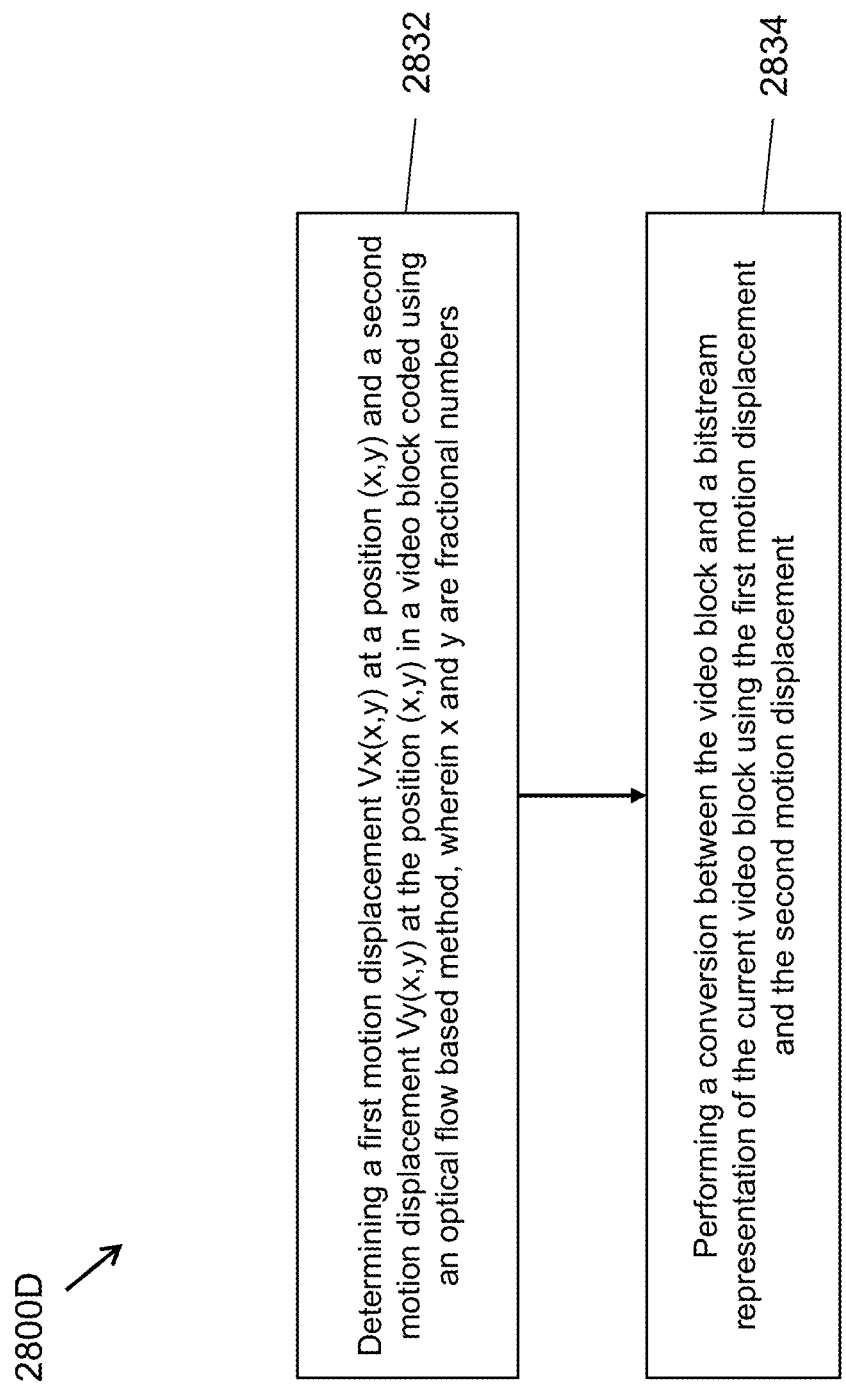

FIG. 28D is a flowchart for an example of a video processing method. The method 2800D includes determining (2832) a first motion displacement Vx(x,y) at a position (x,y) and a second motion displacement Vy(x,y) at the position (x,y) in a video block coded using an optical flow based method, wherein x and y are fractional numbers, wherein Vx(x,y) and Vy(x,y) are determined based at least on the position (x,y) and a center position of a basic video block of the video block; and performing (2834) a conversion between the video block and a bitstream representation of the current video block using the first motion displacement and the second motion displacement.

In some embodiments for method 2800D, Vx(x, y)=a×(x−xc)+b×(y−yc), wherein Vy(x, y)=c×(x−xc)+d×(y−yc), wherein (xc, yc) is the center position of the basic video block of the video block, wherein a, b, c and d are affine parameters, wherein the basic video block has dimensions w×h, and wherein a location of the basic video block includes the position (x, y). In some embodiments for method 2800D, Vx(x, y)=Shift(a×(x−xc)+b×(y−yc), n1), wherein Vy(x, y)=Shift(c×(x−xc)+d×(y−yc), n1), wherein (xc, yc) is the center position of the basic video block of the video block, wherein a, b, c and d are affine parameters, wherein the basic video block has dimensions w×h, wherein a location of the basic video block includes the position (x, y), wherein a Shift( ) function indicates a binary shift operation, and wherein n1 is an integer. In some embodiments for method 2800D, Vx(x, y)=SatShift(a×(x−xc)+b×(y−yc), n1), wherein Vy(x, y)=SatShift(c×(x−xc)+d×(y−yc), n1), wherein (xc, yc) is the center position of the basic video block of the video block, wherein a, b, c and d are affine parameters, wherein the basic video block has dimensions w×h, wherein a location of the basic video block includes the position (x, y), wherein a SatShift( ) function indicates a saturated binary shift operation, and wherein n1 is an integer.

In some embodiments for method 2800D, Vx(x, y)=−a×(x−xc)−b×(y−yc), wherein Vy(x, y)=−c×(x−xc)−d×(y−yc), wherein (xc, yc) is the center position of the basic video block of the video block, wherein a, b, c and d are affine parameters, wherein the basic video block has dimensions w×h, and wherein a location of the basic video block includes the position (x, y). In some embodiments for method 2800D, (xc, yc)=(x0+(w/2), y0+(h/2)), and wherein a top left position of the basic video block is (x0, y0). In some embodiments for method 2800D, (xc, yc)=(x0+(w/2)−1, y0+(h/2)−1), and wherein a top left position of the basic video block is (x0, y0). In some embodiments for method 2800D, (xc, yc)=(x0+(w/2), y0+(h/2)−1), and wherein a top left position of the basic video block is (x0, y0).

In some embodiments for method 2800D, (xc, yc)=(x0+(w/2)−1, y0+(h/2))), and wherein a top left position of the basic video block is (x0, y0). In some embodiments for method 2800D, c=−b and d=a in response to the video block being coded using a 4-parameter affine mode. In some embodiments for method 2800D, a, b, c and d may be derived from control point motion vectors (CPMVs), a width (W) of the video block, and a height (H) of the video block. In some embodiments for method 2800D, $$a = \frac{(mv_1^h - mv_0^h)}{W}, b = \frac{(mv_1^v - mv_0^v)}{W}, c = \frac{(mv_2^h - mv_0^h)}{H} \text{ and}$$
$$d = \frac{(mv_2^v - mv_0^v)}{H},$$

wherein mv0, mv1, and mv2 are the CPMVs, wherein a motion vector component with superscript of h indicates a motion vector component being in a first direction, wherein another motion vector component with a superscript of v indicates the another motion vector component being in a second direction, wherein the first direction is orthogonal to the second direction, wherein W indicates the width of the video block, and wherein H indicates the height of the video block. In some embodiments for method 2800D, a, b, c and d are clipped. In some embodiments for method 2800D, a, b, c and d are shifted. In some embodiments for method 2800D, a, b, c and d may be obtained from stored information about neighboring video blocks of the video block.

In some embodiments for method 2800D, a, b, c and d may be obtained from a history-based stored information. In some embodiments for method 2800D, Vx(x+1, y)=Vx(x, y)+a, and wherein Vy(x+1, y)=Vy(x, y)+c. In some embodiments for method 2800D, Vx(x+1, y)=Shift(Vx(x,y)+a, n1), wherein Vy(x+1, y)=Shift (Vy(x, y)+c, n1), wherein a Shift( ) function indicates a binary shift operation, and wherein n1 is an integer. In some embodiments for method 2800D, Vx(x+1, y)=SatShift(Vx(x,y)+a, n1), wherein Vy(x+1, y)=SatShift (Vy(x, y)+c, n1), wherein a SatShift( ) function indicates a saturated binary shift operation, and wherein n1 is an integer. In some embodiments for method 2800D, Vx(x+1, y)=Vx(x,y)+Shift(a, n1), wherein Vy(x+1, y)=Vy (x, y)+Shift (c, n1), wherein a Shift( ) function indicates a binary shift operation, and wherein n1 is an integer.

In some embodiments for method 2800D, Vx(x+1, y)=Vx (x,y)+SatShift(a, n1), wherein Vy(x+1, y)=Vy(x, y)+SatShift (c, n1), wherein a SatShift( ) function indicates a saturated binary shift operation, and wherein n1 is an integer. In some embodiments for method 2800D, Vx(x,y+1)=Vx(x,y)+b, and wherein Vy(x+1, y)=Vy(x, y)+d. In some embodiments for method 2800D, Vx(x,y+1)=Shift(Vx(x,y)+b, n1), wherein Vy(x, y+1)=Shift (Vy(x, y)+d, n1), wherein a Shift( ) function indicates a binary shift operation, and wherein n1 is an integer. In some embodiments for method 2800D, Vx(x,y+1)=SatShift(Vx(x,y)+b, n1), wherein Vy(x, y+1)=SatShift (Vy(x, y)+d, n1), wherein a SatShift( ) function indicates a saturated binary shift operation, and wherein n1 is an integer. In some embodiments for method 2800D, Vx(x,y+1)=Vx(x,y)+Shift(b, n1), wherein Vy(x, y+1)=Vy(x, y)+Shift (d, n1), wherein a Shift( ) function indicates a binary shift operation, and wherein n1 is an integer.

In some embodiments for method 2800D, Vx(x,y+1)=Vx (x,y)+SatShift(b, n1), wherein Vy(x, y+1)=Vy(x, y)+SatShift (d, n1), wherein a SatShift( ) function indicates a saturated binary shift operation, and wherein n1 is an integer. In some embodiments for method 2800D, a, b, c, and d refer to a reference picture list 0 or a reference picture list 1 in response to the video block being affine-predicted with a bi-prediction technique. In some embodiments for method 2800D, final prediction samples are refined with the first motion displacement Vx(x,y) and the second motion displacement Vy(x,y), and wherein the first motion displacement Vx(x,y) and the second motion displacement Vy(x,y) are derived using a, b, c, and d that refer to any one of a reference picture list 0 and a reference picture list 1.

In some embodiments for method 2800D, prediction samples for the first motion displacement Vx(x,y) and the second motion displacement Vy(x,y) are from the reference picture list 0 and are refined, and wherein the first motion displacement Vx(x,y) and the second motion displacement Vy(x,y) are derived using a, b, c, and d that refer to a reference picture list 0. In some embodiments for method 2800D, prediction samples for the first motion displacement Vx(x,y) and the second motion displacement Vy(x,y) are from the reference picture list 1 and are refined, and wherein the first motion displacement Vx(x,y) and the second motion displacement Vy(x,y) are derived using a, b, c, and d that refer to a reference picture list 1. In some embodiments for method 2800D, a first prediction sample from the reference picture list 0 is refined with a first motion displacement vector (V0x(x,y), V0y(x,y)) derived using a, b, c, and d that refer to a reference picture list 0, wherein a second prediction sample from the reference picture list 1 is refined with a second motion displacement vector (V1x(x,y), V1y(x,y)) derived using a, b, c, and d that refer to a reference picture list 1, and wherein final prediction samples is obtained by combining the first prediction sample and the second prediction sample.

In some embodiments for method 2800D, motion displacement vector (Vx(x,y), Vy(x,y)) has a first motion vector precision that is different from a second motion vector precision of a motion vector of the video block. In some embodiments for method 2800D, the first motion vector precision is 1/8 pixel precision. In some embodiments for method 2800D, the first motion vector precision is 1/16 pixel precision. In some embodiments for method 2800D, the first motion vector precision is 1/32 pixel precision. In some embodiments for method 2800D, the first motion vector precision is 1/64 pixel precision. In some embodiments for method 2800D, the first motion vector precision is 1/128 pixel precision. In some embodiments for method 2800D, motion displacement vector (Vx(x,y), Vy(x,y)) are determined based on a float pixel precision technique.

Figure 28E:
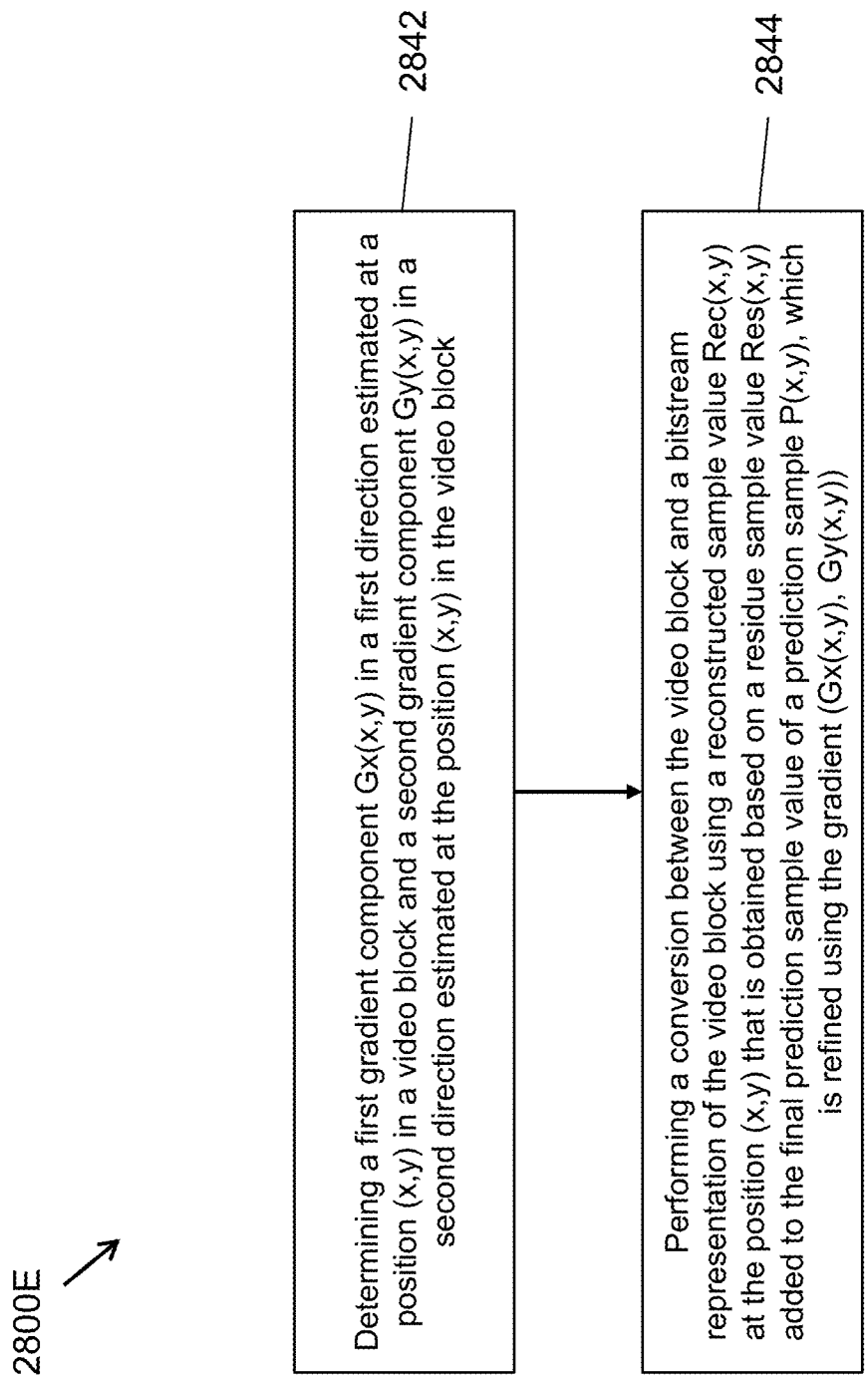

FIG. 28E is a flowchart for an example of a video processing method. The method 2800E includes determining (2842) a first gradient component Gx(x,y) in a first direction estimated at a position (x,y) in a video block and a second gradient component Gy(x,y) in a second direction estimated at the position (x,y) in the video block, wherein the first gradient component and the second gradient component are based on a final prediction sample value of a prediction sample P(x,y) at the position (x,y), and wherein x and y are integer numbers; and performing (2844) a conversion between the video block and a bitstream representation of the video block using a reconstructed sample value Rec(x,y) at the position (x,y) that is obtained based on a residue sample value Res(x,y) added to the final prediction sample value of a prediction sample P(x,y), which is refined using the gradient (Gx(x,y), Gy(x,y)).

Figure 28F:
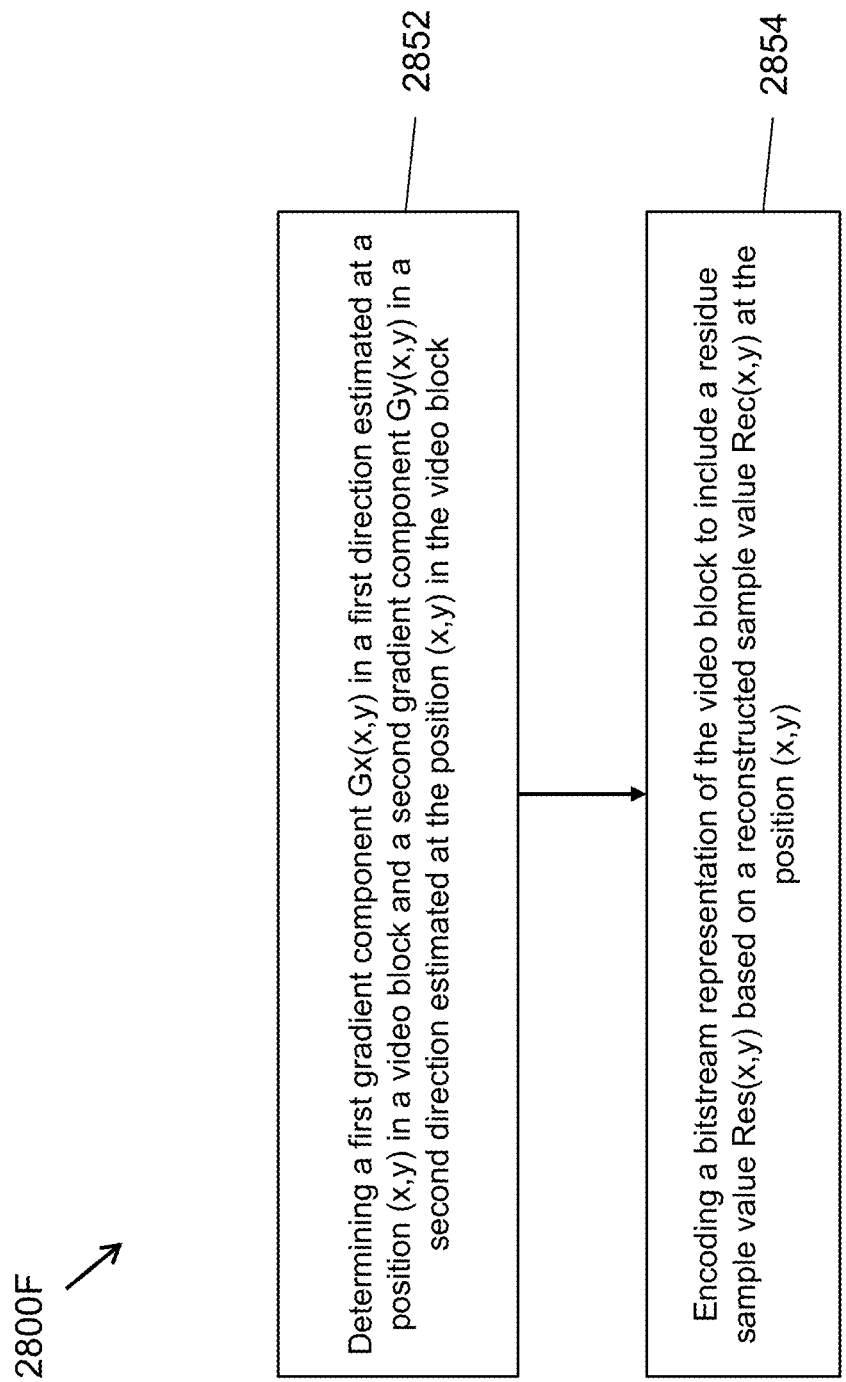

FIG. 28F is a flowchart for an example of a video processing method. The method 2800F includes determining (2852) a first gradient component Gx(x,y) in a first direction estimated at a position (x,y) in a video block and a second gradient component Gy(x,y) in a second direction estimated at the position (x,y) in the video block, wherein the first gradient component and the second gradient component are based on a final prediction sample value of a prediction sample P(x,y) at the position (x,y), and wherein x and y are integer numbers; and encoding (2854) a bitstream representation of the video block to include a residue sample value Res(x,y) based on a reconstructed sample value Rec(x,y) at the position (x,y), wherein the reconstructed sample value Rec(x,y) is based on the residue sample value Res(x,y) added to the final prediction sample value of a prediction sample P(x,y), which is refined using the gradient (Gx(x,y), Gy(x,y)).

Figure 28G:
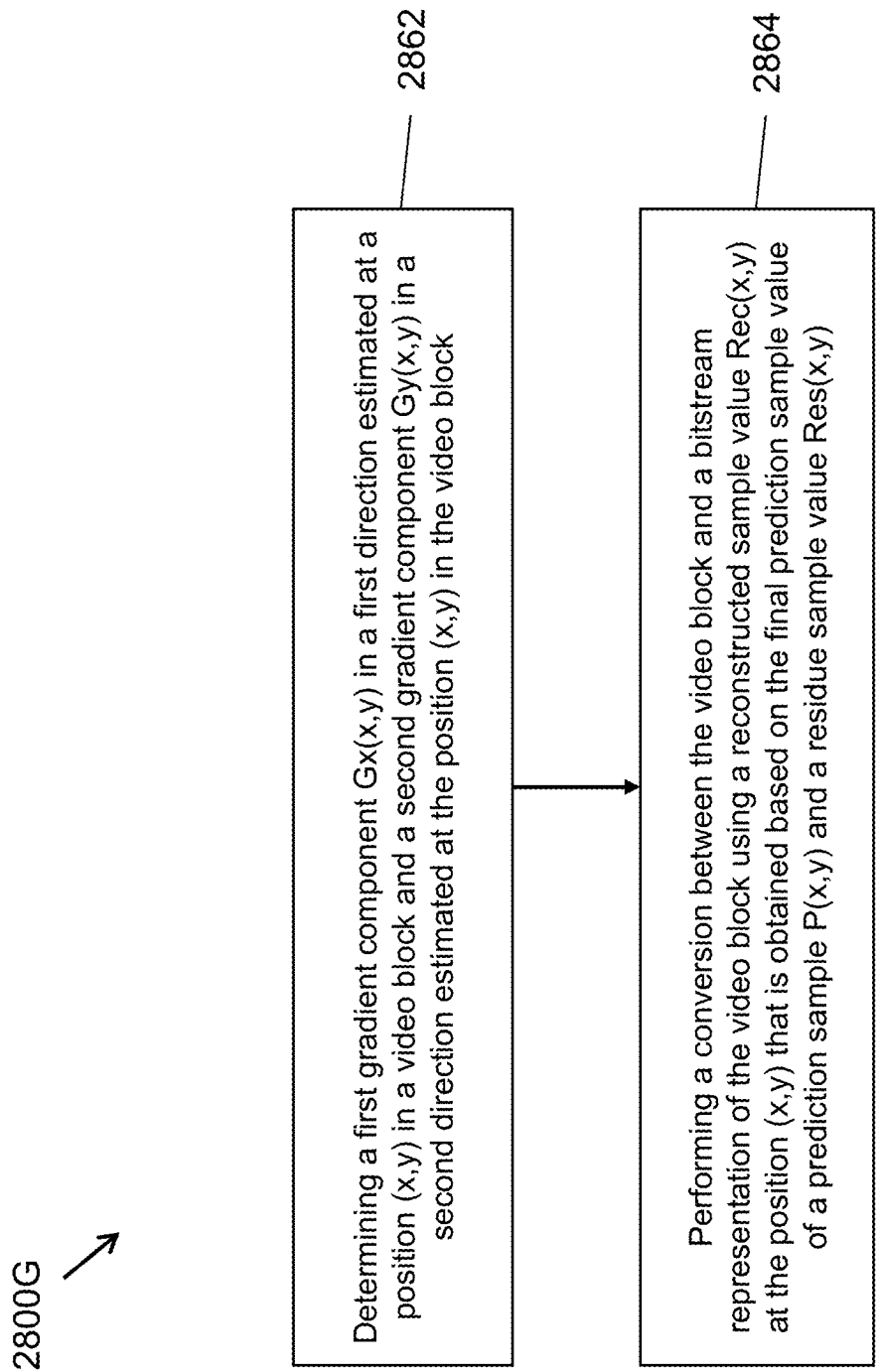

FIG. 28G is a flowchart for an example of a video processing method. The method 2800G includes determining (2862) a first gradient component Gx(x,y) in a first direction estimated at a position (x,y) in a video block and a second gradient component Gy(x,y) in a second direction estimated at the position (x,y) in the video block, wherein the first gradient component and the second gradient component are based on an intermediate prediction sample value of a prediction sample P(x,y) at the position (x,y), wherein a final prediction sample value of the prediction sample P(x,y) is based on the intermediate prediction sample value, and wherein x and y are integer numbers; and performing (2864) a conversion between the video block and a bitstream representation of the video block using a reconstructed sample value Rec(x,y) at the position (x,y) that is obtained based on the final prediction sample value of a prediction sample P(x,y) and a residue sample value Res(x,y).

Figure 28H:
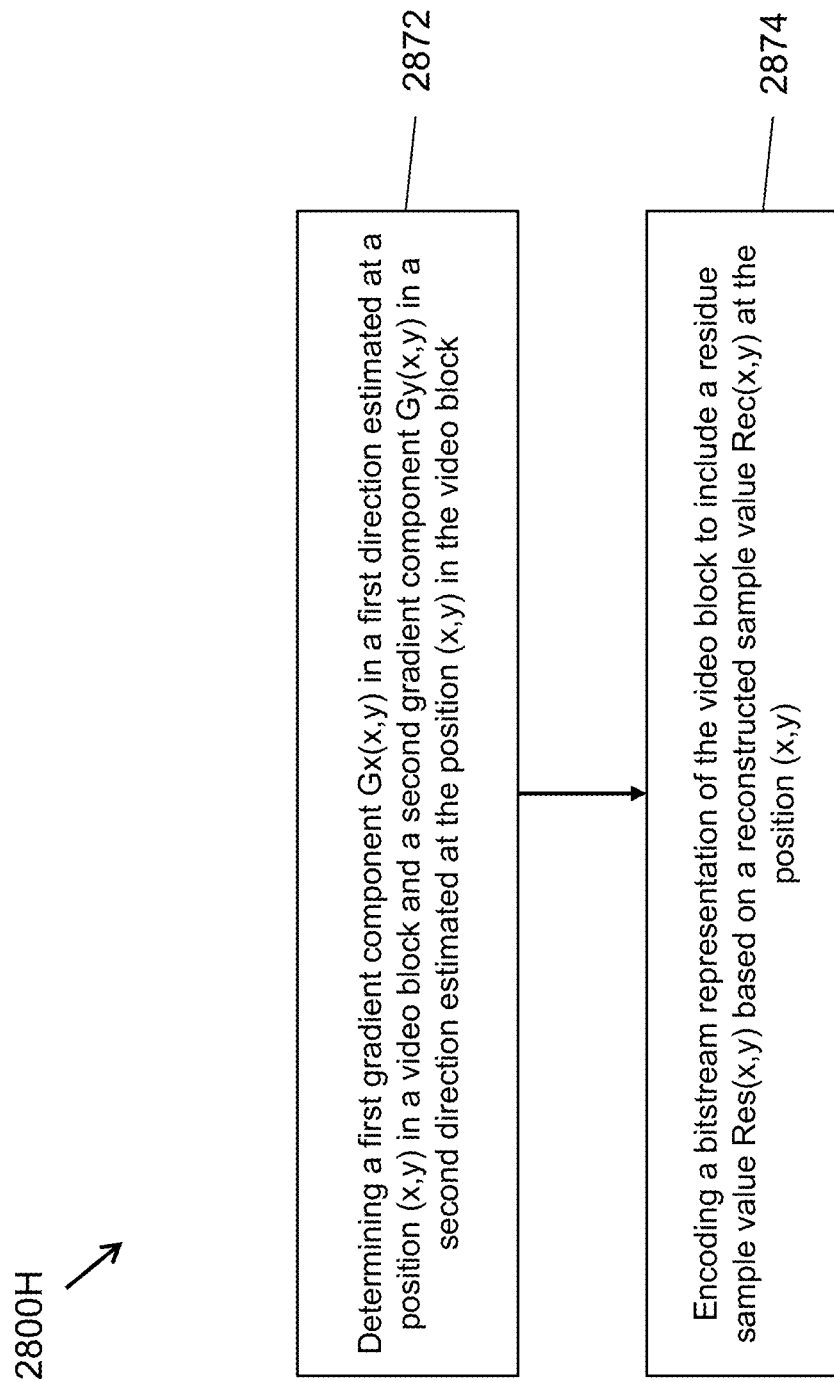

FIG. 28H is a flowchart for an example of a video processing method. The method 2800H includes determining (2872) a first gradient component Gx(x,y) in a first direction estimated at a position (x,y) in a video block and a second gradient component Gy(x,y) in a second direction estimated at the position (x,y) in the video block, wherein the first gradient component and the second gradient component are based on an intermediate prediction sample value of a prediction sample P(x,y) at the position (x,y), wherein a final prediction sample value of the prediction sample P(x,y) is based on the intermediate prediction sample value, and wherein x and y are integer numbers; and encoding (2874) a bitstream representation of the video block to include a residue sample value Res(x,y) based on a reconstructed sample value Rec(x,y) at the position (x,y), wherein the reconstructed sample value Rec(x,y) is based on the final prediction sample value of a prediction sample P(x,y) and the residue sample value Res(x,y).

In some embodiments for methods 2800G and/or 2800H, the first gradient component and/or the second gradient component are based on the intermediate prediction sample value from one reference picture list in response to the video block being affine-predicted using a bi-prediction technique. In some embodiments for methods 2800G and/or 2800H, the first gradient component and/or the second gradient component are based on an inter-prediction sample value before local illuminance compensation (LIC) is applied when the video block uses an affine mode and the LIC. In some embodiments for methods 2800G and/or 2800H, the first gradient component and/or the second gradient component are based on an inter-prediction sample value before being multiplied by weighting factors when the video block uses an affine mode with any one of a weighted prediction technique or a Bi-prediction with CU-level Weights (BCW) technique. In some embodiments for methods 2800G and/or 2800H, the first gradient component and/or the second gradient component are based on an inter-prediction sample value with local illuminance compensation (LIC) that is applied when the video block uses an affine mode and the LIC. In some embodiments for methods 2800G and/or 2800H, the first gradient component and/or the second gradient component are based on an inter-prediction sample value being multiplied by weighting factors when the video block uses an affine mode with any one of a weighted prediction technique or a Bi-prediction with CU-level Weights (BCW) technique.

Figure 28I:
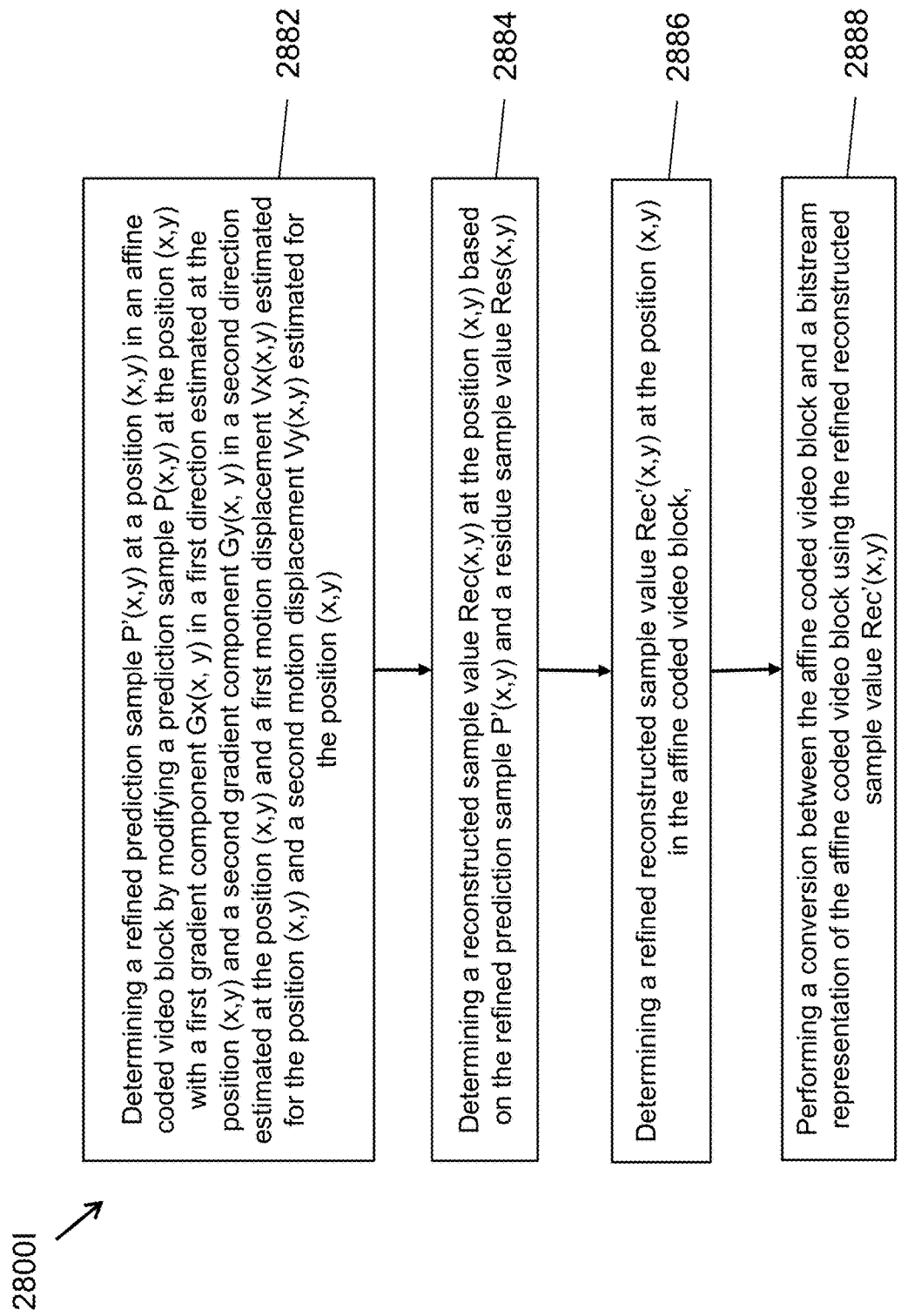

FIG. 28I is a flowchart for an example of a video processing method. The method 2800I includes determining (2882) a refined prediction sample P'(x,y) at a position (x,y) in an affine coded video block by modifying a prediction sample P(x,y) at the position (x,y) with a first gradient component Gx(x, y) in a first direction estimated at the position (x,y) and a second gradient component Gy(x, y) in a second direction estimated at the position (x,y) and a first motion displacement Vx(x,y) estimated for the position (x,y) and a second motion displacement Vy(x,y) estimated for the position (x,y), wherein the first direction is orthogonal to the second direction, and wherein x and y are integer numbers; determining (2884) a reconstructed sample value Rec(x,y) at the position (x,y) based on the refined prediction sample P'(x,y) and a residue sample value Res(x,y); determining (2886) a refined reconstructed sample value Rec'(x,y) at the position (x,y) in the affine coded video block, wherein Rec'(x,y)=Rec(x,y)+Gx(x,y)×Vx(x,y)+Gy(x,y)×Vy(x,y); and performing (2888) a conversion between the affine coded video block and a bitstream representation of the affine coded video block using the refined reconstructed sample value Rec'(x,y).

Figure 28J:
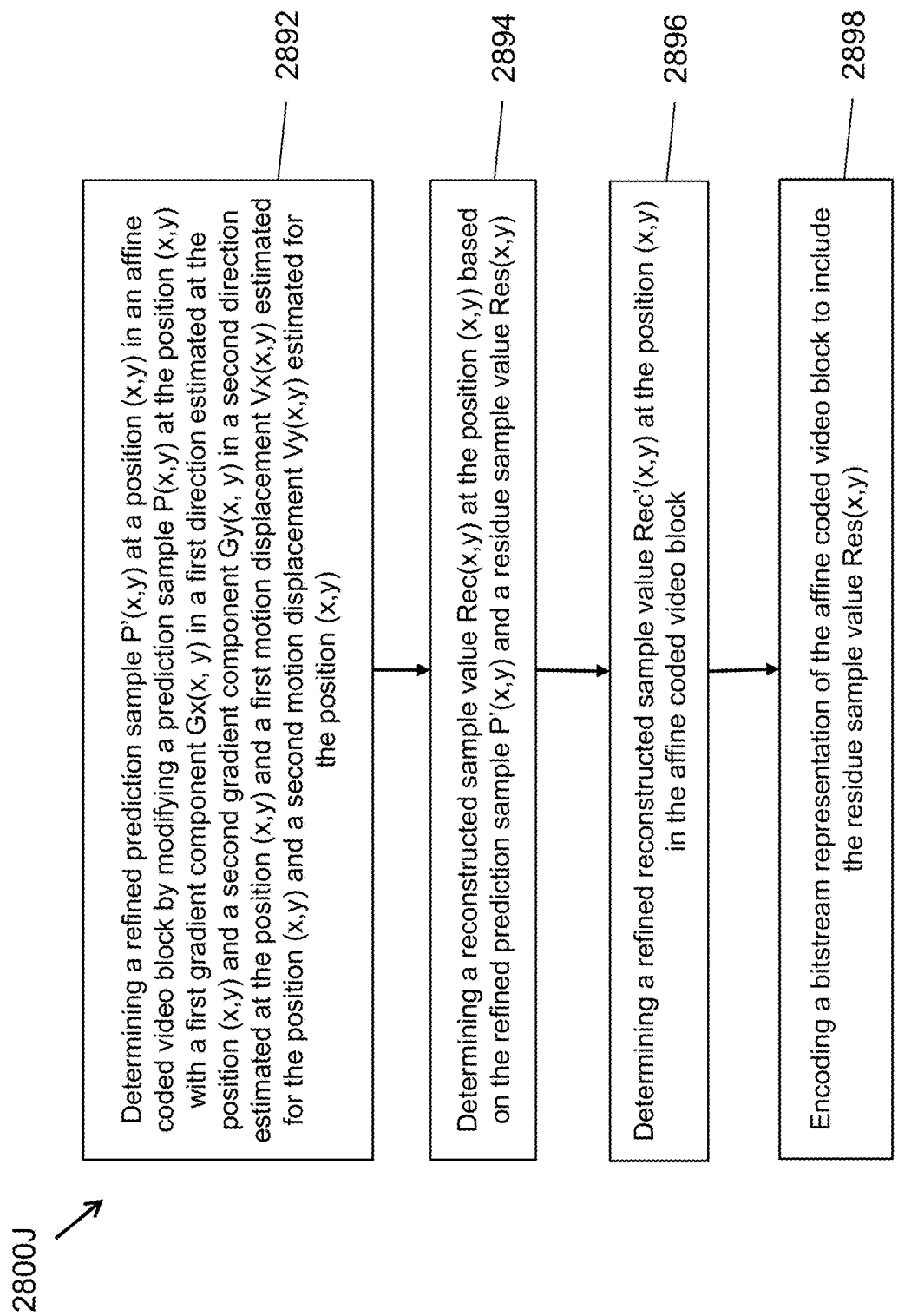

FIG. 28J is a flowchart for an example of a video processing method. The method 2800J includes determining (2892) a refined prediction sample P'(x,y) at a position (x,y) in an affine coded video block by modifying a prediction sample P(x,y) at the position (x,y) with a first gradient component Gx(x, y) in a first direction estimated at the position (x,y) and a second gradient component Gy(x, y) in a second direction estimated at the position (x,y) and a first motion displacement Vx(x,y) estimated for the position (x,y) and a second motion displacement Vy(x,y) estimated for the position (x,y), wherein the first direction is orthogonal to the second direction, and wherein x and y are integer numbers; determining (2894) a reconstructed sample value Rec(x,y) at the position (x,y) based on the refined prediction sample P'(x,y) and a residue sample value Res(x,y); determining (2896) a refined reconstructed sample value Rec'(x,y) at the position (x,y) in the affine coded video block, wherein Rec'(x,y)=Rec(x,y)+Gx(x,y)×Vx(x,y)+Gy(x,y)×Vy(x,y); and encoding (2898) a bitstream representation of the affine coded video block to include the residue sample value Res(x,y).

In some embodiments for methods 2800I and/or 2800J, the first gradient component Gx(x,y) and/or the second gradient component Gy(x,y) are based on the reconstructed sample value Rec(x,y). In some embodiments for methods 2800I and/or 2800J, the first motion displacement Vx(x,y) and the second motion displacement Vy(x,y) are derived at a 2*2 block level of the affine coded video block.

FIG. 28K is a flowchart for an example of a video processing method. The method 2800K includes determining (28102), for a video block in an affine mode, a motion vector with a 1/N pixel precision; determining (28104) a motion displacement vector (Vx(x,y), Vy(x,y)) estimated for a position (x,y) in the video block, wherein the motion displacement vector is derived with a 1/M pixel precision, wherein N and M are positive integers, and wherein x and y are integer numbers; and performing (28106) a conversion between the video block and a bitstream representation of the video block using the motion vector, and the motion displacement vector.

In some embodiments for method 2800K, N is equal to 8 and M is equal to 16, or N is equal to 8 and M is equal to 32, or N is equal to 8 and M is equal to 64, or N is equal to 8 and M is equal to 128, or N is equal to 4 and M is equal to 8, or N is equal to 4 and M is equal to 16, or N is equal to 4 and M is equal to 32, or N is equal to 4 and M is equal to 64, or N is equal to 4 and M is equal to 128.

Figure 28L:
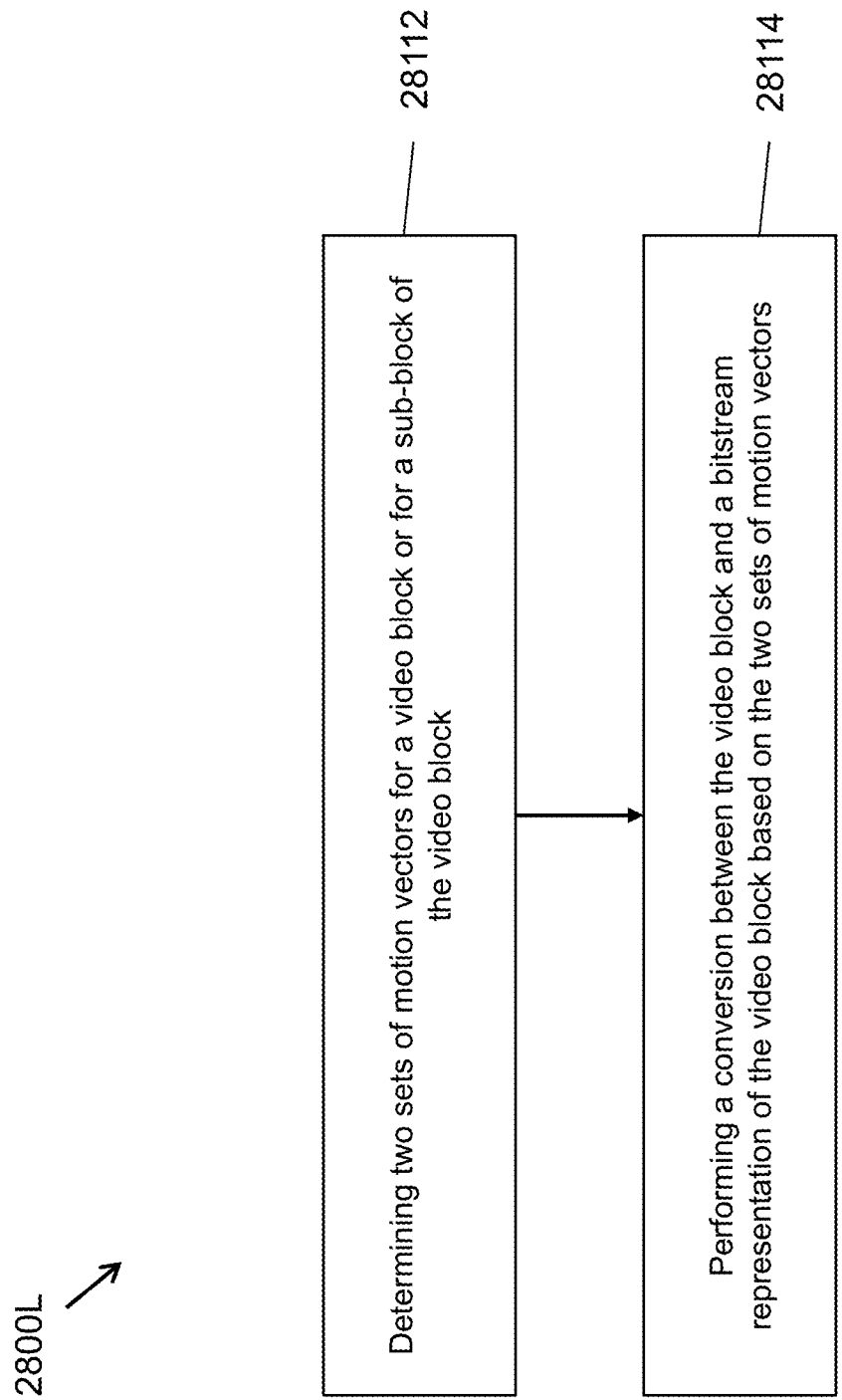

FIG. 28L is a flowchart for an example of a video processing method. The method 2800L includes determining (28112) two sets of motion vectors for a video block or for a sub-block of the video block, wherein each of the two sets of motion vectors has a different motion vector pixel precision, and wherein the two sets of motion vectors are determined using a temporal motion vector prediction (TMVP) technique or using a sub-block based temporal motion vector prediction (SbTMVP) technique; and performing (28114) a conversion between the video block and a bitstream representation of the video block based on the two sets of motion vectors.

In some embodiments for method 2800L, the two sets of motion vectors include a first set of motion vectors and a second set of motion vectors, wherein the first set of motion vectors have a 1/N pixel precision, wherein the second set of motion vectors have a 1/M pixel precision, and wherein N and M are positive integers. In some embodiments for method 2800L, N is equal to 8 and M is equal to 16, or N is equal to 8 and M is equal to 32, or N is equal to 8 and M is equal to 64, or N is equal to 8 and M is equal to 128, or N is equal to 4 and M is equal to 8, or N is equal to 4 and M is equal to 16, or N is equal to 4 and M is equal to 32, or N is equal to 4 and M is equal to 64, or N is equal to 4 and M is equal to 128, or N is equal to 16 and M is equal to 32, or N is equal to 16 and M is equal to 64, or N is equal to 16 and M is equal to 128. In some embodiments for method 2800L, a refinement is applied to the two set of motion vectors by applying an optical flow based method, wherein the two sets of motion vectors include a first set of motion vectors and a second set of motion vectors, wherein prediction samples in the optical flow based method are obtained using the first set of motion vectors, and wherein a motion displacement estimated for a position in the video block in the optical flow based method is obtained by subtracting a second motion vector of the second set of motion vector from a first motion vector of the first set of motion vectors.

In some embodiments for method 2800L, the optical flow based method is applied by: determining a refined prediction sample P'(x,y) at a position (x,y) in the video block by modifying a prediction sample P(x,y) at the position (x,y) with a first gradient component Gx(x, y) in a first direction estimated at the position (x,y) and a second gradient component Gy(x, y) in a second direction estimated at the position (x,y) and a first motion displacement Vx(x,y) estimated for the position (x,y) and a second motion displacement Vy(x,y) estimated for the position (x,y), wherein x and y are integer numbers, and wherein a reconstructed sample value Rec(x,y) at the position (x,y) is obtained based on the refined prediction sample P'(x,y) and a residue sample value Res(x,y). In some embodiments for method 2800L, the first direction and the second direction are orthogonal to each other. In some embodiments for method 2800L, the first motion displacement represents a direction parallel to the first direction and the second motion displacement represents a direction parallel to the second direction. In some embodiments for method 2800L, P'(x,y)=P(x,y)+Gx(x,y)×Vx(x,y)+Gy(x,y)×Vy(x,y).

In some embodiments for any one or more of methods 2800C to 2800L, the video block is a 8×4 video block or the sub-block is a 8×4 sub-block. In some embodiments for any one or more of methods 2800C to 2800L, the video block is a 4×8 video block or the sub-block is a 4×8 sub-block. In some embodiments for any one or more of methods 2800C to 2800L, the video block is a 4×4 uni-prediction video block or the sub-block is a 4×4 uni-prediction sub-block. In some embodiments for any one or more of methods 2800C to 2800L, the video block is a 8×4, 4×8 and 4×4 uni-prediction video block or the sub-block is a 8×4, 4×8 and 4×4 uni-prediction sub-block. In some embodiments for any one or more of methods 2800C to 2800L, the video block excludes a 4×4 bi-prediction video block or the sub-block excludes a 4×4 bi-prediction sub-block. In some embodiments for any one or more of methods 2800C to 2800L, the video block is a luma video block. In some embodiments for any one or more of methods 2800C to 2800L, the determining and the performing are performed based on any one or more of: a color component of the video block, a block size of the video block, a color format of the video block, a block position of the video block, a motion type, a magnitude of motion vectors, a coding mode, a magnitude of pixel gradients, a transform type, whether a bi-directional optical flow (BIO) technique is applied, whether a bi-prediction technique is applied, and whether a decoder-side motion vector refinement (DMVR) method is applied.

Figure 28M:
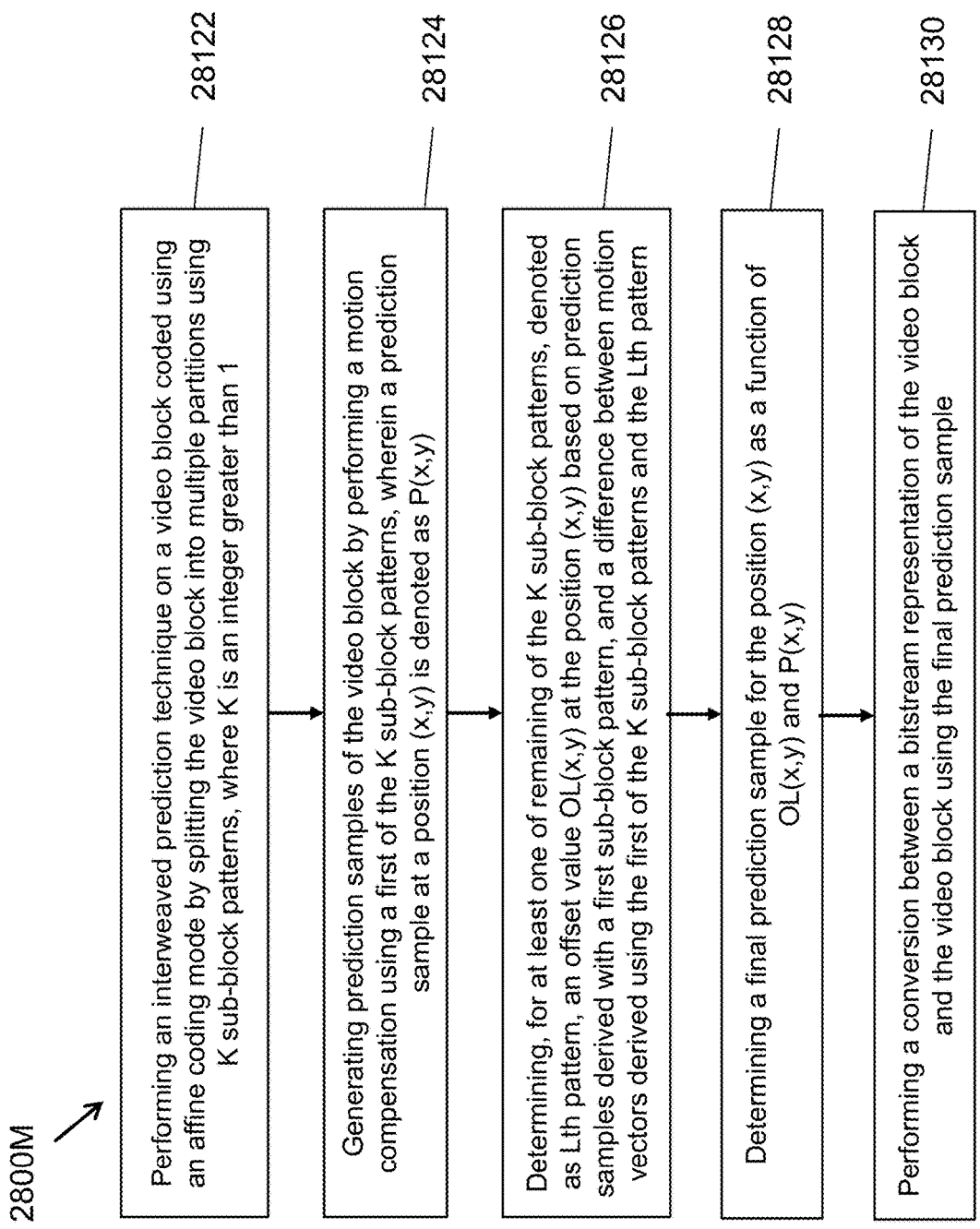

FIG. 28M is a flowchart for an example of a video processing method. The method 2800M includes performing (28122) an interweaved prediction technique on a video block coded using an affine coding mode by splitting the video block into multiple partitions using K sub-block patterns, where K is an integer greater than 1; generating (28124) prediction samples of the video block by performing a motion compensation using a first of the K sub-block patterns, wherein a prediction sample at a position (x,y) is denoted as P(x,y), wherein x and y are integer numbers; determining (28126), for at least one of remaining of the K sub-block patterns, denoted as Lth pattern, an offset value OL(x,y) at the position (x,y) based on prediction samples derived with a first sub-block pattern, and a difference between motion vectors derived using the first of the K sub-block patterns and the Lth pattern; determining (28128) a final prediction sample for the position (x,y) as a function of OL(x,y) and P(x,y); and performing (28130) a conversion between a bitstream representation of the video block and the video block using the final prediction sample.

In some embodiments for method 2800M, K=2, and wherein L=1, and the final prediction sample is determined using P(x, y)+((O1(x, y)+1)>>1), where >> represents a binary shift operation. In some embodiments for method 2800M, K=2, and wherein L=1, and the final prediction sample is determined using P(x, y)+(O1(x, y)>>1), where >> represents a binary shift operation. In some embodiments for method 2800M, the final prediction sample is determined using P(x, y)+(O1(x, y)+ ... +OK(x, y)+K/2)/K. In some embodiments for method 2800M, the final prediction sample is determined using P(x, y)+(O1(x, y)+ ... +OK(x, y))/K. In some embodiments for method 2800M, the OL(x,y) is generated from the prediction samples derived with the first sub-block pattern after performing horizontal and vertical interpolation and before converting the prediction samples to bit-depth of an input samples. In some embodiments for method 2800M, the OL(x,y) is generated for each prediction direction. In some embodiments for method 2800M, a motion displacement at the position (x,y) in the Lth pattern is derived as a difference between a first motion vector at the position (x,y) from the Lth pattern and a second motion vector at the position (x,y) from the first of the K sub-block patterns In some embodiments for method 2800M, the motion vectors derived using the first of the K sub-block patterns have a 1/N pixel precision, and the motion vectors derived using the Lth pattern have a 1/ML pixel precision, wherein N and M are integers. In some embodiments for method 2800M, wherein N=16 and ML=32, or N=16 and ML=64, or N=16 and ML=128, or N=8 and ML=16, or N=8 and ML=32, or N=8 and ML=64, or N=8 and ML=128, or N=4 and ML=8, or N=4 and ML=16, or N=4 and ML=32, or N=4 and ML=64, or N=4 and ML=128. In some embodiments for method 2800M, ML is different for each of the remaining of the K sub-block patterns.

FIG. 28N is a flowchart for an example of a video processing method. The method 2800N includes performing (28132) a conversion between a bitstream representation of a video block and the video block using a final prediction sample, wherein the final prediction sample is derived from refined intermediate prediction samples by: (a) performing, based on a rule, an interweaved prediction technique followed by an optical flow-based prediction refinement technique, or (b) performing a motion compensation technique.

In some embodiments for method 2800N, the video block is coded using an affine coding mode by splitting the video block into multiple partitions using K sub-block patterns, wherein K is an integer greater than 1, wherein for each sub-block pattern, prediction samples are generated for each sub-block by performing the motion compensation technique, wherein the prediction samples are refined using the optical flow-based prediction refinement technique to obtain updated prediction samples, and wherein the final prediction sample is generated by combining the refined prediction samples of each sub-block pattern. In some embodiments for method 2800N, the video block is a uni-prediction video block, and wherein the interweaved prediction technique and the optical flow-based prediction refinement technique are applied to the video block. In some embodiments for method 2800N, a first tap filter is applied to the video block coded with the interweaved prediction technique and/or the optical flow-based prediction refinement technique, wherein the first tap filter is shorter than a second tap filter used for an interpolation filter used for other video blocks not coded with the interweaved prediction technique and/or the optical flow-based prediction refinement technique.

In some embodiments for method 2800N, an affine sub-block size for the video block is 8×4 or 4×8. In some embodiments for method 2800N, a first sub-block size used for the video block coded with the interweaved prediction technique and/or the optical flow-based prediction refinement technique, wherein the first sub-block size is different than a second sub-block size of other video blocks not coded with the interweaved prediction technique and/or the optical flow-based prediction refinement technique. In some embodiments for method 2800N, the rule is based on coded information of the video block, wherein the coded information includes a prediction direction of the video block, a reference picture information of the video block, or a color component of the video block.

Figure 28O:
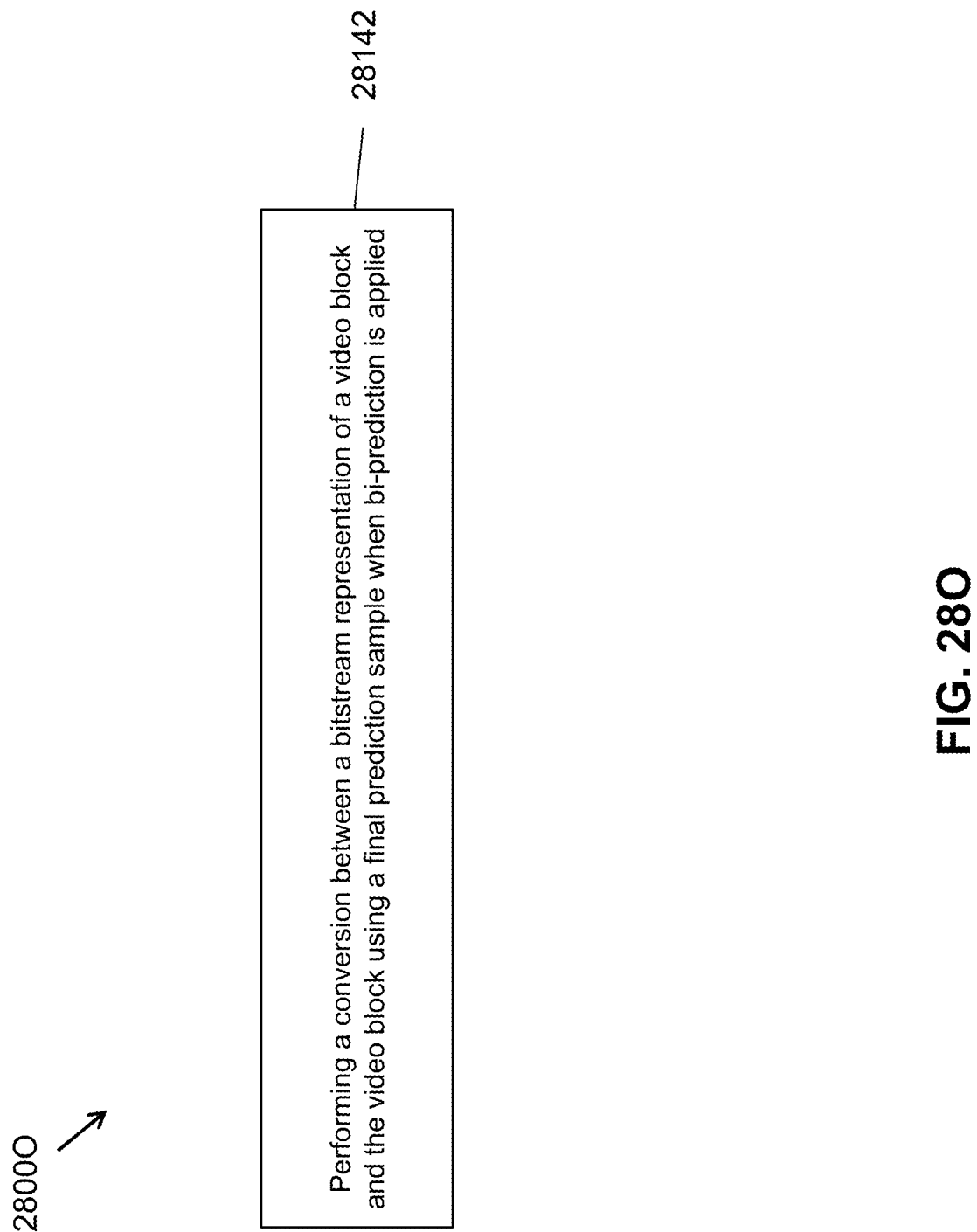

FIG. 28O is a flowchart for an example of a video processing method. The method 2800O includes performing (28142) a conversion between a bitstream representation of a video block and the video block using a final prediction sample when bi-prediction is applied, wherein the final prediction sample is derived from refined intermediate prediction samples by: (a) performing an optical flow-based prediction refinement technique, wherein an interweaved prediction technique is disabled, or (b) performing a motion compensation technique.

Figure 28P:
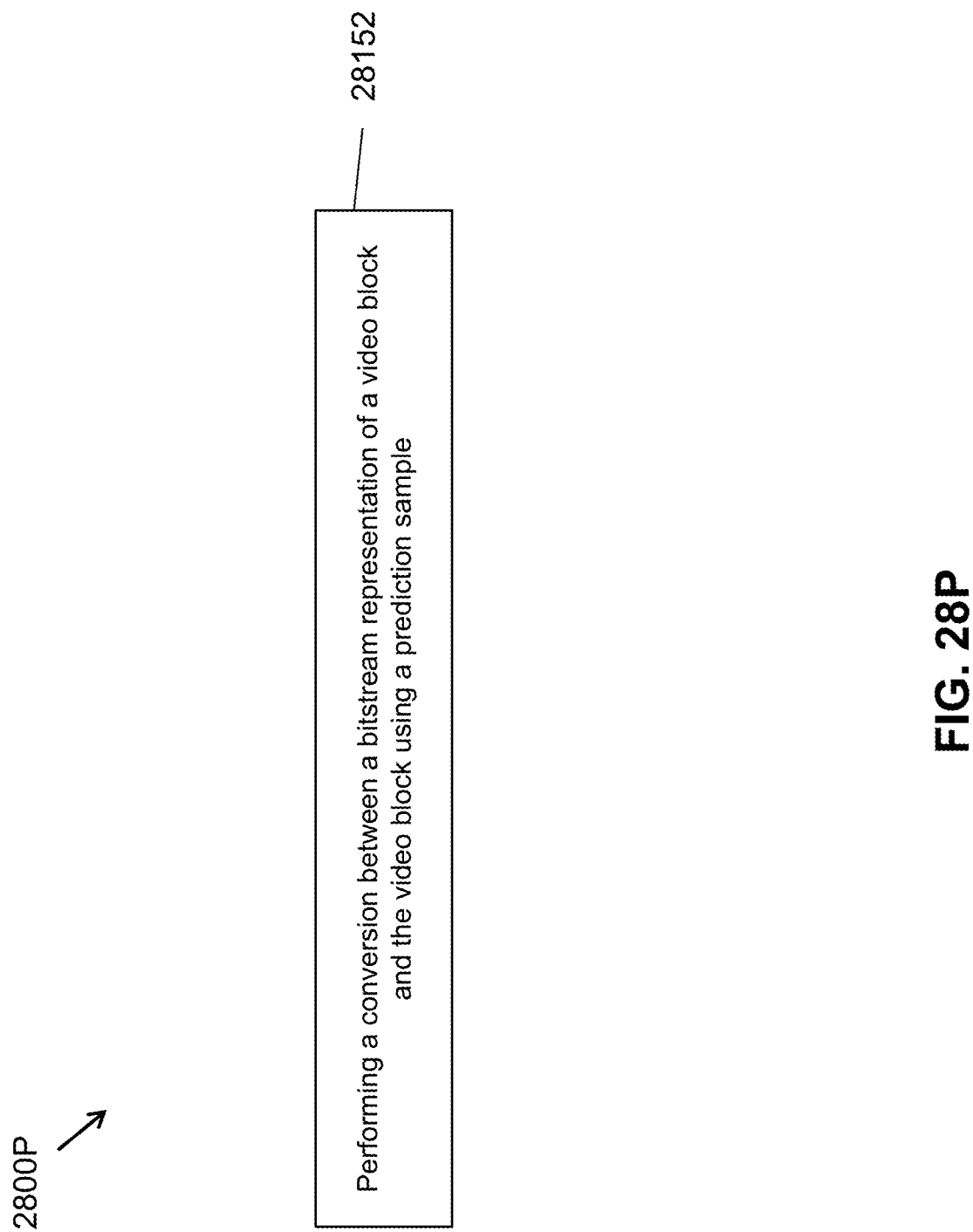

FIG. 28P is a flowchart for an example of a video processing method. The method 2800P includes performing (28152) a conversion between a bitstream representation of a video block and the video block using a prediction sample, wherein the prediction sample is derived from refined intermediate prediction samples by performing an optical flow-based prediction refinement technique, wherein the performing the optical-flow based prediction refinement technique depends on only of a first set of motion displacement $Vx(x,y)$ estimated in a first direction for the video block or a second set of motion displacement $Vy(x,y)$ estimated in a second direction for the video block, wherein x and y are integer numbers, and wherein the first direction is orthogonal to the second direction.

In some embodiments for method 2800P, the prediction sample is based on only the first set of motion displacement $Vx(x,y)$, and wherein the second set of motion displacement $Vy(x,y)$ are zero. In some embodiments for method 2800P, the prediction sample is based on only the second set of motion displacement $Vy(x,y)$, and wherein the first set of motion displacement $Vx(x,y)$ are zero. In some embodiments for method 2800P, the prediction sample is based on only the first set of motion displacement $Vx(x,y)$ in response to a sum of absolute values of the first set of motion displacement being greater than or equal to a sum of absolute value of the second set of motion displacement $Vy(x,y)$. In some embodiments for method 2800P, the prediction sample is based on only the second set of motion displacement $Vy(x,y)$ in response to a sum of absolute values of the first set of motion displacement being less than or equal to a sum of absolute value of the second set of motion displacement $Vy(x,y)$.

In some embodiments for method 2800P, the prediction sample is based on only the first set of motion displacement $Vx(x,y)$ in response to a sum of absolute values of a first gradient component in the first direction being greater than or equal to a sum of absolute values of a second gradient component in the second direction. In some embodiments for method 2800P, the prediction sample is based on only the second set of motion displacement $Vy(x,y)$ in response to a sum of absolute values of a first gradient component in the first direction being less than or equal to a sum of absolute values of a second gradient component in the second direction.

Figure 28Q:
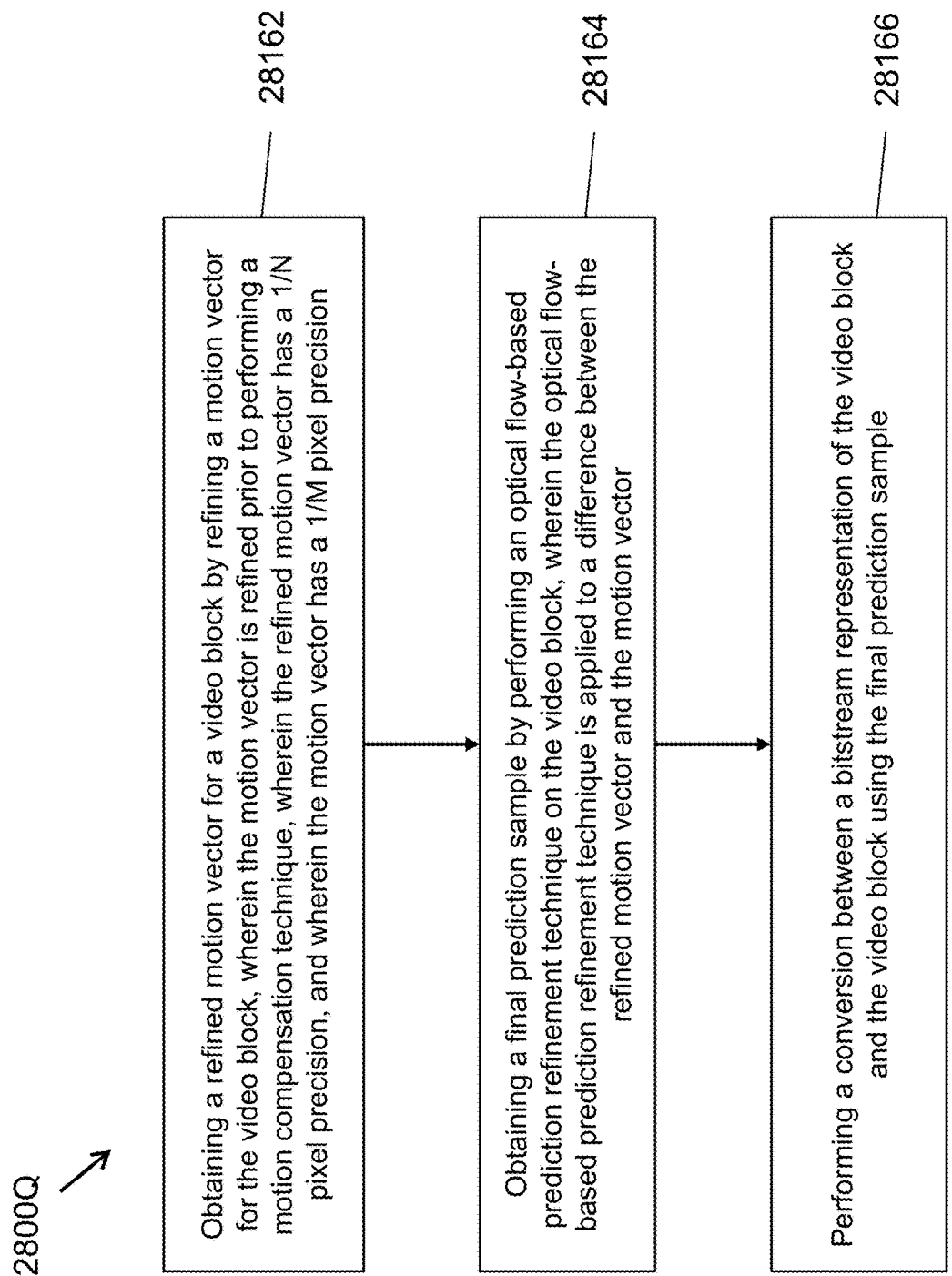

FIG. 28Q is a flowchart for an example of a video processing method. The method 2800Q includes obtaining (28162) a refined motion vector for a video block by refining a motion vector for the video block, wherein the motion vector is refined prior to performing a motion compensation technique, wherein the refined motion vector has a 1/N pixel precision, and wherein the motion vector has a 1/M pixel precision; obtaining (28164) a final prediction sample by performing an optical flow-based prediction refinement technique on the video block, wherein the optical flow-based prediction refinement technique is applied to a difference between the refined motion vector and the motion vector; and performing (28166) a conversion between a bitstream representation of the video block and the video block using the final prediction sample.

In some embodiments for method 2800Q, M is 16 and N is 1, or M is 8 and N is 1, or M is 4 and N is 1, or M is 16 and N is 2, or M is 8 and N is 2, or M is 4 and N is 2. In some embodiments for method 2800Q, the motion vector is in either a first direction or a second direction, wherein the first direction is orthogonal to the second direction, and wherein the optical flow-based prediction refinement technique is performed in either the first direction or the second direction. In some embodiments for method 2800Q, the video block is a bi-prediction video block, and wherein the motion vector is refined in a first direction or a second direction, wherein the first direction is orthogonal to the second direction. In some embodiments for method 2800Q, the video block is a bi-prediction video block, and wherein the motion vector is refined in a first direction and a second direction, wherein the first direction is orthogonal to the second direction. In some embodiments for method 2800Q, the optical flow-based prediction refinement technique is performed on a first number of fractional motion vector components of the motion vector, wherein the first number of fractional motion vector components is less than or equal to a second number of fractional motion vector components of the motion vector.

Figure 28R:
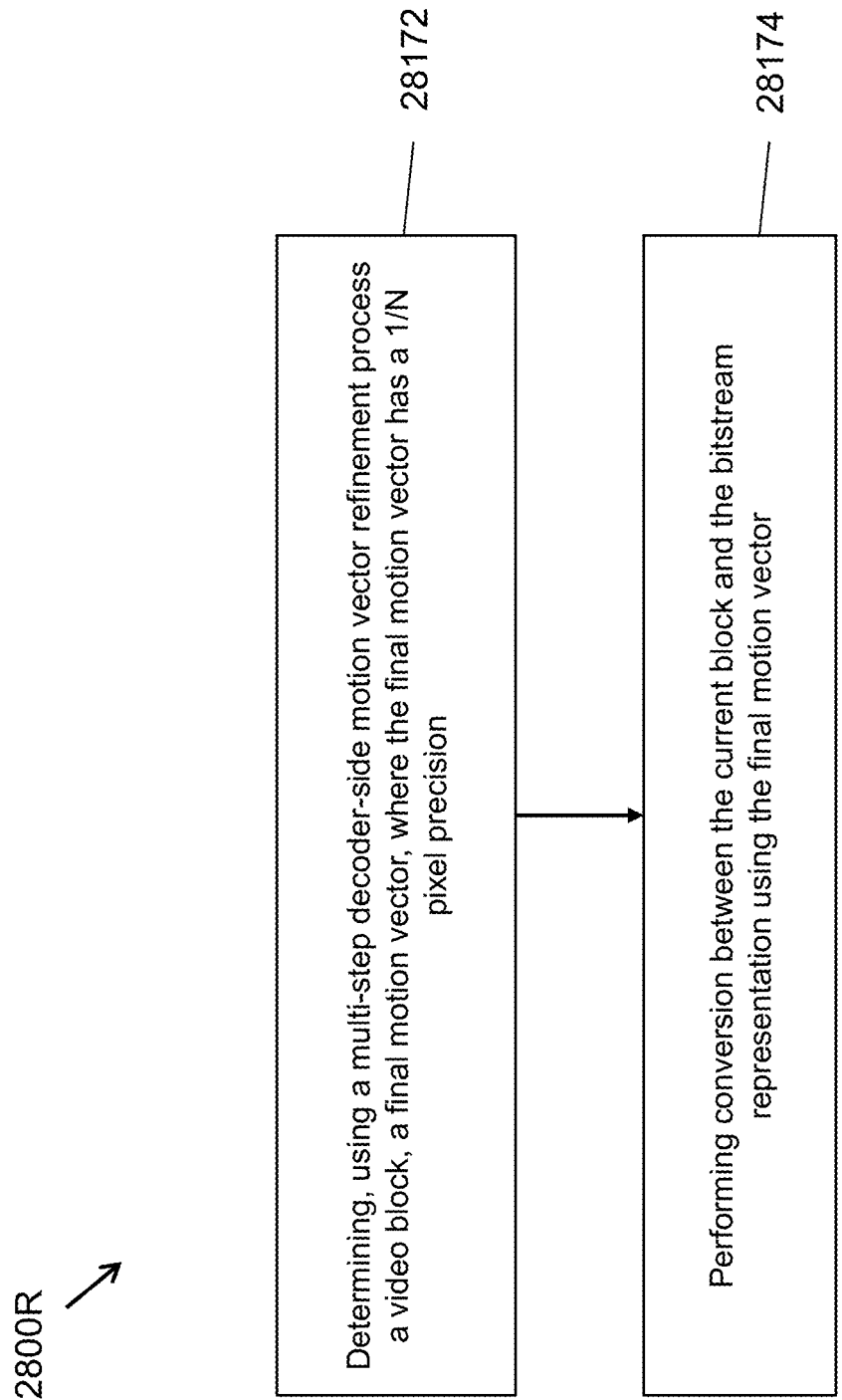

FIG. 28R is a flowchart for an example of a video processing method. The method 2800R includes determining (28172), using a multi-step decoder-side motion vector refinement process a video block, a final motion vector, wherein the final motion vector has a 1/N pixel precision; and performing (28174) conversion between the current block and the bitstream representation using the final motion vector.

In some embodiments for method 2800R, N is equal to 32 or 64 or 128. In some embodiments for method 2800R, the final motion vector is a refined motion vector obtained by refining a motion vector for the video block, wherein the motion vector is refined prior to performing a motion compensation technique, wherein a final prediction sample is obtained by performing an optical flow-based prediction refinement technique on the video block, wherein the optical flow-based prediction refinement technique is applied to a difference between the final motion vector and the motion vector. In some embodiments for method 2800R, the optical flow based prediction refinement technique is applied by:

determining a refined prediction sample P'(x,y) at a position (x,y) in the video block by modifying a prediction sample P(x,y) at the position (x,y) with a first gradient component Gx(x, y) in a first direction estimated at the position (x,y) and a second gradient component Gy(x, y) in a second direction estimated at the position (x,y) and a first motion displacement Vx(x,y) estimated for the position (x,y) and a second motion displacement Vy(x,y) estimated for the position (x,y), wherein x and y are integer numbers, and wherein the final prediction sample Rec(x,y) at the position (x,y) is obtained based on the refined prediction sample P'(x,y) and a residue sample value Res(x,y). In some embodiments for method 2800R, the first direction and the second direction are orthogonal to each other. In some embodiments for method 2800R, the first motion displacement represents a direction parallel to the first direction and the second motion displacement represents a direction parallel to the second direction.

In some embodiments for method 2800R, P'(x,y)=P(x,y)+Gx(x,y)×Vx(x,y)+Gy(x,y)×Vy(x,y). In some embodiments for method 2800R, the refined motion vector having a 1/32 pixel precision is rounded to a 1/16 pixel precision prior to performing the motion compensation technique. In some embodiments for method 2800R, the refined motion vector having a 1/32 pixel precision is rounded to a 1 pixel precision prior to performing the motion compensation technique. In some embodiments for method 2800R, the refined motion vector having a 1/64 pixel precision is rounded to a 1/16 pixel precision prior to performing the motion compensation technique. In some embodiments for method 2800R, the refined motion vector having a 1/64 pixel precision is rounded to a 1 pixel precision prior to performing the motion compensation technique.

Figure 28S:
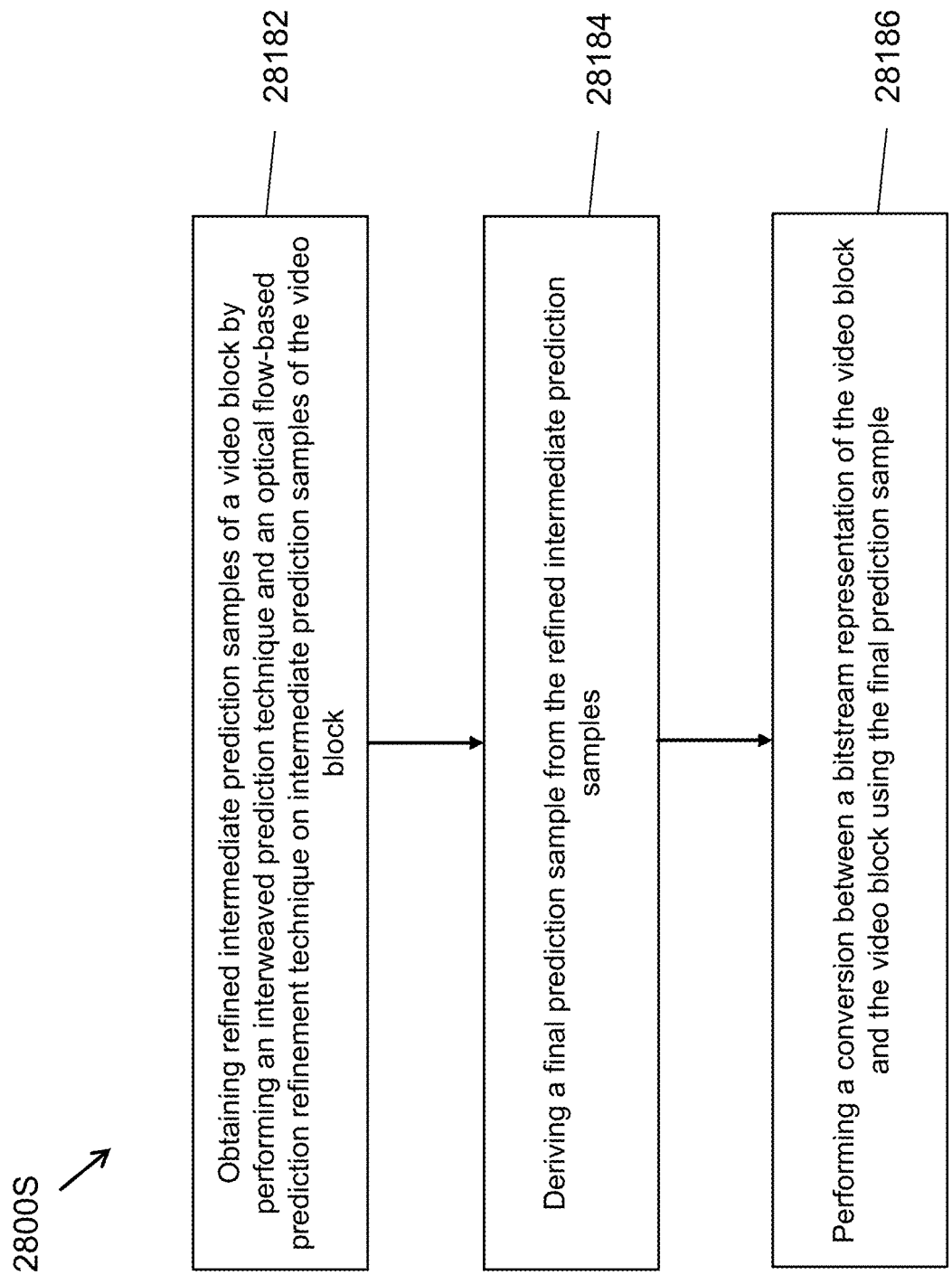

FIG. 28S is a flowchart for an example of a video processing method. The method 2800S includes obtaining (28182) refined intermediate prediction samples of a video block by performing an interweaved prediction technique and an optical flow-based prediction refinement technique on intermediate prediction samples of the video block; deriving (28184) a final prediction sample from the refined intermediate prediction samples; and performing (28186) a conversion between a bitstream representation of the video block and the video block using the final prediction sample.

In some embodiments for method 2800S, the optical flow-based prediction refinement technique is performed first and then the interweaved prediction technique is performed. In some embodiments for method 2800S, the refined intermediate prediction samples with two different sub-block dividing patterns are first obtained using the optical flow-based prediction refinement technique, and wherein the refined intermediate prediction samples are weighted summed using the interweaved prediction technique to obtain the final prediction sample. In some embodiments for method 2800S, the interweaved prediction technique is performed first and then the optical flow-based prediction refinement technique is performed. In some embodiments for method 2800S, the intermediate prediction samples with two different sub-block dividing patterns are first weighted summed using the interweaved prediction technique to obtain the refined intermediate prediction samples, and wherein the optical flow-based prediction refinement technique is performed on the refined intermediate prediction samples to obtain the final prediction sample. In some embodiments for any one or more of methods 2800N to 2800S, the optical flow-based prediction refinement technique is a prediction refinement with optical flow (PROF) technique.

Figure 28T:
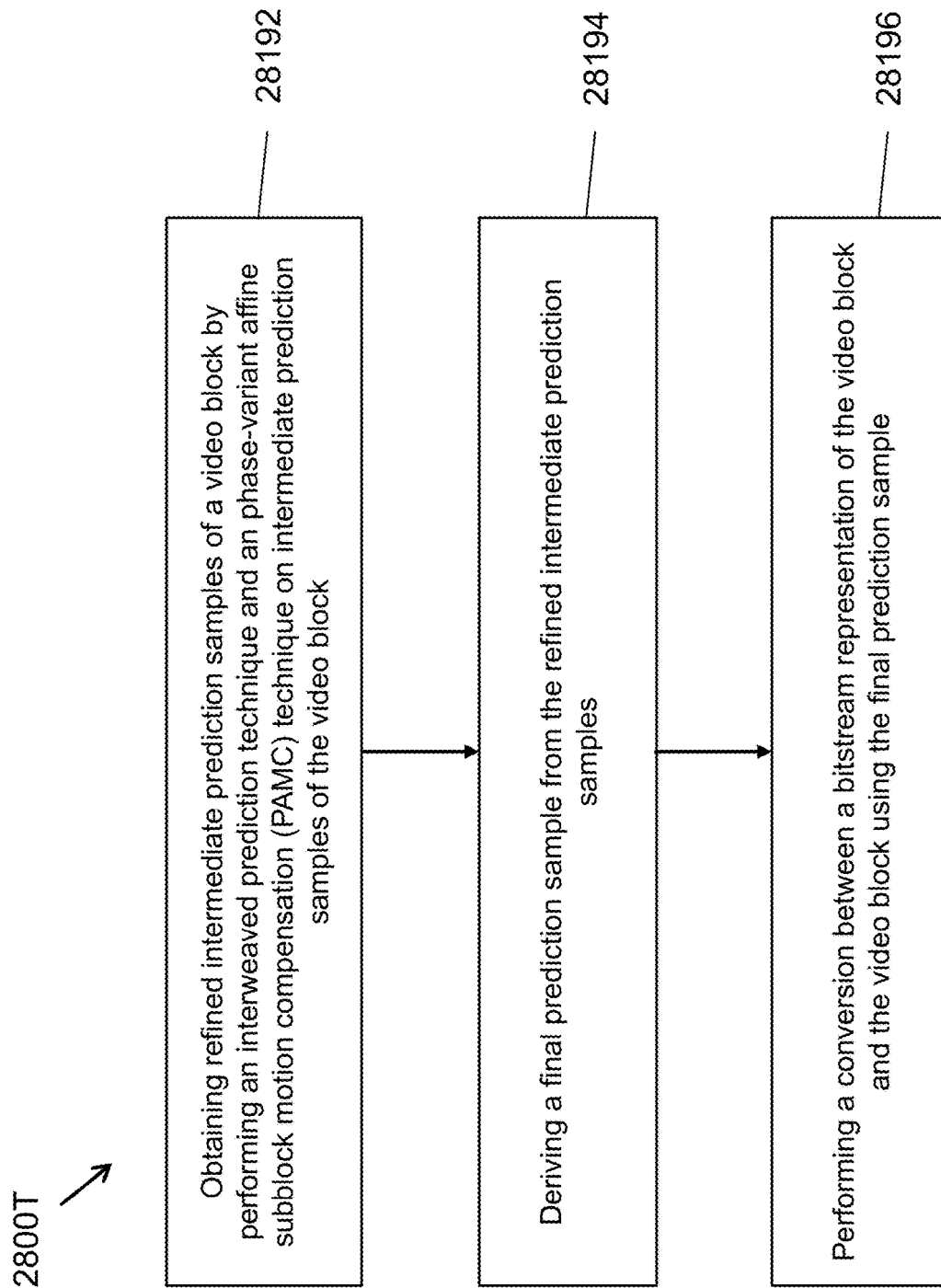

FIG. 28T is a flowchart for an example of a video processing method. The method 2800T includes obtaining (28192) refined intermediate prediction samples of a video block by performing an interweaved prediction technique and an phase-variant affine subblock motion compensation (PAMC) technique on intermediate prediction samples of the video block; deriving (28194) a final prediction sample from the refined intermediate prediction samples; and performing (28196) a conversion between a bitstream representation of the video block and the video block using the final prediction sample.

In some embodiments for method 2800T, the PAMC technique is performed first and then the interweaved prediction technique is performed. In some embodiments for method 2800T, the refined intermediate prediction samples with two different sub-block dividing patterns are first obtained using an interpolation method of the PAMC technique, and wherein the refined intermediate prediction samples are weighted summed using the interweaved prediction technique to obtain the final prediction sample. In some embodiments for method 2800T, the interweaved prediction technique is performed first and then the PAMC technique is performed.

FIG. 28U is a flowchart for an example of a video processing method. The method 2800U includes obtaining (28202) refined intermediate prediction samples of a video block by performing an optical flow-based prediction refinement technique and an phase-variant affine subblock motion compensation (PAMC) technique on intermediate prediction samples of the video block; deriving (28204) a final prediction sample from the refined intermediate prediction samples; and performing (28206) a conversion between a bitstream representation of the video block and the video block using the final prediction sample.

In some embodiments for method 2800U, the PAMC technique is performed first and then the optical flow-based prediction refinement technique is performed. In some embodiments for method 2800U, the refined intermediate prediction samples with two different sub-block dividing patterns are first obtained using an interpolation method of the PAMC technique, and wherein the refined intermediate prediction samples are processed using the optical flow-based prediction refinement technique to obtain the final prediction sample. In some embodiments for method 2800U, the optical flow-based prediction refinement technique is performed first and then the PAMC technique is performed.

In the present document, the term "video processing" may refer to video encoding (including transcoding), video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

The following listing of clauses provides additional features and embodiments that use the techniques disclosed in the present document.

1. A method of video processing, comprising: determining, during a conversion between a video block and a bitstream representation of the video block, a refined prediction sample P'(x,y) at a position (x,y) in the video block by modifying a prediction sample P(x,y) at the position (x,y) as a function of gradients in a first direction and/or a second direction estimated at the position (x,y) and a first motion displacement and/or a second motion displacement estimated for the position (x,y); and performing the conversion using a reconstructed sample value Rec(x,y) at the position (x,y) from the refined prediction sample P'(x,y).

2. The method of clause 1, wherein the first direction and the second direction are orthogonal to each other.

3. The method of any of clauses 1 or 2, wherein the first motion displacement is in a direction parallel to the first direction and the second motion displacement is in a direction parallel to the second direction.

4. The method of any of clauses 1-3, wherein the gradient in the first direction is represented as Gx(x, y), the gradient in the second direction is represented as Gv(x,y), the first motion displacement is represented as Vx(x,y) and the second motion displacement is represented as Vy(x,y), and wherein P'(x,y)=P(x,y)+Gx(x,y)×Vx(x,y)+Gy(x,y)×Vy(x,y).

5. The method of any of clauses 1-3, wherein the gradient in the first direction is represented as Gx(x, y), the gradient in the second direction is represented as Gv(x,y), the first motion displacement is represented as Vx(x,y) and the second motion displacement is represented as Vy(x,y), and wherein P'(x,y)=α(x,y)×P(x,y)+β(x,y)×Gx(x,y)×Vx(x,y)+γ(x,y)×Gy(x,y)×Vy(x,y), wherein α (x,y), β (x,y) and γ(x,y) are weighting values at the position (x,y), and are integers or real numbers.

6. The method of any of clauses 1-5, wherein the prediction sample P(x,y) is a uni-prediction sample at the location (x,y).

7. The method of any of clauses 1-5, wherein the prediction sample P(x,y) is a final result of a bi-prediction at the location (x,y).

8. The method of any of clauses 1-5, wherein the prediction sample P(x,y) satisfies one of the following:
 a result of multiple hypothesis inter-prediction (inter-prediction with more than two MVs);
 a result of affine prediction;
 a result of intra-prediction;
 a result of intra-block copy (IBC) prediction.
 generated by a triangular prediction mode (TPM).
 a result of inter-intra combined prediction;
 a result of a global inter prediction, where a region shares the same motion model and parameters;
 a result of a palette coding mode;
 a result of inter-view prediction in multi-view or 3D video coding;
 a result of an inter-layer prediction in scalable video coding;
 a result of a filtering operation.
 A result of a refinement process to improve accuracy of prediction at the location (x,y).

9. The method of any of clauses 1-8, wherein the reconstructed sample value Rec(x,y) is further refined prior to using during the conversion.

Item 1 listed in Section 4 provides additional examples of embodiments for methods 1 to 9.

10. A method of video processing, comprising: determining a first displacement vector Vx(x,y) and a second displacement vector Vy(x,y) are at a position (x,y) in a video block corresponding to an optical flow based method of coding the video block based on information from a neighboring block or a basic block; and performing a conversion between the video block and a bitstream representation of the current video block using the first displacement vector and the second displacement vector.

11. The method of clause 10, wherein the neighboring block is a spatially neighboring block.

12. The method of clause 10, wherein the neighboring block is a temporally neighboring block.

13. The method of any of clauses 10-12, wherein the neighboring block is selected based on coding unit dimensions or coding modes or positions of possible candidate blocks neighboring the video block.

14. The method of any of clauses 10-13, wherein the first displacement vector and the second displacement vector are calculated using a combination of motion vectors for multiple neighboring blocks.

15. The method of any of clauses 11-13, wherein the basic block has a pre-determined dimension.

16. The method of clause 10, wherein Vx(x,y) and Vy(x,y) are determined as: Vx(x, y)=a×(x−xc)+b(y−yc), Vy(x, y)=c×(x−xc)+d(y−yc), where (xc, yc) is a center position of the basic block with dimensions w×h which covers the position (x, y).

17. The method of clause 10, wherein Vx(x,y) and Vy(x,y) are determined as: Vx(x, y)=Shift(a×(x−xc)+b(y−yc), n1), Vy(x, y)=Shift(c×(x−xc)+d(y−yc), n1), where n1 is an integer and where (xc, yc) is a center position of the basic block with dimensions w×h which covers the position (x, y).

18. The method of clause 10, wherein Vx(x,y) and Vy(x,y) are determined as: Vx(x+1, y)=Vx(x,y)+a and Vy(x+1, y)=Vy(x, y)+c; wherein parameters a and c are obtained based on information from the neighboring block or from a history based storage.

19. The method of any of clauses 10 to 18, wherein a precision of Vx(x,y) and Vy(x,y) is different from a precision of motion vectors of the basic block.

Item 2 in section 4 provides additional examples of embodiments of clauses 10-19.

20. A method of video processing, comprising: determining, during a conversion between a video block and a bitstream representation of the video block, a refined prediction sample P'(x,y) at a position (x,y) in the video block by modifying a prediction sample P(x,y) at the position (x,y), and wherein a gradient in a first direction and a gradient in a second direction at the position (x,y) are determined based on a final prediction value determined from the refined prediction sample P'(x,y) and a residual sample value at the position (x,y); and performing the conversion using the gradient in the first direction and the gradient in the second direction.

21. The method of clause 20, wherein the gradient in the first direction and the gradient in the second direction correspond to a horizontal gradient and a vertical gradient.

22. The method of any of clauses 20-21, wherein the gradient in the first direction and the gradient in the second direction are derived from a result of an intermediate prediction.

23. The method of any of clauses 20-21, wherein the gradient in the first direction and the gradient in the second direction are derived from one reference picture list for the video block being an affine-predicted bi-prediction video block.

Items 3 and 4 in Section 4 provides additional example embodiments of the techniques described in clauses 20 to 23.

24. A method of video processing, comprising: determining a reconstructed sample Rec(x,y) at a position (x,y) in a video block that is affined coded; refining Rec(x,y) using first and second displacement vectors and first and second gradients at the position (x,y) to obtained a refined reconstruction sample Rec'(x,y); and performing a conversion between the video block and a bitstream representation of the current video block using the refined reconstruction sample.

25. The method of clause 24, wherein Rec'(x,y)=Rec(x, y)+Gx(x,y)×Vx(x,y)+Gy(x,y)×Vy(x,y), wherein Gx(x, y) and Gy(x,y) represented the first and second gradients and Vx(x,y) and Vy(x,y) represent the first and second displacement vectors at the position (x,y).

26. The method of clause 25, wherein Vx(x, y) and Vy(x, y) are derived at a sub-block level.

27. The method of clause 25, wherein Vx(x, y) and Vy(x, y) are derived at an 1/M pel precision, where M is an integer.

28. The method of any of clauses 1 to 27, wherein the method is applied as a result of the video block having a specific dimension and/or a specific coding mode.

29. The method of clause 28, wherein the specific dimension is 8×4.

30. The method of clause 28, wherein the video block is a 4×4 uni-prediction video block.

Items 5 to 12 in Section 4 provide examples of embodiments described in clauses 24 to 30.

31. The method of any of clauses 1 to 27, wherein the method is applied as a result of the video block having specific color components, or specific color formats, or having a specific position within a video picture or using a specific transform type.

32. The method of any of clauses 1-31, wherein the conversion includes generating the current block from the bitstream representation or generating the bitstream representation from the current block.

33. A method of video processing, comprising: performing, during a conversion between a video block that is coded using an affine coding mode and a bitstream representation of the video block, an interweaved prediction of the video block by splitting the video block into multiple partitions using K sub-block patterns, where K is an integer greater than 1; performing a motion compensation using a first of the K sub-block patterns to generate prediction samples of the video block, wherein a prediction sample at a position (x,y) is denoted as P(x,y); determining, for at least one of remaining of the K sub-block patterns, denoted as Lth pattern, an offset value OL(x,y) at the position (x,y) based on P(x,y) and a different between motion vectors derived using the first of the K sub-blocks and the Lth pattern; determining a final prediction sample for the position (x,y) as a function of OL(x,y) and P(x,y); and performing the conversion using the final prediction sample.

34. The method of clause 33, wherein K=2, and wherein L=1, and the final prediction sample is determined using P(x, y)+((O1(x, y)+1)>>1), where >> represents binary shift operation.

35. The method of clause 33, wherein K=2, and wherein L=1, and the final prediction sample is determined using P(x, y)+(O1(x, y)>>1), where >> represents binary shift operation.

36. The method of any of clauses 33-35, wherein OL(x,y) is generated from P(x,y) after performing horizontal and vertical interpolation.

37. The method of any of clauses 33-35, wherein the motion compensation for the first pattern may use 1/Nth pixel precision, and motion compensation for the Lth pattern may use 1/ML pixel precision, where N and M are integers.

38. The method of clause 38, wherein N=16 and ML=32, 64 or 128.

39. The method of clause 38, wherein N=8 and ML=16, 32, 64 or 128.

40. The method of clause 38, wherein N=4 and ML=8, 16, 32, 64 or 128.

41. A video encoder or re-encoder comprising a processor configured to implement a method recited in any one or more of clauses 1-40.

42. A video decoder comprising a processor configured to implement a method recited in any one or more of clauses 1-40.

43. A computer readable medium having code for implementing a method recited in any one or more of clauses 1-40 thereon.

Figure 33:
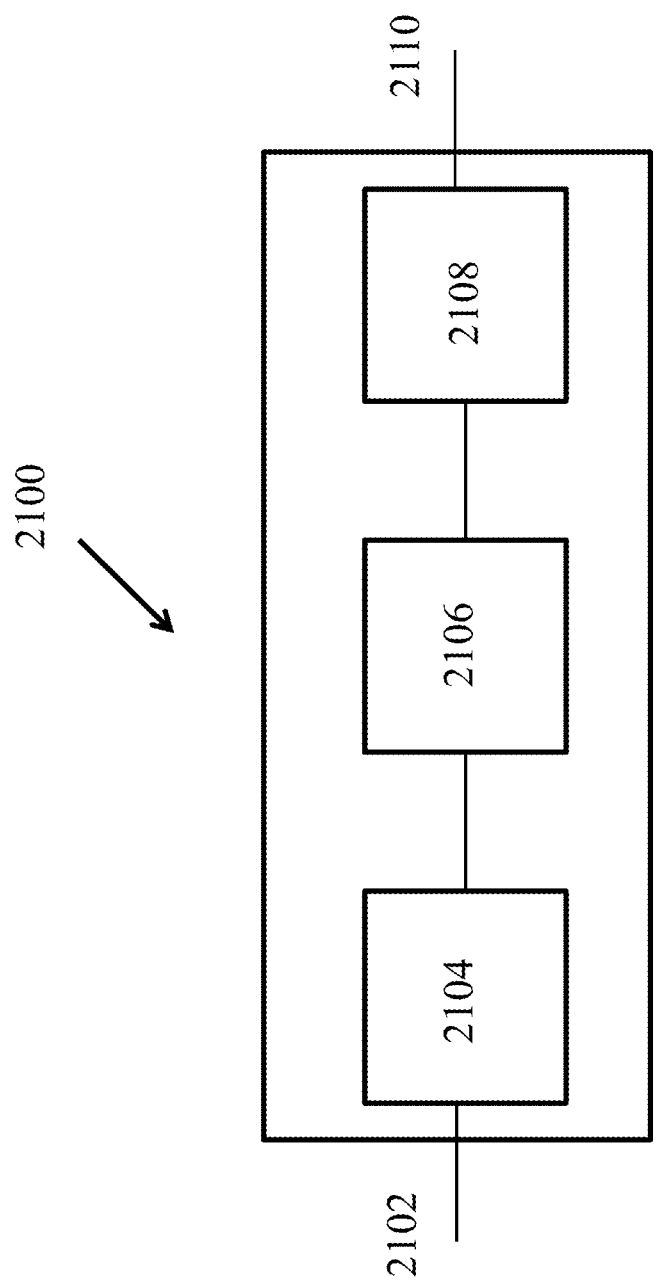
FIG. 33 is a block diagram showing an example video processing system in which various techniques disclosed herein may be implemented.

FIG. 33 is a block diagram showing an example video processing system 2100 in which various techniques disclosed herein may be implemented. Various implementations may include some or all of the components of the system 2100. The system 2100 may include input 2102 for receiving video content. The video content may be received in a raw or uncompressed format, e.g., 8 or 10 bit multi-component pixel values, or may be in a compressed or encoded format. The input 2102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2100 may include a coding component 2104 that may implement the various coding or encoding methods described in the present document. The coding component 2104 may reduce the average bitrate of video from the input 2102 to the output of the coding component 2104 to produce a coded representation of the video. The coding techniques are therefore sometimes called video compression or video transcoding techniques. The output of the coding component 2104 may be either stored, or transmitted via a communication connected, as represented by the component 2106. The stored or communicated bitstream (or coded) representation of the video received at the input 2102 may be used by the component 2108 for generating pixel values or displayable video that is sent to a display interface 2110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

Figure 34:
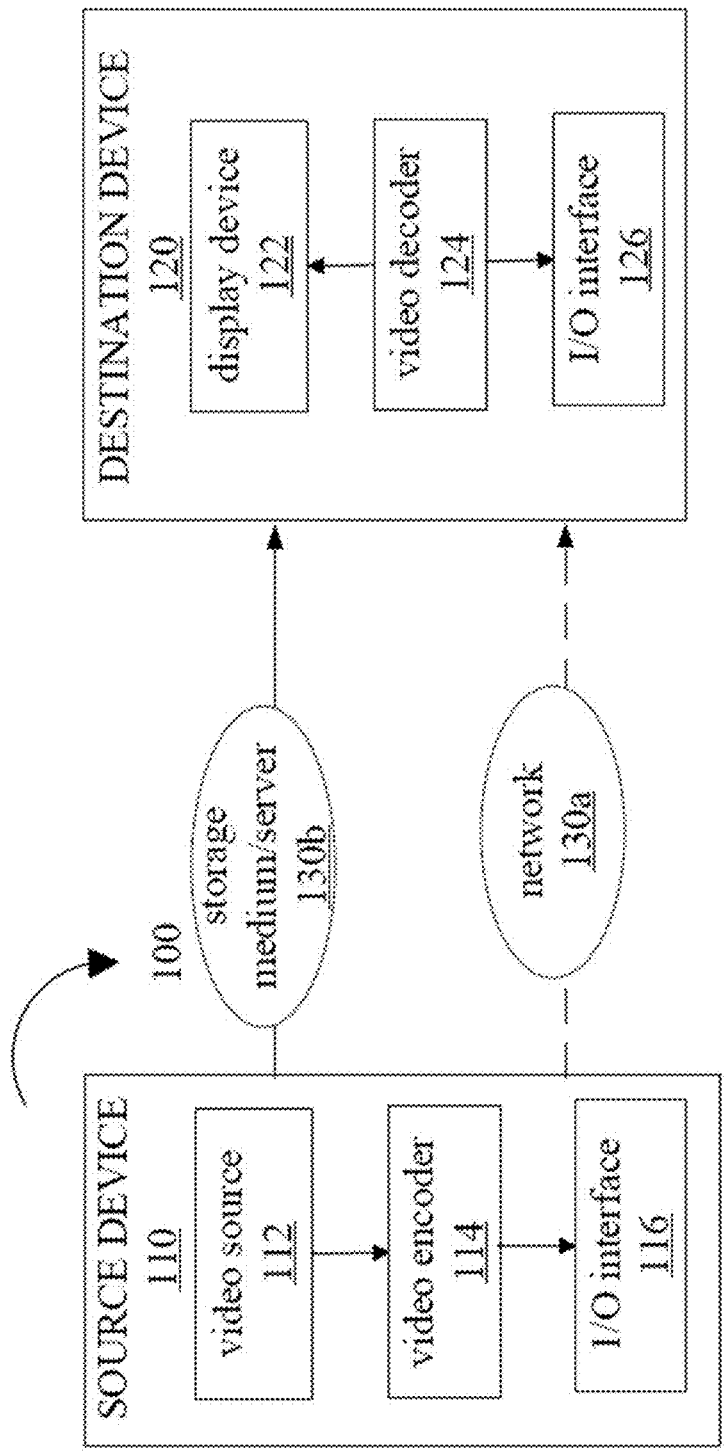
FIG. 34 is a block diagram that illustrates a video coding system in accordance with some embodiments of the present disclosure.

FIG. 34 is a block diagram that illustrates an example video coding system 100 that may utilize the techniques of this disclosure. As shown in FIG. 34, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 35:
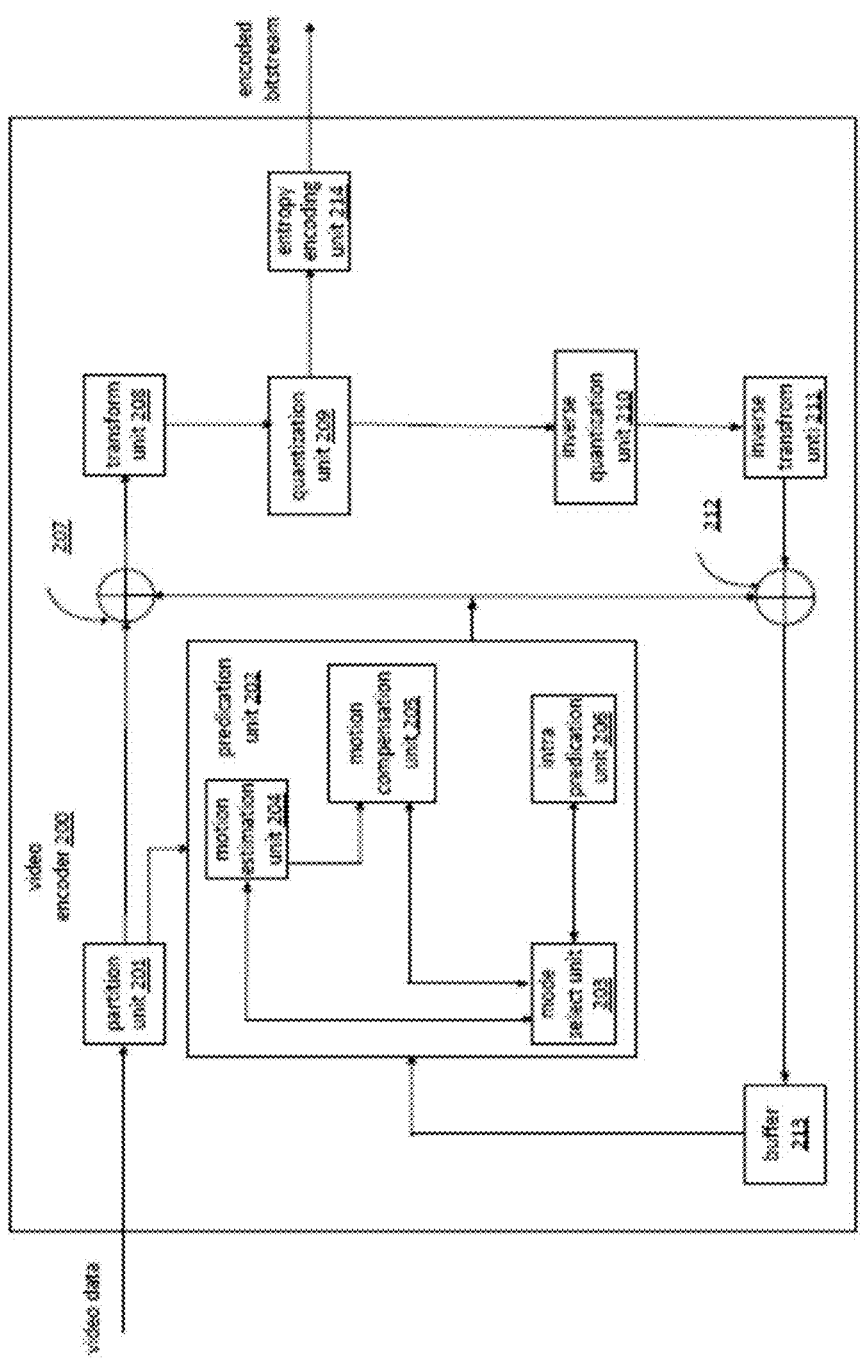
FIG. 35 is a block diagram that illustrates an encoder in accordance with some embodiments of the present disclosure.

FIG. 35 is a block diagram illustrating an example of video encoder 200, which may be video encoder 114 in the system 100 illustrated in FIG. 34.

Video encoder 200 may be configured to perform any or all of the techniques of this disclosure. In the example of FIG. 35, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy(IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 35 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 36:
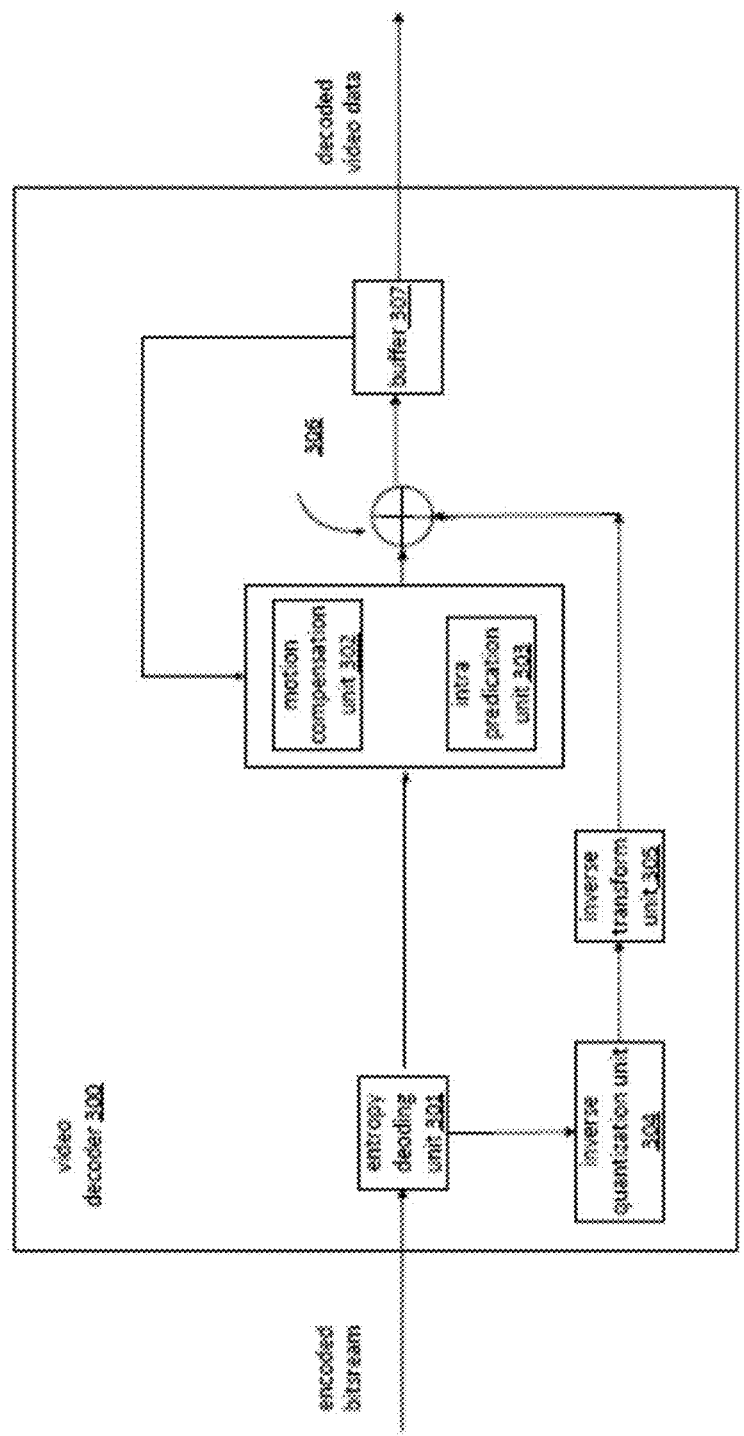
FIG. 36 is a block diagram that illustrates a decoder in accordance with some embodiments of the present disclosure.

FIG. 36 is a block diagram illustrating an example of video decoder 300 which may be video decoder 114 in the system 100 illustrated in FIG. 34.

The video decoder 300 may be configured to perform any or all of the techniques of this disclosure. In the example of FIG. 36, the video decoder 300 includes a plurality of functional components. The techniques described in this disclosure may be shared among the various components of the video decoder 300. In some examples, a processor may be configured to perform any or all of the techniques described in this disclosure.

In the example of FIG. 36, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 35).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

In this patent document the term "sample" or "samples" can refer to one or more samples of a video block. From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
determining, for an affine coded video block of a video, at least one control point motion vector;
determining a motion vector for a sub-block comprising a position (x, y) of the affine coded video block based on the at least one control point motion vector;
determining, based on the at least one control point motion vector, a first motion displacement Vx(x,y) in a first direction and a second motion displacement Vy(x, y) in a second direction for the position (x,y), wherein Vx(x, y)=a×(x−xc)+b×(y−yc), Vy(x, y)=c×(x−xc)+d×(y−yc), wherein (xc, yc) is based on a center position or a size of the sub-block, a, b, c and d are affine parameters;
determining a first gradient component Gx(x, y) in the first direction and a second gradient component Gy(x, y) in the second direction for the position (x,y);
determining a refined prediction sample P'(x,y) for the position (x,y) by modifying a prediction sample P(x,y) derived for the position (x,y) with the first gradient component Gx(x, y), the second gradient component Gy(x, y), the first motion displacement Vx(x,y) and the second motion displacement Vy(x,y), wherein the prediction sample P(x,y) is derived based on the motion vector for the sub-block; and
performing a conversion between the affine coded video block and a bitstream of the video using the refined prediction sample P'(x,y);
wherein a precision of the first motion displacement Vx(x,y) and the second motion displacement Vy(x,y) is different from a precision of the motion vector for the sub-block,
wherein the precision of the first motion displacement Vx(x,y) and the second motion displacement Vy(x,y) is 1/32 pixel precision and the precision of the motion vector for the sub-block is 1/16 pixel precision; and
wherein a decoder-side motion vector refinement method and a bi-directional optical flow method are not applied to the affine coded video block.

2. The method of claim 1, wherein a color component of the affine coded video block is a luma component.

3. The method of claim 1, wherein Vx(x,y) and Vy(x,y) are determined at least based on the position (x,y) and a center position of the sub-block.

4. The method of claim 1, wherein Vx(x,y) and Vy(x,y) are determined at least based on the position (x,y) and a size of the sub-block.

5. The method of claim 1, wherein c=−b and d=a in response to the affine coded video block being coded using a 4-parameter affine mode.

6. The method of claim 1, wherein a, b, c and d may be derived from the control point motion vector, a width (W) of the affine coded video block, and a height (H) of the affine coded video block.

7. The method of claim 6,
wherein $$a = \frac{(mv_1^h - mv_0^h)}{W}, b = \frac{(mv_1^v - mv_0^v)}{W}, c = \frac{(mv_2^h - mv_0^h)}{H} \text{ and}$$
$$d = \frac{(mv_2^v - mv_0^v)}{H},$$

wherein $mv_0$, $mv_1$, and $mv_2$ are the control point motion vectors,
wherein a motion vector component with superscript of h indicates a motion vector component being in a first direction,
wherein another motion vector component with a superscript of v indicates the another motion vector component being in the second direction,
wherein the first direction is orthogonal to the second direction,
wherein W indicates the width of the video block and H indicates the height of the video block.

8. The method of claim 7, wherein a, b, c and d are shifted.

9. The method of claim 1, wherein the method is used for a luma component and is not used a chroma component.

10. The method of claim 1, wherein the method is used for an affine mode and is not used a non-affine mode.

11. The method of claim 1, wherein the conversion comprises encoding the affine coded video block in to the bitstream.

12. The method of claim 1, wherein the conversion comprises decoding the affine coded video block from the bitstream.

13. An apparatus for processing video data comprising a processor and a non-transitory memory with instructions thereon, wherein the instructions upon execution by the processor, cause the processor to:
determine, for an affine coded video block of a video, at least one control point motion vector;
determine a motion vector for a sub-block comprising a position (x, y) of the affine coded video block based on the at least one control point motion vector;
determine, based on the at least one control point motion vector, a first motion displacement Vx(x,y) in a first direction and a second motion displacement Vy(x,y) in a second direction for the position (x,y), wherein Vx(x, y)=a×(x−xc)+b×(y−yc), Vy(x, y)=c×(x−xc)+d×(y−yc), wherein (xc, yc) is based on a center position or a size of the sub-block, and a, b, c and d are affine parameters;
determine a first gradient component Gx(x, y) in the first direction and a second gradient component Gy(x, y) in the second direction for the position (x,y);
determine a refined prediction sample P'(x,y) for the position (x,y) by modifying a prediction sample P(x,y) derived for the position (x,y) with the first gradient component Gx(x, y), the second gradient component Gy(x, y), the first motion displacement Vx(x,y) and the second motion displacement Vy(x,y), wherein the prediction sample P(x,y) is derived based on the motion vector for the sub-block; and
perform a conversion between the affine coded video block and a bitstream of the video using the refined prediction sample P'(x,y);

wherein a precision of the first motion displacement Vx(x,y) and the second motion displacement Vy(x,y) is different from a precision of the motion vector for the sub-block, wherein the precision of the first motion displacement Vx(x,y) and the second motion displacement Vy(x,y) is 1/32 pixel precision and the precision of the motion vector for the sub-block is 1/16 pixel precision; and wherein a decoder-side motion vector refinement method and a bi-directional optical flow method are not applied to the affine coded video block.

14. A non-transitory computer-readable storage medium storing instructions that cause a processor to:
- determine, for an affine coded video block of a video, at least one control point motion vector;
- determine a motion vector for a sub-block comprising a position (x, y) of the affine coded video block based on the at least one control point motion vector;
- determine, based on the at least one control point motion vector, a first motion displacement Vx(x,y) in a first direction and a second motion displacement Vy(x,y) in a second direction for the position (x,y), wherein Vx(x, y)=a×(x−xc)+b×(y−yc), Vy(x, y)=c×(x−xc)+d×(y−yc), wherein (xc, yc) is based on a center position or a size of the sub-block, a, b, c and d are affine parameters;
- determine a first gradient component Gx(x, y) in the first direction and a second gradient component Gy(x, y) in the second direction for the position (x,y);
- determine a refined prediction sample P'(x,y) for the position (x,y) by modifying a prediction sample P(x,y) derived for the position (x,y) with the first gradient component Gx(x, y), the second gradient component Gy(x, y), the first motion displacement Vx(x,y) and the second motion displacement Vy(x,y), wherein the prediction sample P(x,y) is derived based on the motion vector for the sub-block; and
- perform a conversion between the affine coded video block and a bitstream of the video using the refined prediction sample P'(x,y);

wherein a precision of the first motion displacement Vx(x,y) and the second motion displacement Vy(x,y) is different from a precision of the motion vector for the sub-block, wherein the precision of the first motion displacement Vx(x,y) and the second motion displacement Vy(x,y) is 1/32 pixel precision and the precision of the motion vector for the sub-block is 1/16 pixel precision; and wherein a decoder-side motion vector refinement method and a bi-directional optical flow method are not applied to the affine coded video block.

15. A non-transitory computer-readable recording medium storing a bitstream of a video data which is generated by a method performed by a video processing apparatus, wherein the method comprises:
- determining, for an affine coded video block of a video, at least one control point motion vector;
- determining a motion vector for a sub-block comprising a position (x, y) of the affine coded video block based on the at least one control point motion vector;
- determining, based on the at least one control point motion vector, a first motion displacement Vx(x,y) in a first direction and a second motion displacement Vy(x, y) in a second direction for the position (x,y), wherein Vx(x, y)=a×(x−xc)+b×(y−yc), Vy(x, y)=c×(x−xc)+d×(y−yc), wherein (xc, yc) is based on a center position or a size of the sub-block, a, b, c and d are affine parameters;
- determining a first gradient component Gx(x, y) in the first direction and a second gradient component Gy(x, y) in the second direction for the position (x,y);
- determining a refined prediction sample P'(x,y) for the position (x,y) by modifying a prediction sample P(x,y) derived for the position (x,y) with the first gradient component Gx(x, y), the second gradient component Gy(x, y), the first motion displacement Vx(x,y) and the second motion displacement Vy(x,y), wherein the prediction sample P(x,y) is derived based on the motion vector for the sub-block; and
- generating the bitstream using the refined prediction sample P'(x,y);

wherein a precision of the first motion displacement Vx(x,y) and the second motion displacement Vy(x,y) is different from a precision of the motion vector for the sub-block, wherein the precision of the first motion displacement Vx(x,y) and the second motion displacement Vy(x,y) is 1/32 pixel precision and the precision of the motion vector for the sub-block is 1/16 pixel precision; and wherein a decoder-side motion vector refinement method and a bi-directional optical flow method are not applied to the affine coded video block.

16. The apparatus of claim 13, wherein a color component of the affine coded video block is a luma component.

17. The apparatus of claim 13, wherein a, b, c and d may be derived from the control point motion vector, a width (W) of the affine coded video block, and a height (H) of the affine coded video block.

18. The apparatus of claim 17, wherein $$a = \frac{(mv_1^h - mv_0^h)}{W}, b = \frac{(mv_1^v - mv_0^v)}{W}, c = \frac{(mv_2^h - mv_0^h)}{H} \text{ and}$$
$$d = \frac{(mv_2^v - mv_0^v)}{H},$$

wherein $mv_0$, $mv_1$, and $mv_2$ are the control point motion vectors, wherein a motion vector component with superscript of h indicates a motion vector component being in a first direction, wherein another motion vector component with a superscript of v indicates the another motion vector component being in the second direction, wherein the first direction is orthogonal to the second direction, wherein W indicates the width of the video block, H indicates the height of the video block.

19. The non-transitory computer-readable storage medium of claim 14, wherein a, b, c and d may be derived from the control point motion vector, a width (W) of the affine coded video block, and a height (H) of the affine coded video block, wherein $$a = \frac{(mv_1^h - mv_0^h)}{W}, b = \frac{(mv_1^v - mv_0^v)}{W}, c = \frac{(mv_2^h - mv_0^h)}{H} \text{ and}$$
$$d = \frac{(mv_2^v - mv_0^v)}{H},$$

wherein $mv_0$, $mv_1$, and $mv_2$ are the control point motion vectors, wherein a motion vector component with superscript of h indicates a motion vector component being in a first direction, wherein another motion vector component with a superscript of v indicates the another motion vector component being in the second direction, wherein the first direction is orthogonal to the second direction, wherein W indicates the width of the video block, H indicates the height of the video block.

20. The non-transitory computer-readable recording medium of claim 15, wherein a, b, c and d may be derived from the control point motion vector, a width (W) of the affine coded video block, and a height (H) of the affine coded video block, wherein $$a = \frac{(mv_1^h - mv_0^h)}{W}, b = \frac{(mv_1^v - mv_0^v)}{W}, c = \frac{(mv_2^h - mv_0^h)}{H} \text{ and}$$

$$d = \frac{(mv_2^v - mv_0^v)}{H},$$

wherein $mv_0$, $mv_1$, and $mv_2$ are the control point motion vectors, wherein a motion vector component with superscript of h indicates a motion vector component being in a first direction, wherein another motion vector component with a superscript of v indicates the another motion vector component being in the second direction, wherein the first direction is orthogonal to the second direction, wherein W indicates the width of the video block, H indicates the height of the video block.

* * * * *